(12) United States Patent
Kondo et al.

(10) Patent No.: US 7,551,328 B2
(45) Date of Patent: Jun. 23, 2009

(54) IMAGE READING APPARATUS AND METHOD

(75) Inventors: Tetsujiro Kondo, Tokyo (JP); Takashi Sawao, Tokyo (JP); Junichi Ishibashi, Saitama (JP); Takahiro Nagano, Kanagawa (JP); Naoki Fujiwara, Tokyo (JP); Toru Miyake, Tokyo (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1037 days.

(21) Appl. No.: 10/471,344

(22) PCT Filed: Jan. 8, 2003

(86) PCT No.: PCT/JP03/00052

§ 371 (c)(1),
(2), (4) Date: Mar. 1, 2004

(87) PCT Pub. No.: WO03/061271

PCT Pub. Date: Jul. 24, 2003

(65) Prior Publication Data

US 2004/0263920 A1 Dec. 30, 2004

(30) Foreign Application Priority Data

Jan. 9, 2002 (JP) .................................. 2002-1929
Feb. 7, 2002 (JP) ................................ 2002-31012

(51) Int. Cl.
*H04N 1/04* (2006.01)

(52) U.S. Cl. ..................... 358/474; 358/497; 358/494; 358/486; 382/164; 382/274; 382/254; 348/135; 348/174; 348/208.4; 340/937; 702/142

(58) Field of Classification Search ................. 358/474, 358/482, 494, 497, 486, 513; 382/164, 167, 382/118, 274; 348/135, 174, 17, 208.4; 340/937, 340/938, 936
See application file for complete search history.

(56) References Cited

U.S. PATENT DOCUMENTS

| 4,447,830 | A | * | 5/1984 | Stoffel | ......................... 358/462 |
| 4,811,409 | A | * | 3/1989 | Cavan | ......................... 382/144 |
| 5,136,661 | A | * | 8/1992 | Kobayasi et al. | ............ 382/288 |

(Continued)

FOREIGN PATENT DOCUMENTS

JP          9-46477          2/1997

*Primary Examiner*—Negussie Worku
(74) *Attorney, Agent, or Firm*—Frommer Lawrence & Haug LLP; William S. Frommer; Paul A. Levy

(57) ABSTRACT

The present invention enables image data with good S/N and high resolution to be obtained reliably in a short reading time. A CCD 102 is formed by arranging line sensors, in which detecting elements having a time integration effect are arranged in a direction orthogonal to a relative movement direction in which the CCD 102 moves relative to an original, in a plurality of columns in the relative movement direction. A signal processing unit 107 detects pixel components on the basis of a model for separating first pixel values obtained in a processing unit time by the CCD 102 into a plurality of the pixel components corresponding to detection positions of the object being detected, and generates second pixel values corresponding to the detection positions of the object being detected on the basis of the detected pixel components. The present invention is applicable to scanners.

15 Claims, 39 Drawing Sheets

U.S. PATENT DOCUMENTS

| | | | | |
|---|---|---|---|---|
| 5,963,344 A | * | 10/1999 | Morita et al. | 358/482 |
| 6,011,880 A | * | 1/2000 | Tani et al. | 382/312 |
| 6,525,770 B1 | * | 2/2003 | Ueda et al. | 348/316 |
| 6,577,759 B1 | * | 6/2003 | Caron et al. | 382/164 |
| 6,937,361 B1 | * | 8/2005 | Kondo et al. | 358/1.9 |
| 7,034,969 B2 | * | 4/2006 | Watanabe | 358/513 |
| 7,218,759 B1 | * | 5/2007 | Ho et al. | 382/118 |
| 7,362,479 B2 | * | 4/2008 | Ikeno | 358/482 |

* cited by examiner

IMAGE READING APPARATUS AND METHOD

TECHNICAL FIELD

The present invention relates to an apparatus and a method for image reading, and particularly to an apparatus and a method for image reading that read an image of an object being detected.

BACKGROUND ART

Scanners are widely used which read an image of an original as a subject such as paper, a photograph or the like and generate image data corresponding to the image. A CCD or the like is used in a scanner.

Such a scanner repeats control such that after the CCD reads an image of a predetermined area of an original, the CCD is moved and a shutter of the CCD is operated so as not to pick up an image of another area of the original, and when the CCD reaches a next area to be read of the original, the shutter of the CCD is operated so as to pick up an image. Thereby images of desired areas of the original are read.

In order to improve resolution, however, the shutter needs to be operated so as to pick up only an image at a predetermined position of a narrower area of the subject in response to movement of the CCD in a scanning direction, thus resulting in a problem of a shorter image pickup time of the CCD and hence a degraded S/N of image data obtained. In order to shorten reading time, the shutter needs to be operated so as to pick up an image in a shorter exposure time in response to movement of the CCD in the scanning direction, thus resulting in a problem of a shorter image pickup time of the CCD and hence similarly a degraded S/N of image data obtained.

In addition, in image pickup by a mechanical shutter, the shutter needs to be opened and closed frequently in response to movement of the detecting element, thus resulting in a problem of increased load on the mechanism and hence susceptibility to failures. In this case, there is also a problem of increased power consumption when the mechanical shutter is operated frequently.

Furthermore, in order to lengthen image pickup time simply for higher S/N of image data, the CCD needs to be stopped at each image pickup position of the subject, thus resulting in a problem of long reading time.

DISCLOSURE OF INVENTION

The present invention has been made in view of such a situation, and it is accordingly an object of the present invention to be able to reliably obtain image data with good S/N and higher resolution in a short reading time.

According to the present invention, there is provided an image reading apparatus including: reading means formed by arranging line sensors, in which detecting elements having a time integration effect are arranged in a direction orthogonal to a relative movement direction in which the reading means moves relative to an object being detected, in a plurality of columns in the relative movement direction; pixel component detecting means for detecting pixel components on the basis of a model for separating first pixel values obtained in a processing unit time by the detecting elements into a plurality of the pixel components corresponding to detection positions of the object being detected; and pixel value generating means for generating second pixel values corresponding to the detection positions of the object being detected on the basis of the pixel components detected by the pixel component detecting means.

The pixel component detecting means can include model generating means for generating the model that represents a relation between the first pixel values and a plurality of the pixel components corresponding to the detection positions, the pixel components being accumulated in each divided unit time obtained by dividing the processing unit time by a number of columns of the line sensors; and the pixel component detecting means can detect the pixel components on the basis of the model generated by the model generating means.

The image reading apparatus can further include speed detecting means for detecting relative speed between the detecting elements and the object being detected; and the model generating means can generate the model that represents a relation between the first pixel values obtained from a part of the detecting elements of the line sensors arranged in the reading means and the pixel components in correspondence with the relative speed detected by the speed detecting means.

The image reading apparatus can further include speed detecting means for detecting relative speed between the detecting elements and the object being detected; and the model generating means can generate the model that represents a relation between third pixel values obtained by adding together the first pixel values obtained from adjacent detecting elements of a plurality of the detecting elements arranged in columns in the relative movement direction of the reading means and the pixel components in correspondence with the relative speed detected by the speed detecting means.

The image reading apparatus can further include control means for controlling the reading means such that when the reading means is positioned at an initial position, the reading means picks up an image of the object being detected and outputs the first pixel values corresponding to the detecting elements in a state of standing still with respect to the object being detected during the processing unit time; and the pixel component detecting means can detect other pixel components by substituting the pixel components generated on the basis of the first pixel values resulting from image pickup by the reading means in the state of standing still with respect to the object being detected under control of the control means into the model that represents the relation between the first pixel values and a plurality of the pixel components corresponding to the detection positions.

The control means can control the reading means such that the reading means picks up an image of the object being detected and outputs the first pixel values corresponding to the detecting elements in the state of standing still with respect to the object being detected during the processing unit time at predetermined time intervals.

The image reading apparatus can further include control means for controlling exposure time for each of the detecting elements of the reading means such that each of the first pixel values includes the pixel component corresponding to a different position in the relative movement direction of the object being detected; and the pixel component detecting means can detect the pixel components on the basis of the model that represents a relation between the first pixel values each including the pixel component corresponding to a different position in the relative movement direction of the object being detected and a plurality of the pixel components corresponding to the detection positions.

The control means can control the exposure time for each of the detecting elements of the reading means such that each of the first pixel values includes the pixel component corresponding to a different position in the relative movement direction of the object being detected at predetermined time intervals.

The image reading apparatus can further include moving means for moving one of the object being detected and the reading means so as to change a relative position between the object being detected and the reading means.

The pixel component detecting means can include normal equation generating means for generating a normal equation on the basis of a model for separating first pixel values obtained by the detecting elements into a plurality of pixel components corresponding to detection positions of the object being detected; and the pixel component detecting means can detect the pixel components on the basis of the normal equation generated by the normal equation generating means.

The image reading apparatus can further include first control means for controlling image pickup of the reading means such that each of the detecting elements arranged in a plurality of columns in the relative movement direction begins exposure at an identical first position of the detection positions of the object being detected and ends exposure at an identical second position different from the first position; and second control means for controlling the image pickup of the reading means such that the detecting elements begin exposure after ending exposure at a third time between a first time when all of the detecting elements arranged in the plurality of columns have reached the first position and have begun exposure and a second time when one of the detecting elements arranged in the plurality of columns has reached the second position and has ended the exposure; wherein the normal equation generating means can generate the normal equation by setting the first pixel values obtained by the detecting elements in the normal equation representing a relation between a plurality of the pixel components including the pixel component corresponding to one of the first position, the second position, and a third position as a detection position at the third time and the first pixel values.

The normal equation generating means can generate the normal equation for calculating the pixel components by applying a method of least squares.

The normal equation generating means can generate the normal equation weighted in correspondence with lengths of exposure times for obtaining the first pixel values.

According to the present invention, there is provided an image reading method including: a pixel component detecting step for detecting pixel components on the basis of a model for separating first pixel values obtained in a processing unit time by detecting elements into a plurality of the pixel components corresponding to detection positions of an object being detected; and a pixel value generating step for generating second pixel values corresponding to the detection positions of the object being detected on the basis of the pixel components detected by processing of the pixel component detecting step.

According to the present invention, there is provided a program on a storage medium including: a pixel component detecting step for detecting pixel components on the basis of a model for separating first pixel values obtained in a processing unit time by detecting elements into a plurality of the pixel components corresponding to detection positions of an object being detected; and a pixel value generating step for generating second pixel values corresponding to the detection positions of the object being detected on the basis of the pixel components detected by processing of the pixel component detecting step.

According to the present invention, there is provided a program executed by a computer, the program including: a pixel component detecting step for detecting pixel components on the basis of a model for separating first pixel values obtained in a processing unit time by detecting elements into a plurality of the pixel components corresponding to detection positions of an object being detected; and a pixel value generating step for generating second pixel values corresponding to the detection positions of the object being detected on the basis of the pixel components detected by processing of the pixel component detecting step.

Pixel components are detected on the basis of a model for separating first pixel values obtained in a processing unit time by detecting elements into a plurality of the pixel components corresponding to detection positions of an object being detected, and second pixel values corresponding to the detection positions of the object being detected are generated on the basis of the detected pixel components.

BEST MODE FOR CARRYING OUT THE INVENTION

A scanner is an image reading apparatus that reads information corresponding to positions of pixels and spectral reflectance (or spectral transmittance) of an image from the image formed as two-dimensional information on an original such as a paper, a photograph or the like, which is an example of a detected object, converts the read information into digital data, and outputs the digital data to an information processing apparatus such as a computer or the like.

The scanner comprises an illuminating light source, an optical system, a linear image sensor (line sensor) and the like. The scanner also comprises a reading unit for performing main scanning, a carrying system for performing sub-scanning, and a signal processing unit for performing processing such as data compression and the like.

Directing attention to sub-scanning, scanners using a linear image sensor are classified into sheet feed scanners, flatbed scanners, hand-held scanners, and film scanners.

In a sheet feed scanner, a reading unit is fixed, and an original is carried by a carrying system, whereby sub-scanning is performed.

In a flatbed scanner, an original is fixed, and an optical system and a reading unit move, thus performing sub-scanning.

Sub-scanning of a hand-held scanner is performed by a user holding a body of the hand-held scanner and moving the hand-held scanner with respect to an original.

A film scanner is exclusively for photographic films (such as so-called 35-mm films, APS (the Advanced Photographic System) or the like), and reads an image by transmission.

Figure 1:
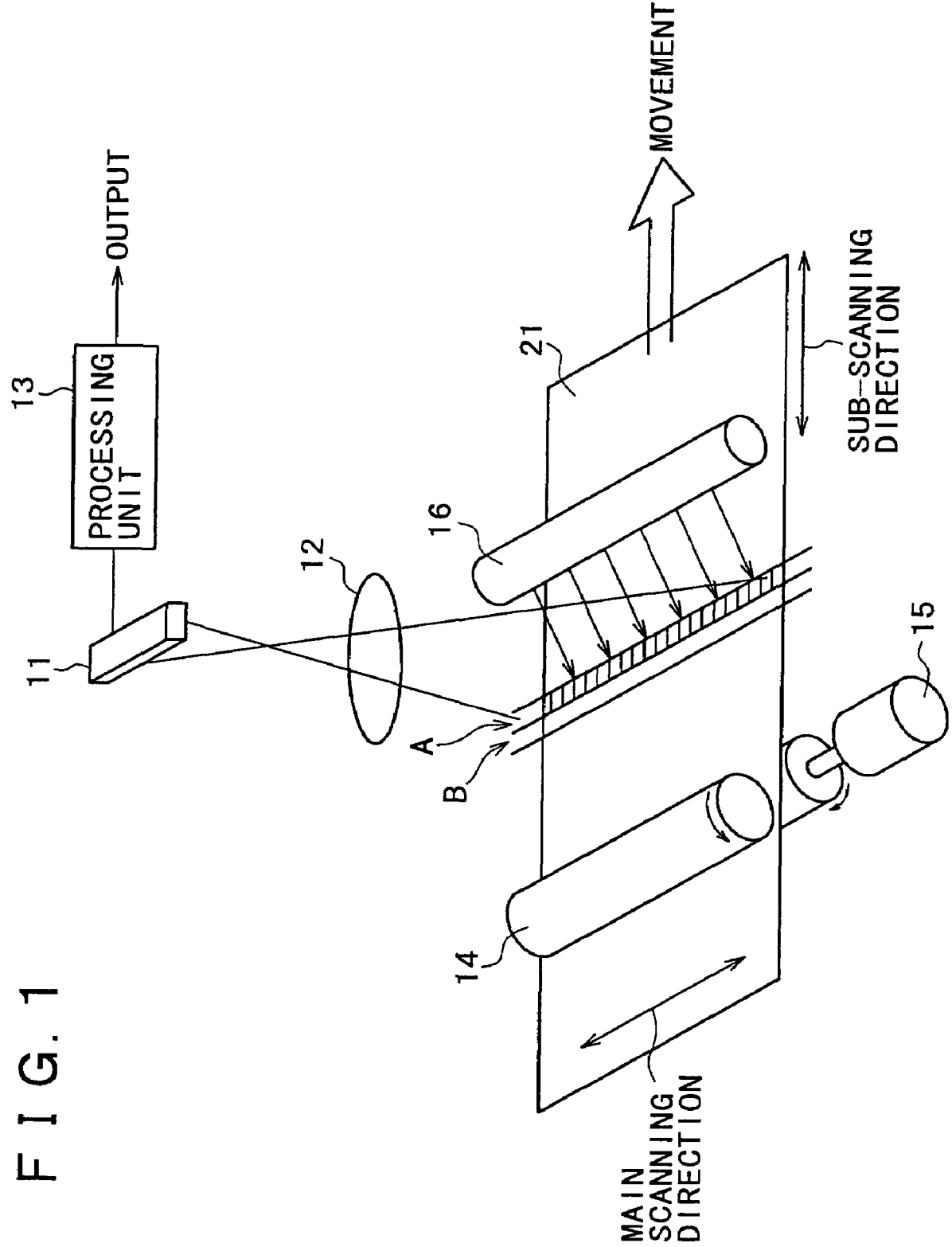
FIG. 1 is a diagram showing a configuration of an embodiment of a scanner, or an image reading apparatus according to the present invention.

FIG. 1 is a diagram showing a configuration of an embodiment of a scanner, or an image reading apparatus according to the present invention. The scanner shown in FIG. 1 is a so-called sheet feed scanner.

A linear image sensor 11 obtains reflected light (or transmitted light) from a narrow line-shaped area, for example an area being read in FIG. 1 of an original 21 as an example of a detected object illuminated by an illuminating light source 16 via an optical system comprising a lens 12 and the like. The linear image sensor 11 is for example a device formed by arranging detecting elements in a form of a line in a direction of main scanning in FIG. 1 and comprises a CCD (Charge Coupled Device), a CMOS (Complementary Metal-oxide Semiconductor) sensor or the like.

The linear image sensor 11 supplies a signal corresponding to the obtained reflected light to a processing unit 13. That is, the linear image sensor 11 reads an image of the original 21 and supplies a signal corresponding to the read image to the processing unit 13.

The original 21 is fed at a predetermined speed by a roller 14 on the basis of driving force supplied from a carrying system 15. Therefore the position of the original 21 relative to the lens 12 and the linear image sensor 11 is gradually shifted. The linear image sensor 11 obtains reflected light from a next area in response to the movement of the original 21, and then supplies a signal corresponding to an image of the next area to the processing unit 13.

In FIG. 1, A denotes the area being read, and B denotes the area to be read next.

The linear image sensor 11 repeats the processing of reading an image of a predetermined area of the original 21 in response to the movement of the original 21, and sequentially supplies a signal of the image to the processing unit 13 in response to the reading processing.

Since the original 21 is carried at a predetermined speed, an image signal outputted by the linear image sensor 11 includes a movement blur.

The lens 12 refracts light reflected by an image reading area of the original 21, and thereby forms an image corresponding to the reading area of the original 21 on the linear image sensor 11.

The processing unit 13 generates image data as digital data without a movement blur on the basis of the signal corresponding to the image which signal is supplied from the linear image sensor 11, and outputs the generated image data to an information processing apparatus such as a computer not shown in the figure or the like.

Figure 2:
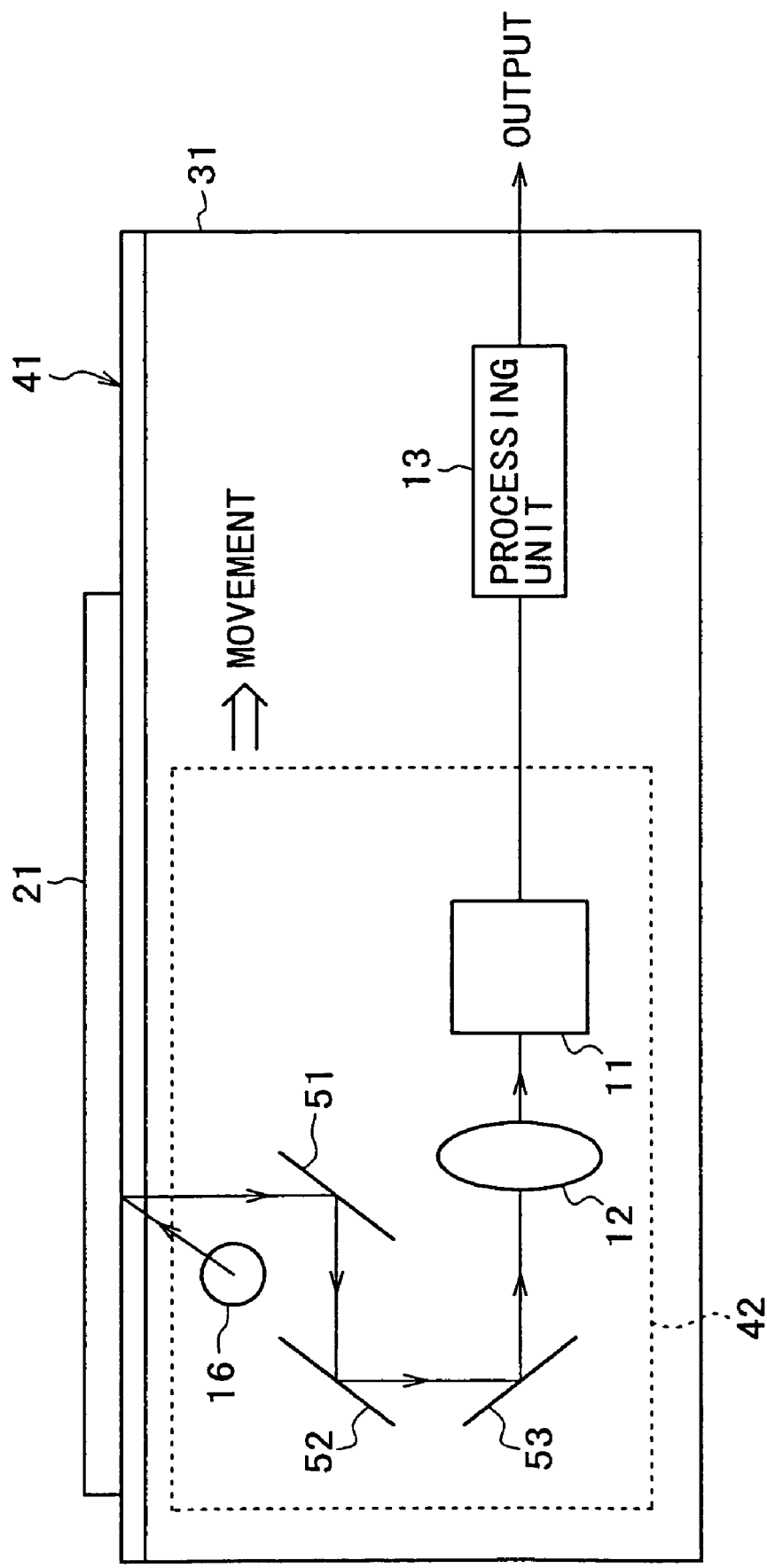
FIG. 2 is a diagram showing an example of configuration of a flatbed scanner.

FIG. 2 is a diagram showing a configuration of another embodiment of a scanner, or an image reading apparatus according to the present invention. The scanner shown in FIG. 2 is a so-called flatbed scanner.

The same parts as shown in FIG. 1 are identified by the same reference numerals, and description thereof will be omitted.

An original platen 41 is made of a transparent flat glass, plastic or the like. An original 21 is placed on the original platen 41 such that an image to be read faces a scanning unit 42. The original 21 placed on the original platen 41 is fixed to a body 31.

The scanning unit 42 comprises an optical system, a linear image sensor 11 and the like. When reading an image of the original 21, the scanning unit 42 is moved by a driving unit not shown from the left to the right of FIG. 2, for example, at a predetermined speed with respect to the original platen 41, that is, the original 21.

The scanning unit 42 comprises the linear image sensor 11, which is a line sensor, a lens 12, an illuminating light source 16, a mirror 51, a mirror 52, a mirror 53 and the like.

The mirror 51, the mirror 52, and the mirror 53 reflect light applied from the illuminating light source 16 and reflected from the original 21 via the original platen 41, and thereby makes the light incident on the linear image sensor 11 via the lens 12.

When the linear image sensor 11 is smaller than a reading area of the original 21, the optical system is a reducing optical system, and an image formed by the light incident on the linear image sensor 11 is reduced as compared with an image of the original.

On the other hand, when the linear image sensor 11 is of a substantially equal length to that of a reading area of the original 21, the optical system is an unmagnification optical system using a rod lens array or the like as the lens 12, and an image formed by the light incident on the linear image sensor 11 is of an equal length to that of an image of the original 21.

When a regular reflection component of the light applied from the illuminating light source 16 is incident from a glossy original 21 on the linear image sensor 11, detecting elements are saturated, so that the linear image sensor 11 cannot read the image. Thus, an optical axis of the optical system is set such that the regular reflection component of the light applied from the illuminating light source 16 is not incident on the linear image sensor 11.

Since the scanning unit 42 including the linear image sensor 11 obtains the image of the original 21 while moving at a predetermined speed, a signal supplied from the scanning unit 42 to a signal processing unit 13 includes movement blur. The movement blur will be described later in detail.

The optical system is set such that the light incident on the linear image sensor 11 is bright and uniform. As a factor that impairs brightness and uniformity of the light incident on the linear image sensor 11, there is light distribution of the illuminating light source 16, a COS4 law of the optical system, vignetting of the lens 12 or the like.

The light distribution of the illuminating light source 16 often becomes a problem especially in regard to light incident on both edges of the linear image sensor 11. The COS4 law of the optical system indicates that brightness of a peripheral field of view of the optical system is decreased in proportion to $\cos 4\theta$. The vignetting refers to shading of a luminous flux at an edge of the lens 12 or the like, which results in decrease in the brightness.

The light distribution of the illuminating light source 16, the COS4 law of the optical system, the vignetting of the lens 12 and the like cause darker light on the periphery of the linear image sensor 11 as compared with light at a center of the linear image sensor 11.

In order to prevent the darker light on the periphery of the linear image sensor 11 as compared with the light at the center of the linear image sensor 11, optical shading correction is performed to reduce an amount of light at the center, and consequently an amount of light on an image plane is made as uniform as possible, for example.

The processing unit 13 includes an A/D (Analog/Digital) converter unit, an embedded computer, a DSP (Digital Signal Processor) or the like. The processing unit 13 generates image data as digital data without a movement blur on the basis of a signal corresponding to an image which signal is supplied from the linear image sensor 11, and outputs the generated image data to an information processing apparatus such as a computer not shown in the figure or the like.

The scanner according to the present invention can be a color scanner.

A color scanner performs color separation of an original. Color separation methods are roughly classified into a light source changing method, a filter changing method, and a color linear image sensor method.

In the light source changing method, three fluorescent lamps corresponding to separated colors and serving as the illuminating light source 16 are blinked sequentially, and a monochrome linear image sensor 11 sequentially reads an image of an original 21, whereby a red, a green, and a blue signal output are obtained.

In the filter changing method, a red, a green, and a blue color filter are provided between the illuminating light source 16 and the linear image sensor 11, and the color filters are changed, whereby a red, a green, and a blue signal output are obtained.

In the color linear image sensor method, a color image sensor formed by incorporating a linear image sensor with three lines as one unit and color filters into one package performs color separation and reading simultaneously.

Figure 3:
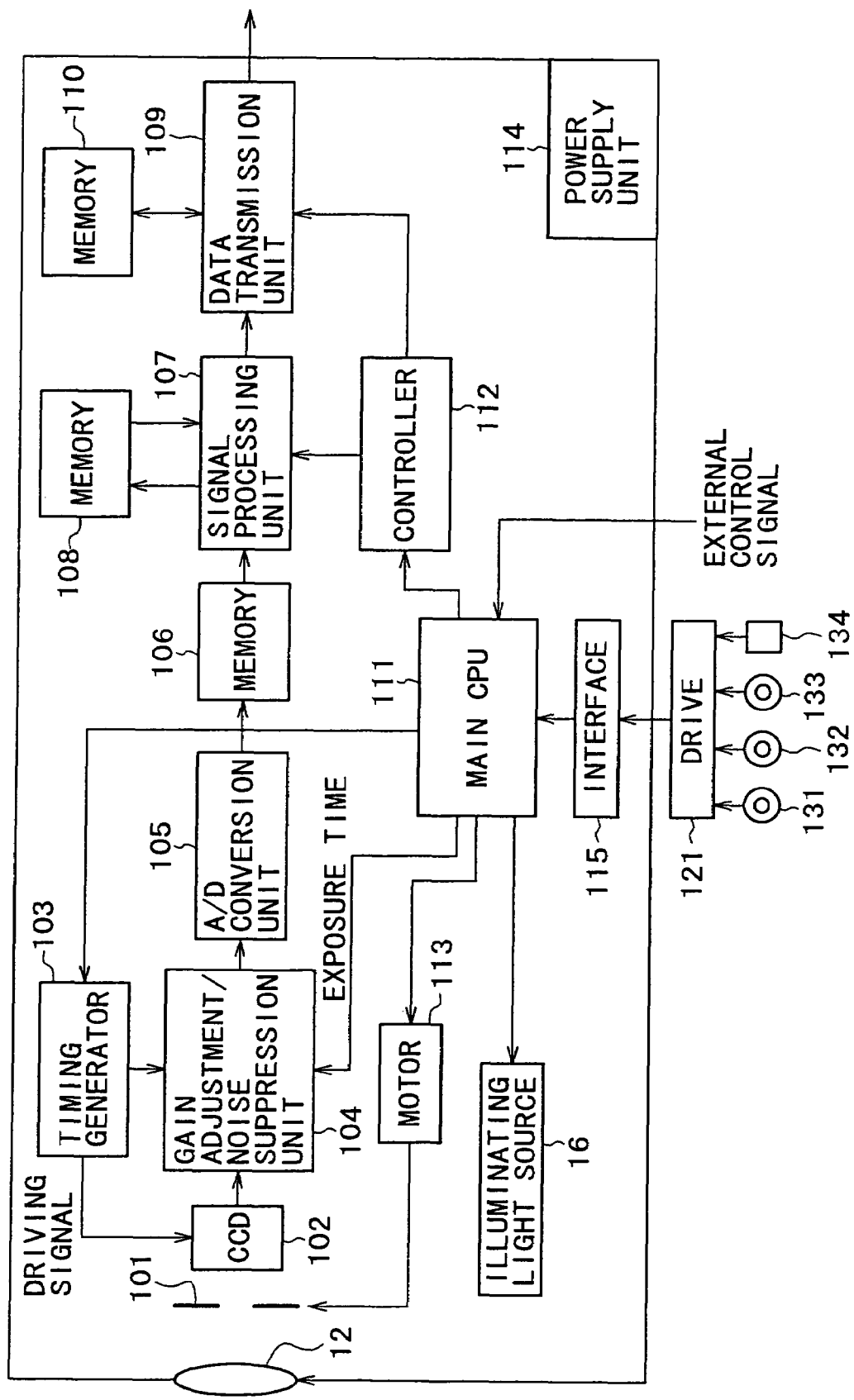
FIG. 3 is a block diagram showing a more detailed functional configuration of an image reading apparatus according to the present invention.

FIG. 3 is a block diagram showing a more detailed functional configuration of an image reading apparatus according to the present invention.

An iris 101 reduces an amount of light entering a CCD 102 via a lens 12 according to intensity of the light.

The CCD 102 corresponds to the linear image sensor 11. The CCD 102 generates a signal corresponding to the incident light on the basis of a driving signal supplied from a timing generator 103, and then supplies the generated signal to a gain adjustment/noise suppression unit 104.

In the CCD 102, photodiodes as photosensitive units arranged in a form of a line (one dimension) convert energy of the incident light into charge, and a shift electrode transfers the charge to a CCD analog register. The photodiodes of the CCD 102 correspond to the detecting elements. The CCD 102 sequentially converts the energy of the incident light into charge and accumulates the converted charge without discharging the charge in an exposure time. The CCD 102 can therefore be said to have a time integration effect. The exposure time corresponds to a processing unit time.

The CCD analog register serving as a transfer unit in the CCD 102 sequentially transfers the transferred charge to an output unit usually by a two-phase clock pulse included in the driving signal. The output unit of the CCD 102 converts the charge into voltage.

That is, the CCD 102 converts light detected by the N photosensitive units arranged in the form of a line into N voltage signals, and then outputs the analog voltage signals.

For colorization, the CCD 102 may include a color filter for each of three lines as one package. Efforts have been continued for higher sensitivity, lower noise, higher speed, higher resolution, and lower power consumption of the CCD 102.

The gain adjustment/noise suppression unit 104 adjusts level of the signal supplied from the CCD 102, and applies processing such as correlated double sampling to the signal to thereby suppress noise included in the signal. Correlated double sampling utilizes a strong correlation of noise included in a signal period with noise included in a field-through zero-level period, and is effective especially in suppressing reset noise.

The gain adjustment/noise suppression unit 104 supplies a signal with an adjusted signal level and suppressed noise to an A/D conversion unit 105.

The A/D conversion unit 105 subjects the signal supplied from the gain adjustment/noise suppression unit 104 to analog/digital conversion, and then supplies an image signal as a digital signal to a memory 106.

The memory 106 sequentially stores the image signal supplied from the A/D conversion unit 105, and constructs image data corresponding to the original 21. The memory 106 supplies the image data to a signal processing unit 107.

The signal processing unit 107 applies defect correction processing, white balance adjustment processing and the like to the image data corresponding to the original 21 which image data is supplied from the memory 106, and also removes movement blur included in the image data. The signal processing unit 107 supplies resulting image data to a data transmission unit 109. In applying the defect correction processing, white balance adjustment processing, and movement blur removal processing, the signal processing unit 107 temporarily stores image data in a memory 108, and applies the processing to the image data stored in the memory 108.

The data transmission unit 109 temporarily stores the image signal supplied from the signal processing unit 107 in a memory 110, and transmits the image data stored in the memory 110 to an external apparatus by a predetermined method.

On the basis of an external control signal supplied externally, a main CPU 111 controls light emission of an illuminating light source 16, generation of a driving signal by the timing generator 103, the processing of the gain adjustment/noise suppression unit 104, processing of a controller 112, and operation of a motor 113. For example, the main CPU 111 makes the timing generator 103 drive an electronic shutter for each pixel of the CCD 102, which will be described later. Also, for example, the main CPU 111 realizes relative movement between the original 21 and the linear image sensor 11, which will be described later, by controlling a unit for driving the carrying system 15 or the scanning unit 42.

The main CPU 111 obtains data indicating relative speed between the original 21 and the CCD 102 from the unit for driving the carrying system 15 or the scanning unit 42. The main CPU 111 supplies the data indicating the relative speed between the original 21 and the CCD 102 to the signal processing unit 107 via the controller 112.

The controller 112 controls the operation of the signal processing unit 107 and the operation of the data transmission unit 109 under control of the main CPU 111.

The motor 113 drives the iris 101 and adjusts a diaphragm of the iris 101 under control of the main CPU 111.

A power supply unit 114 supplies the CCD 102 to an interface 115 with power necessary for respective operations of the CCD 102 to the interface 115.

Further, the main CPU 111 is connected with a drive 121 via the interface 115. The drive 121 reads a program or data recorded (stored) on a magnetic disk 131, an optical disk 132, a magneto-optical disk 133, or a semiconductor memory 134 mounted in the drive 121, and then supplies the read program or data to the main CPU 111 via the interface 115.

The main CPU 111 executes the program supplied from the drive 121 or supplies the program to the controller 112 or the signal processing unit 107.

Figure 4:
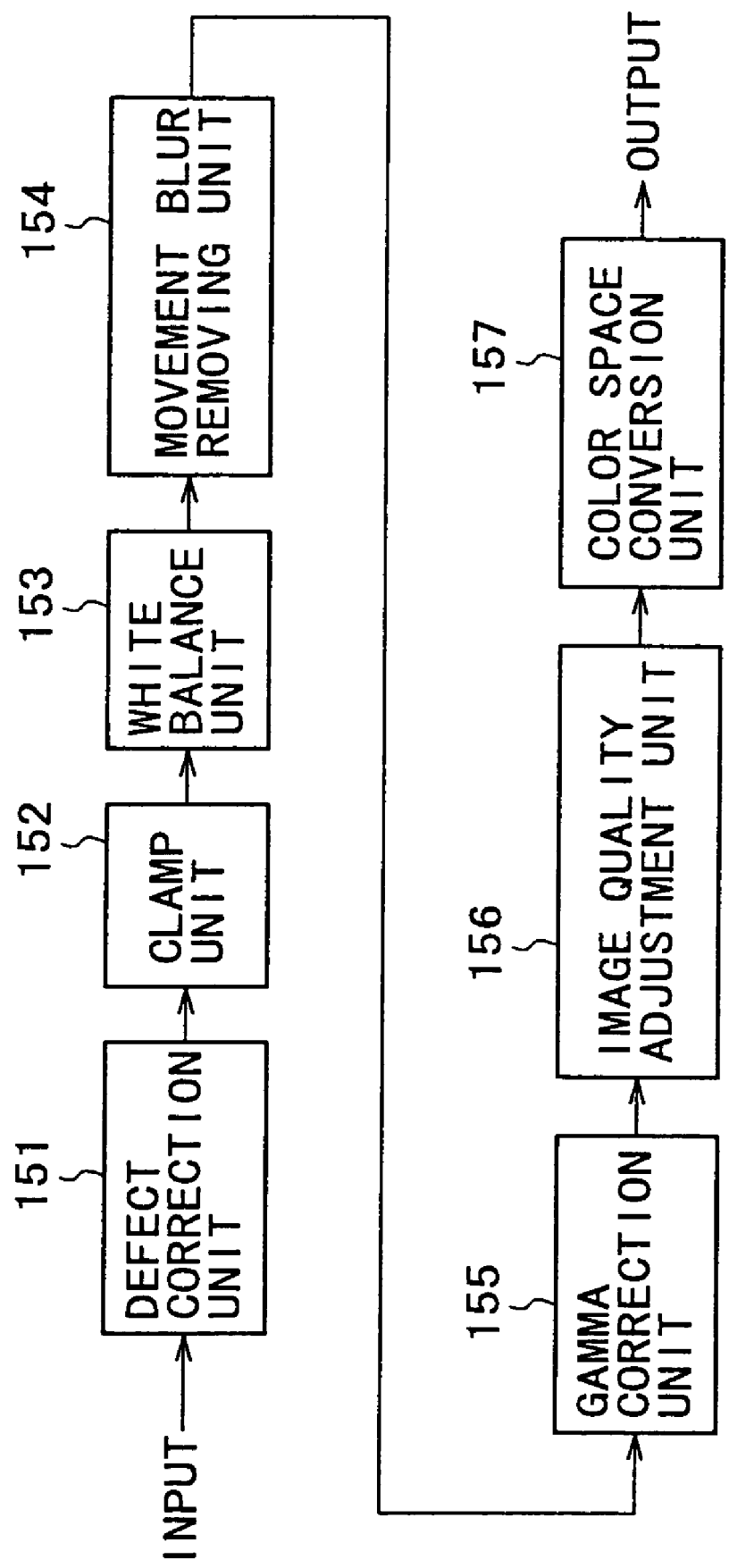
FIG. 4 is a block diagram showing a functional configuration of a signal processing unit 107.

FIG. 4 is a block diagram showing a functional configuration of the signal processing unit 107.

A defect correction unit 151 detects a position of a flawed or defective pixel of input image data which position corresponds to a pixel that does not react to light or has charge at all times among pixels of the CCD 102, and corrects the flawed or defective pixel by setting an adjacent pixel value in the flawed or defective pixel, for example. The defect correction unit 151 supplies the image data resulting from the correction of the flawed or defective pixel to a clamp unit 152.

The clamp unit 152 sets a setup level of a luminance signal of the image data, and then supplies the image data with the set setup level to a white balance unit 153. The data outputted by the A/D conversion unit 105 is shifted in a positive direction so as to prevent the cutting of negative values. The clamp unit 152 brings back the data by the amount of-shift so that the image data includes correct negative values.

The white balance unit 153 adjusts RGB (Red, Green, Blue) gain in correspondence with a predetermined color temperature, and thereby adjusts white balance of the image data. The white balance unit 153 supplies the image data with the adjusted white balance to a movement blur removing unit 154.

Incidentally, a scanner for color images requires the white balance unit 153, but a scanner for monochrome images does not require the white balance unit 153.

The movement blur removing unit 154 removes movement blur included in the image data, and then supplies the image data without movement blur to a gamma correction unit 155. A configuration of the movement blur removing unit 154 and movement blur removal processing by the movement blur removing unit 154 will be described later in detail.

The gamma correction unit 155 applies to the image data a gamma correction for adjusting level of the image data corresponding to intensity of light of the CCD 102 according to a predetermined gamma curve.

Incidentally, because the gamma correction is nonlinear processing, it is desirable that when linear processing is applied to the image data, the linear processing be applied before the gamma correction. The movement blur removal processing by the movement blur removing unit 154 is linear processing.

The gamma correction unit 155 supplies the gamma-corrected image data to an image quality adjustment unit 156.

The image quality adjustment unit 156 applies processing for visually improving the image, for example contour correction processing and other image quality adjustment processing to the image data, and then supplies the image data adjusted in image quality to a color space conversion unit 157.

The color space conversion unit 157 converts a color space according to an output format of the image data (for example determines the position of chromaticity coordinates of three primary color points in a color space), and then outputs the color space-converted image data.

Figure 5:
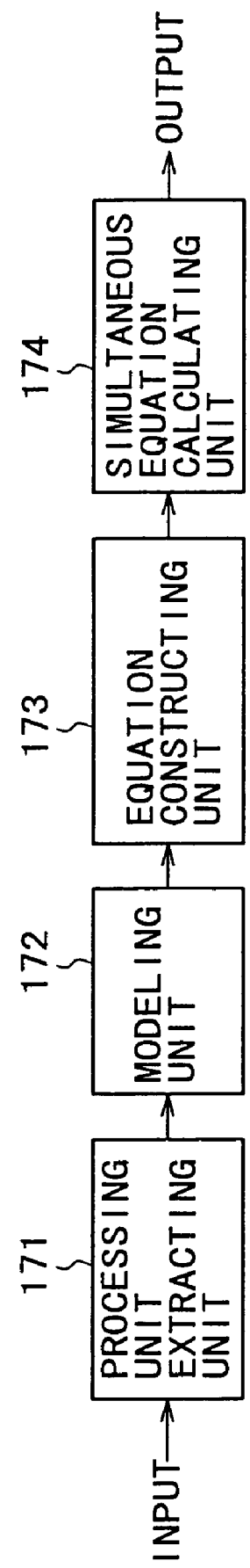
FIG. 5 is a block diagram showing a functional configuration of a movement blur removing unit 154.

FIG. 5 is a block diagram showing a functional configuration of the movement blur removing unit 154.

A processing unit extracting unit 171 extracts a processing unit comprising predetermined pixels of the image data in correspondence with timing of electronic shutters of the CCD 102 or the like. The processing unit extracting unit 171 supplies the extracted processing unit to a modeling unit 172.

The modeling unit 172 generates a model on the basis of the processing unit supplied from the processing unit extracting unit 171, and then supplies the processing unit together with the generated model to an equation constructing unit 173. The model generated by the modeling unit 172 for example indicates the number of pixels of the image data generated as a result of removing movement blur and the number of pixels included in the processing unit.

The equation constructing unit 173 constructs equations as simultaneous equations for calculating pixel values of the image data free from movement blur on the basis of the model and the processing unit supplied from the modeling unit 172. The equation constructing unit 173 supplies the constructed equations to a simultaneous equation calculating unit 174.

The simultaneous equation calculating unit 174 solves the equations supplied from the equation constructing unit 173, thereby calculates the pixel values of the image data free from movement blur, and then outputs the calculated pixel values of the image data.

The movement blur of the image data will be described with reference to FIGS. 6 to 11.

Figure 6:
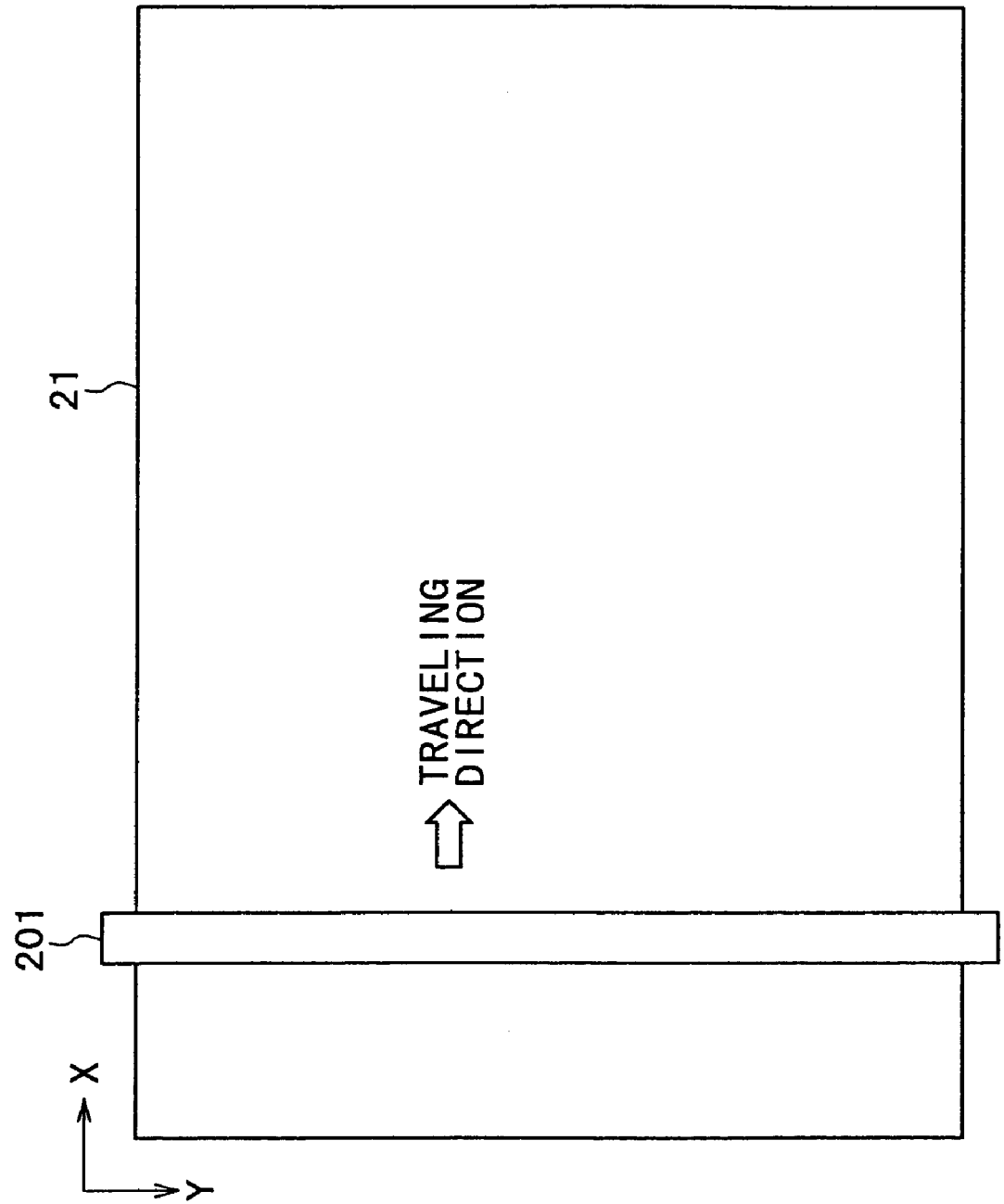
FIG. 6 is a diagram schematically showing a relation between a CCD 201 of a conventional scanner and an original 21.
Figure 7:
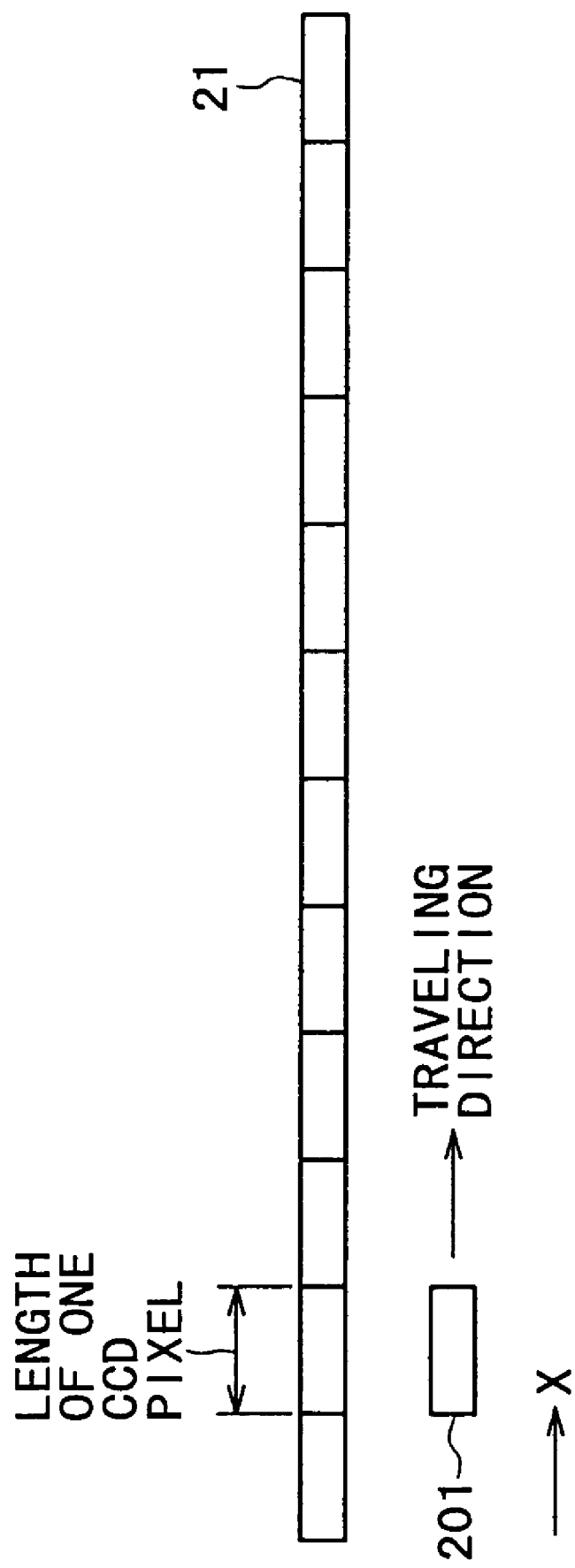
FIG. 7 is a diagram schematically showing a relation between the CCD 201 of the conventional scanner and the original 21.

FIG. 6 and FIG. 7 are diagrams schematically showing a relation between a CCD 201 of a conventional scanner and an original 21.

The CCD 201 has detecting elements arranged in one line.

As shown in FIG. 6, when the CCD 201 obtains an image of the original 21, the CCD 201 moves relative to a surface showing the image of the original 21 in parallel with the surface in one predetermined direction. When the surface showing the image of the original 21 corresponds to an x-axis and a y-axis, for example, the CCD 201 moves in a direction of the x-axis. (In practice, when obtaining the image of the original 21, a reading area of the CCD 201 moves on the surface showing the image of the original 21 relative to the original 21 in one predetermined direction.)

As shown in FIG. 7, the CCD 201 obtains an image of the original 21 in correspondence with length of one pixel of a photodiode or the like in a traveling direction.

Figure 8:
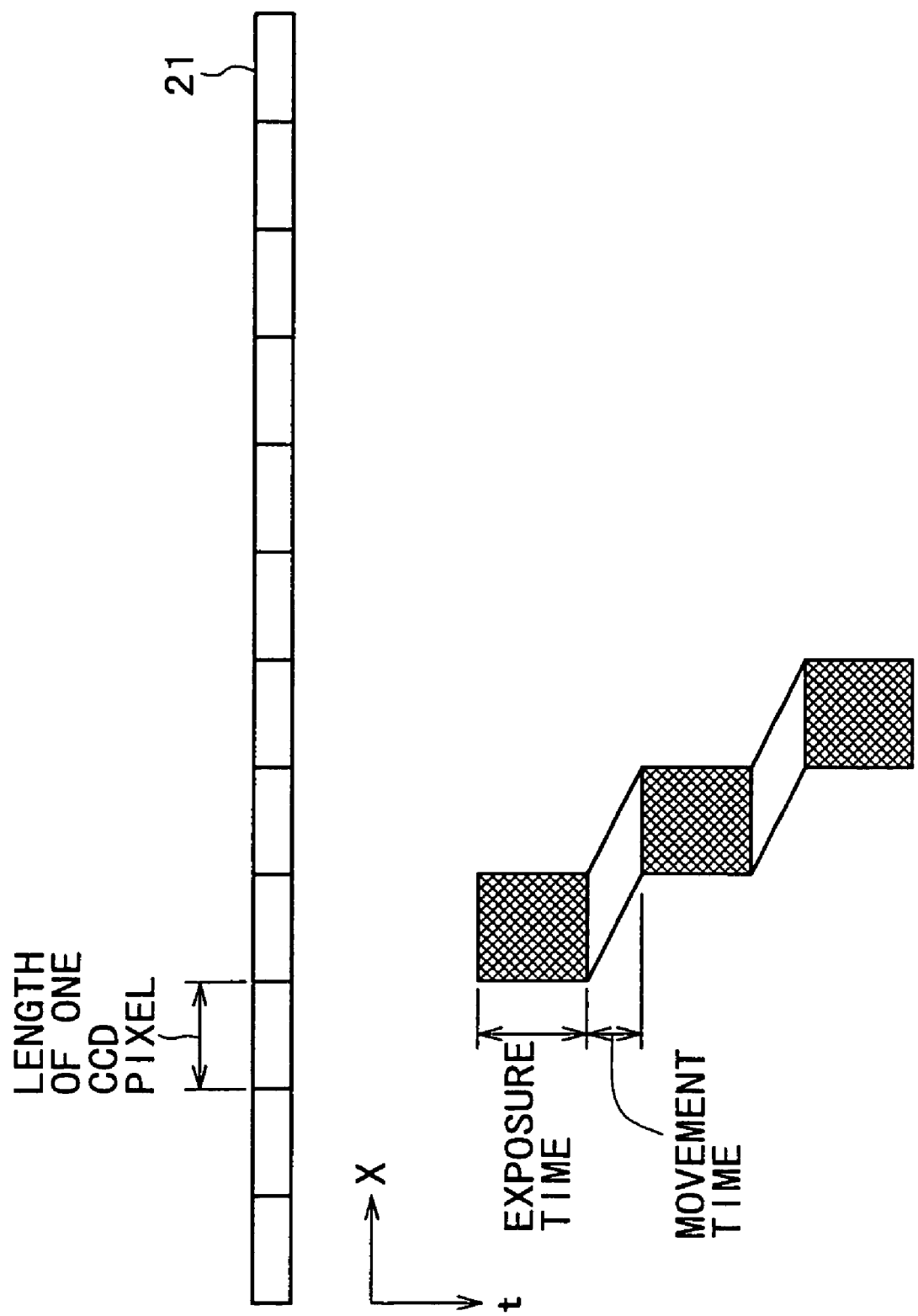
FIG. 8 is a diagram of assistance in explaining movement blur.
Figure 9:
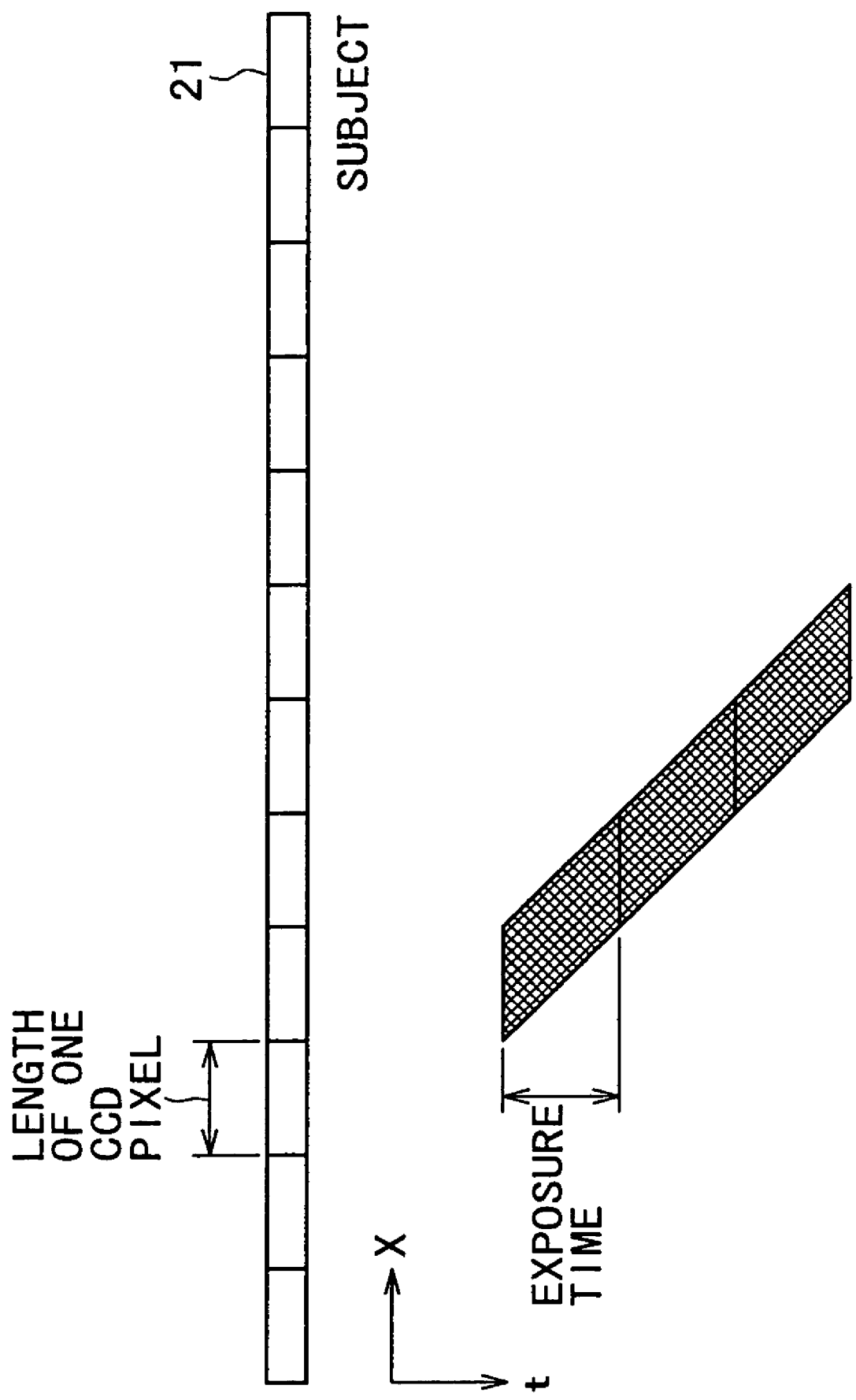
FIG. 9 is a diagram of assistance in explaining movement blur.

FIG. 8 and FIG. 9 are diagrams of assistance in explaining movement blur.

When the CCD 201 repeats a movement and stop for each length of one pixel and performs reading (accumulation of charge in photodiodes) during a stop, the read image does not include movement blur, as shown in FIG. 8.

However, such a reading method is not practical because reading cannot be performed during a time of movement and therefore an enormous amount of time is required to read the original 21.

On the other hand, when the CCD 201 moves at a constant speed relative to the original 21, as shown in FIG. 9, the CCD 201 moves even during a time when the CCD 201 accumulates charge in the photodiodes (exposure time) and hence the CCD 201 reads, as an image corresponding to one pixel, a larger area of the original as compared with the length of one pixel of the CCD.

In such a case, movement blur can be reduced by shortening the charge accumulation time. In general, however, the shortening of the charge accumulation time lowers S/N of the image data, and therefore the accumulation time is made as long as possible.

Since the relative position of the CCD 201 and the original 21 is changed at all times, it is considered that instead of reading data for one pixel in one shutter operation, components of adjacent pixels are mixed with each other. It may be said, however, that considering the fact that a normal CCD performs processing for mixing components of adjacent pixels with each other by an optical low-pass filter to prevent folding, the mixing to some extent of adjacent pixels with each other as a result of movement blur doest not present a problem.

However, when the extent of the mixing of adjacent pixels with each other is to be limited, the traveling speed of the CCD 201 needs to be limited at the same time, and therefore high-speed reading becomes difficult.

Figure 10:
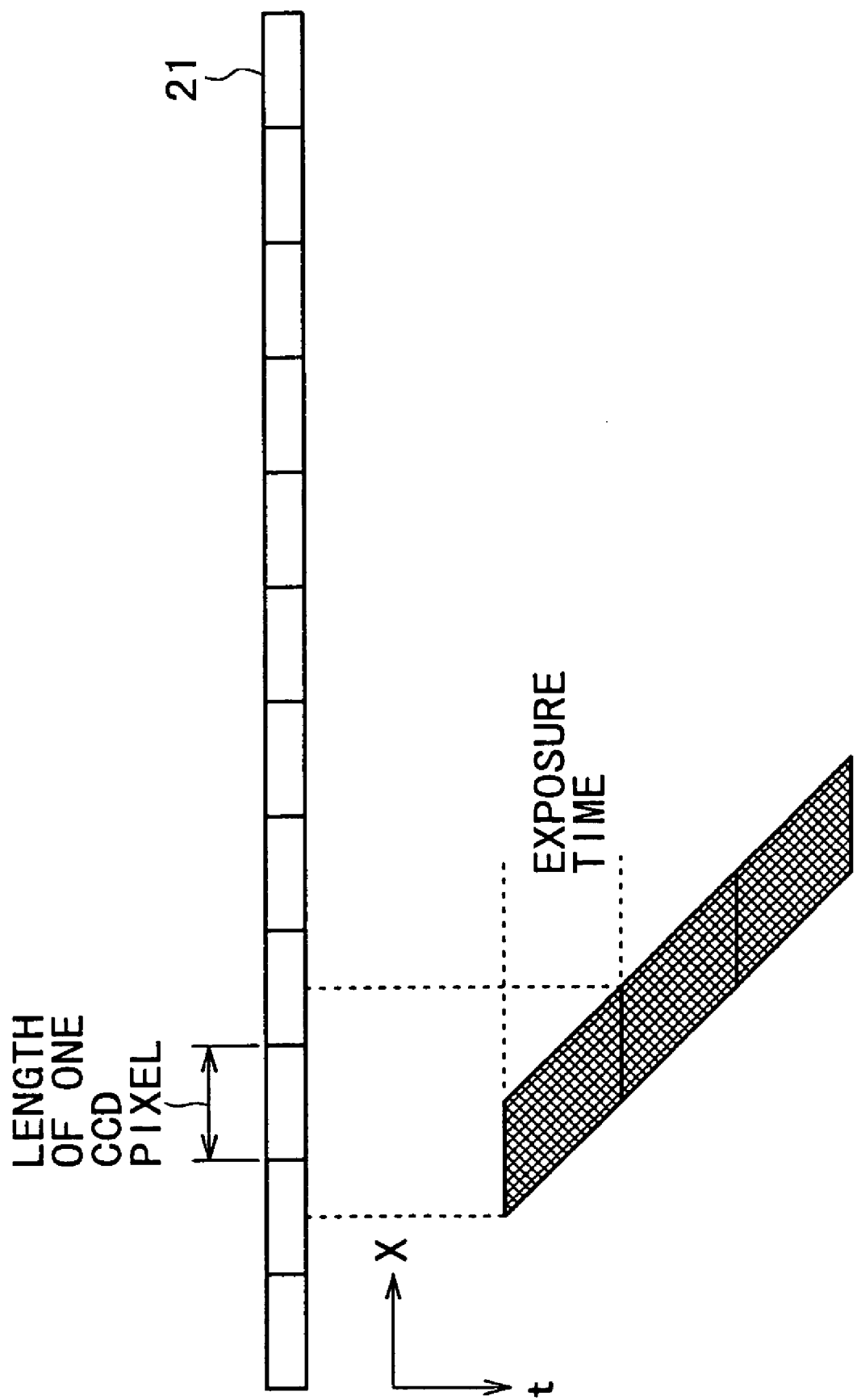
FIG. 10 is a diagram of assistance in explaining change in an amount of movement blur.
Figure 11:
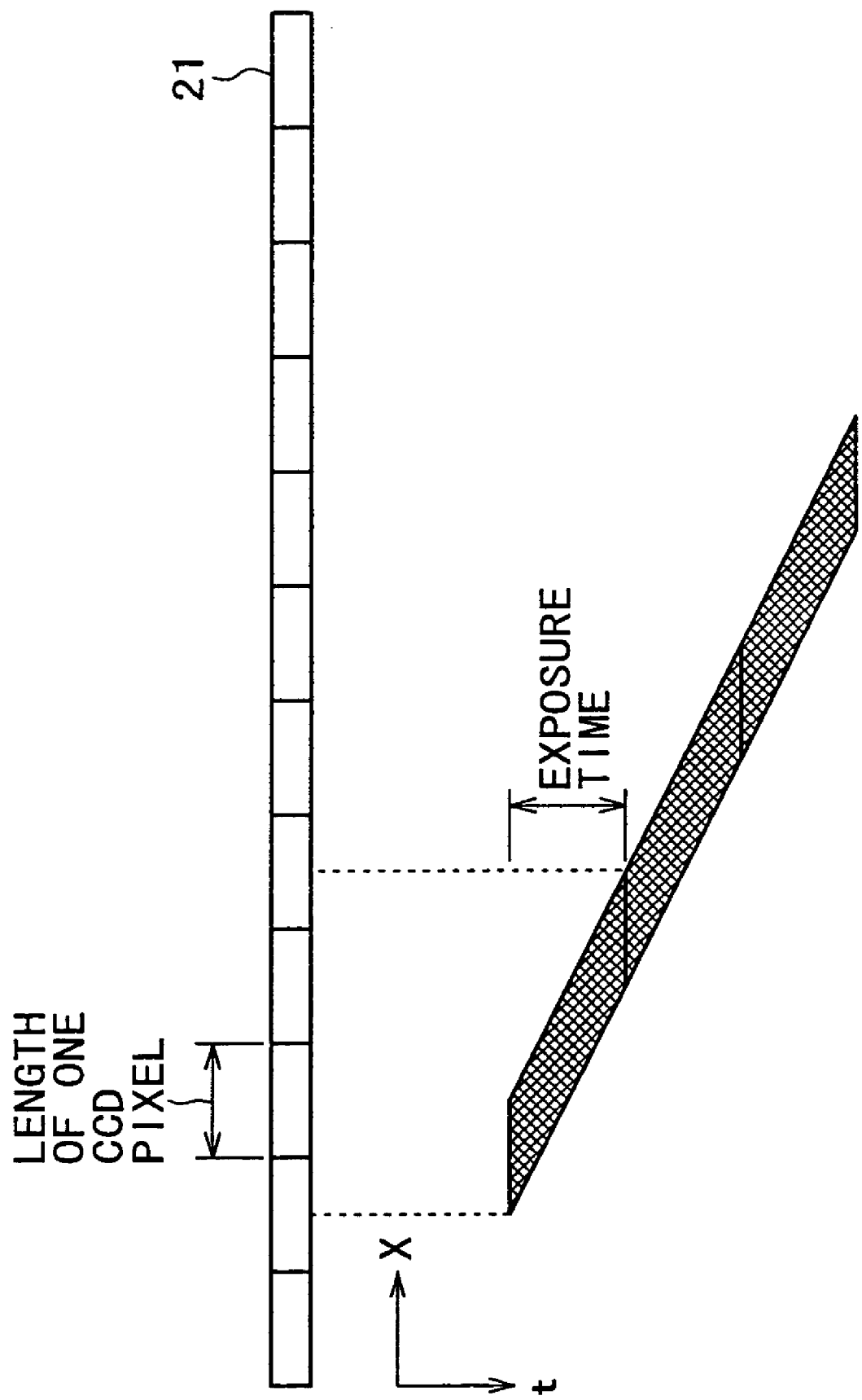
FIG. 11 is a diagram of assistance in explaining change in the amount of movement blur.

FIG. 10 and FIG. 11 are diagrams of assistance in explaining change in an amount of movement blur which change corresponds to change in relative speed between the CCD 201 and the original 21.

When length of a read area of the original which length corresponds to movement in an exposure time is twice length of one pixel of the CCD, a pixel value of image data corresponding to one pixel of the CCD covers an image of an area of twice the length of one pixel of the CCD in the direction of the x-axis, as shown in FIG. 10.

Similarly, when length of a read area of the original which length corresponds to movement in an exposure time is three times the length of one pixel of the CCD, a pixel value of image data corresponding to one pixel of the CCD covers an image of an area of three times the length of one pixel of the CCD in the direction of the x-axis, as shown in FIG. 11.

The image reading apparatus according to the present invention removes movement blur from image data. Thereby, even when the CCD 201 moves relative to the original 21 at a constant speed and length of a read area of the original which length corresponds to movement in an exposure time is longer than the length of one pixel of the CCD, the image reading apparatus according to the present invention provides a pixel value of an area of the original which area corresponds to the length of one pixel of the CCD.

Image signals outputted by the CCD 102 of the image reading apparatus according to the present invention will next be described with reference to FIG. 12 and FIG. 13.

Figure 12:
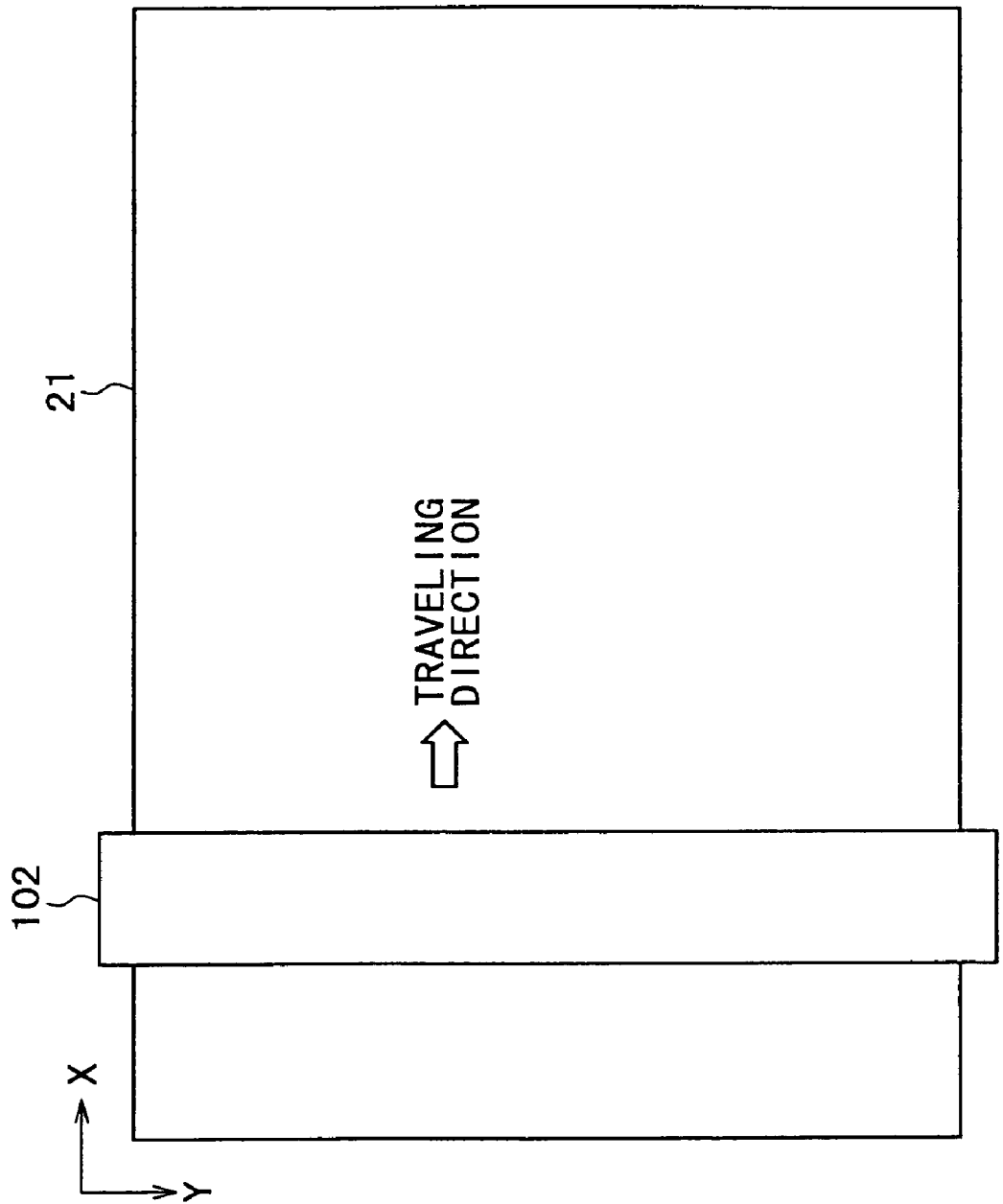
FIG. 12 is a diagram schematically showing a relation between a CCD 102 of a scanner according to the present invention and an original 21.
Figure 13:
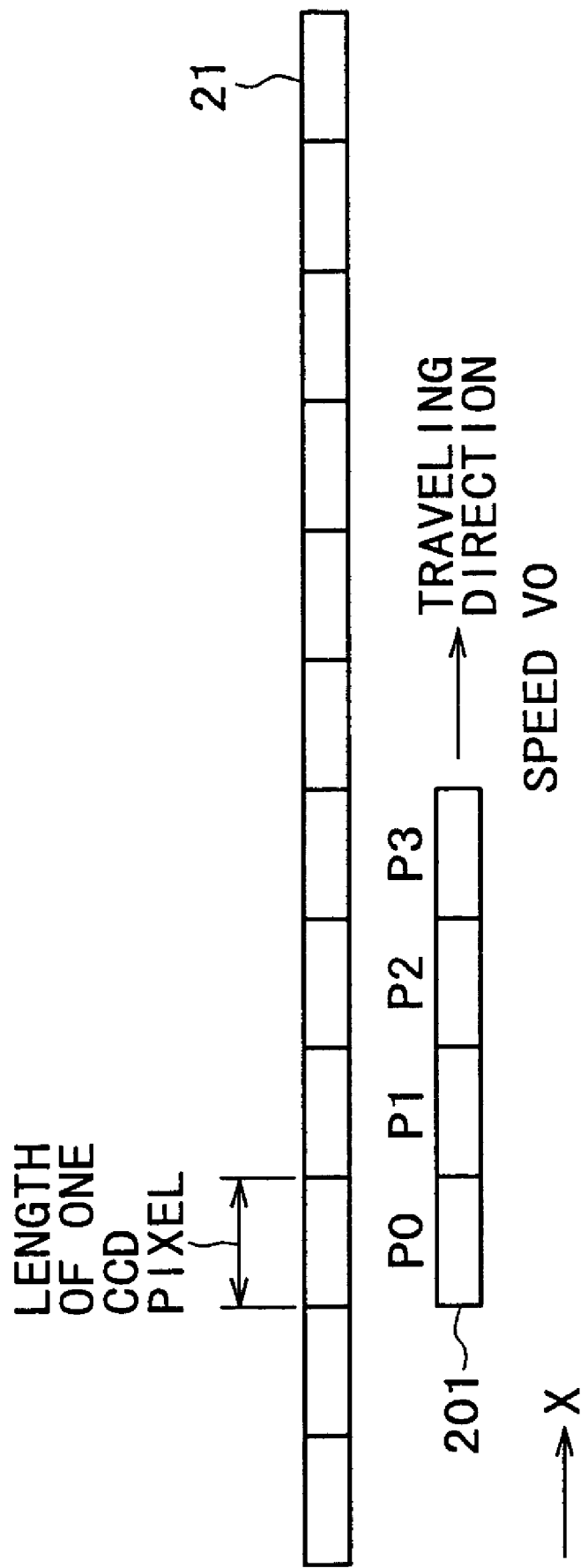
FIG. 13 is a diagram schematically showing a relation between the CCD 102 of the scanner according to the present invention and the original 21.

FIG. 12 and FIG. 13 are diagrams schematically showing a relation between the CCD 102 of the scanner according to the present invention and an original 21.

The CCD 201 has elements such as photodiodes arranged in four lines in the direction of movement relative to the original 21.

As shown in FIG. 12, when the CCD 102 obtains an image of the original 21, the CCD 102 moves relative to a surface showing the image of the original 21 in parallel with the surface in one predetermined direction. When the surface showing the image of the original 21 corresponds to an x-axis and a y-axis, for example, the CCD 102 moves in a direction of the x-axis. (In practice, when obtaining the image of the original 21, a reading area of the CCD 102 moves on the surface showing the image of the original 21 relative to the original 21 in one predetermined direction.)

The direction of the x-axis corresponds to the direction of the relative movement.

As shown in FIG. 13, the CCD 102 moves at a speed v0 in a traveling direction indicated by an arrow in the figure. The CCD 102 obtains an image of the original 21 in correspondence with length of one pixel of the photodiodes or the like arranged in four columns in the traveling direction. For example, the CCD 102 obtains the image of the original 21 in each of a pixel P0, a pixel P1, a pixel P2, and a pixel P3.

Figure 14:
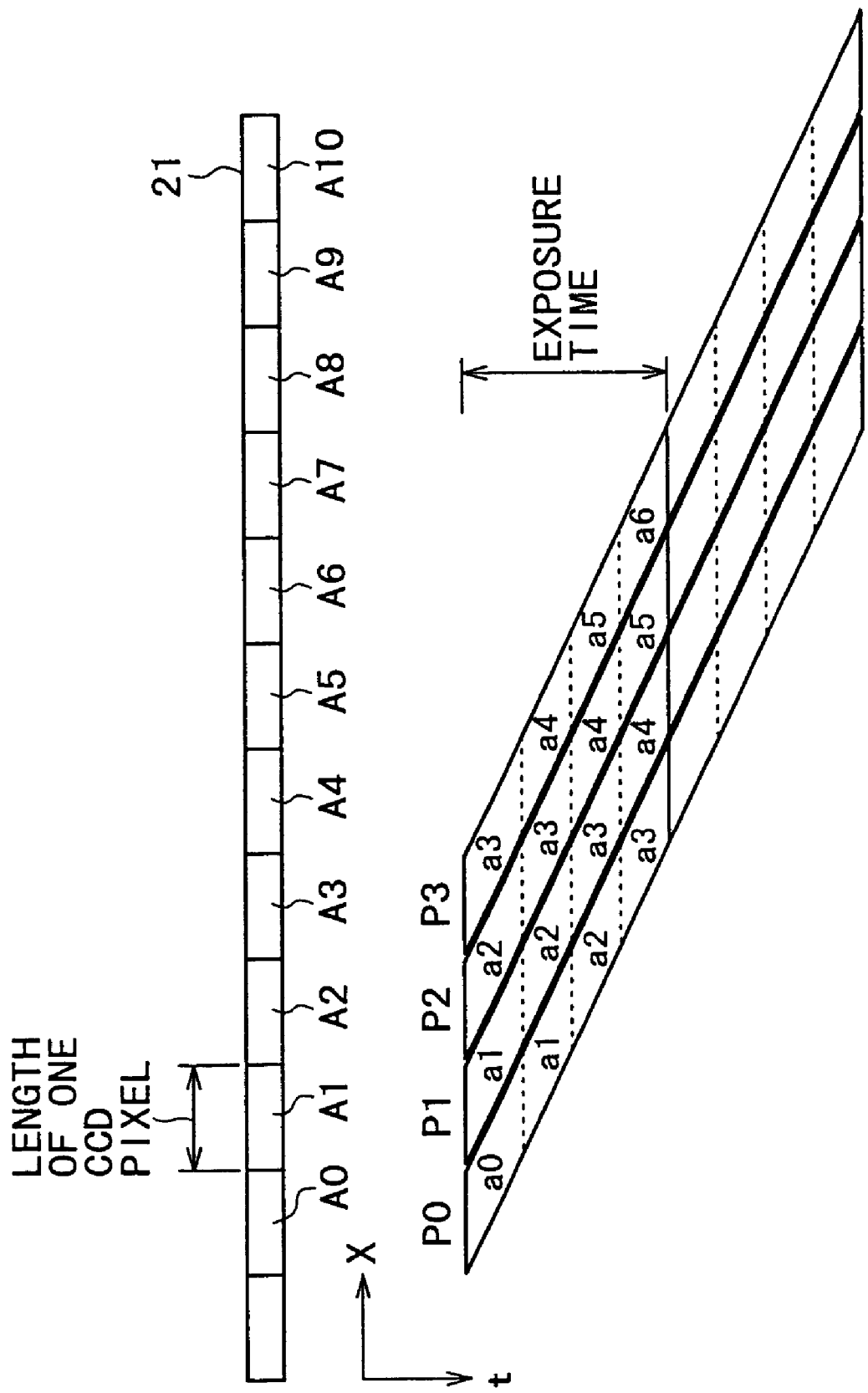
FIG. 14 is a diagram of assistance in explaining signals outputted by the CD 102.

FIG. 14 is a diagram of assistance in explaining signals outputted by the CCD 102 when length of a read area of the original 21 moved in an exposure time is four times the length of one pixel of a photodiode or the like.

Each of image areas A0 to A10 of the original 21 in FIG. 14 corresponds to length of one pixel of the CCD 102. The image areas of the original 21 which areas each correspond to the length of one pixel of the CCD 102 are represented with consecutive numbers as A0, A1, A2 to An.

A signal corresponding to the pixel P0 of the CCD 102 covers an image of a read area of the original 21 which area is of four times the length of one pixel of the CCD 102. Each of signals corresponding to the pixels P1 to P3 of the CCD 102 covers an image of a read area of the original 21 which area is of four times the length of one pixel of the CCD 102.

For example, when the pixel P0 of the CCD 102 starts exposure at the image area A0 of the original 21 and ends the exposure at the image area A3 of the original 21, the signal corresponding to the pixel P0 of the CCD 102 (corresponding to a pixel value in image data) includes components a0 to a3 of the images A0 to A3, respectively, of the original 21. The components of the images correspond to pixel components.

When the pixel P1 of the CCD 102 starts exposure at the image area A1 of the original 21 and ends the exposure at the image area A4 of the original 21, the signal corresponding to the pixel P1 of the CCD 102 (corresponding to a pixel value in image data) includes components a1 to a4 of the images A1 to A4, respectively, of the original 21.

When the pixel P2 of the CCD 102 starts exposure at the image area A2 of the original 21 and ends the exposure at the image area A5 of the original 21, the signal corresponding to the pixel P2 of the CCD 102 (corresponding to a pixel value in image data) includes components a2 to a5 of the images A2 to A5, respectively, of the original 21.

When the pixel P3 of the CCD 102 starts exposure at the image area A3 of the original 21 and ends the exposure at the image area A6 of the original 21, the signal corresponding to the pixel P3 of the CCD 102 (corresponding to a pixel value in image data) includes components a3 to a6 of the images A3 to A6, respectively, of the original 21.

The movement blur removal processing will next be described with reference to FIGS. 15 to 18.

Figure 15:
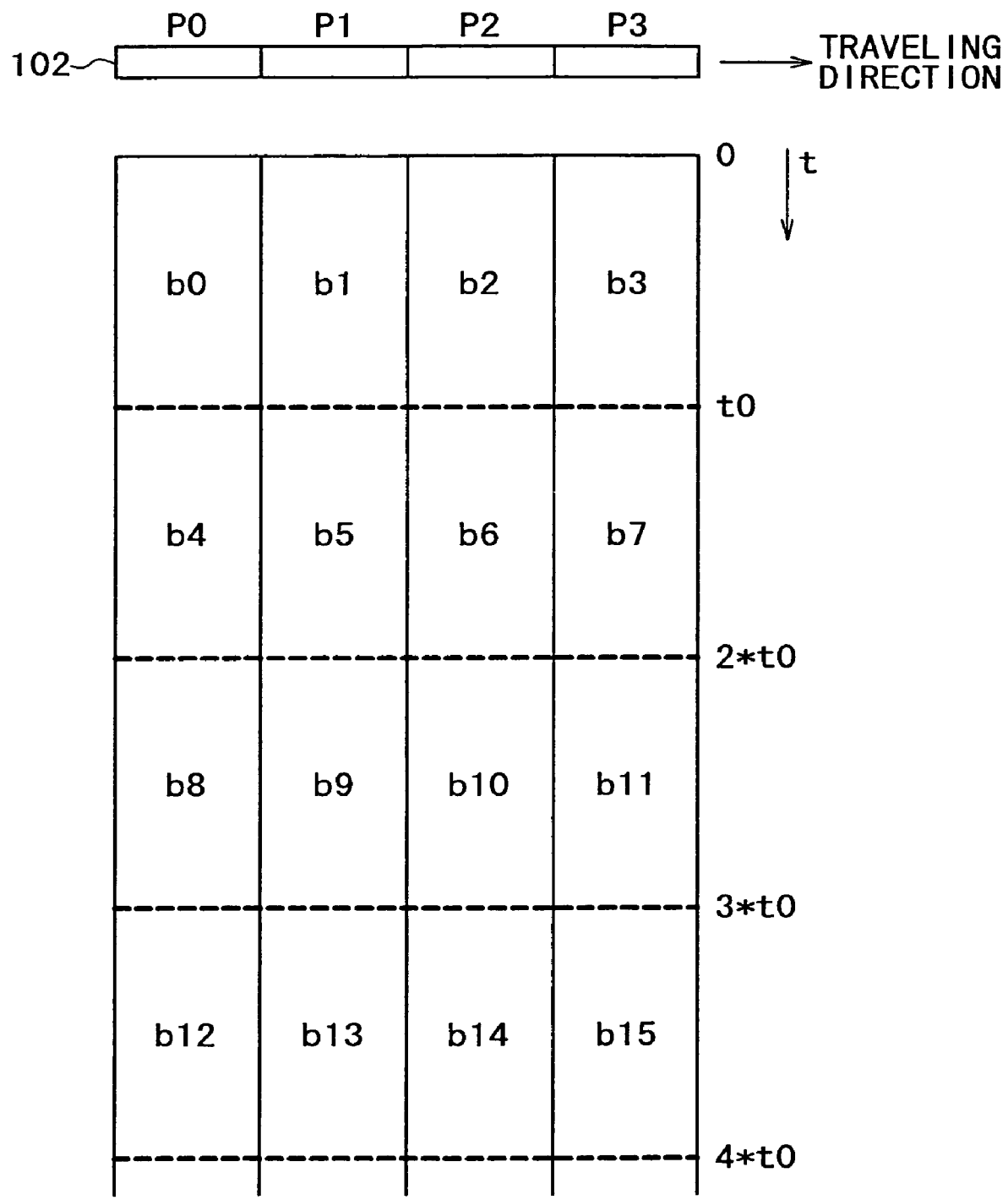
FIG. 15 is a diagram of assistance in explaining signals outputted by the CD 102.

FIG. 15 is a diagram of assistance in explaining signals outputted by the CCD 102.

Letting t0 be an exposure time, in an exposure time t0 from a time 0 to a time t0, a signal corresponding to the pixel P0 of the CCD 102 is b0; a signal corresponding to the pixel P1 of the CCD 102 is b1; a signal corresponding to the pixel P2 of the CCD 102 is b2; and a signal corresponding to the pixel P3 of the CCD 102 is b3.

Letting t0 be an exposure time, in an exposure time t0 from the time t0 to a time 2*t0 (time at which twice t0 passes from the time 0), a signal corresponding to the pixel P0 of the CCD 102 is b4; a signal corresponding to the pixel P1 of the CCD 102 is b5; a signal corresponding to the pixel P2 of the CCD 102 is b6; and a signal corresponding to the pixel P3 of the CCD 102 is b7.

Letting t0 be an exposure time, in an exposure time t0 from the time 2*t0 to a time 3*t0 (time at which three times t0 passes from the time 0), a signal corresponding to the pixel P0 of the CCD 102 is b8; a signal corresponding to the pixel P1 of the CCD 102 is b9; a signal corresponding to the pixel P2 of the CCD 102 is b10; and a signal corresponding to the pixel P3 of the CCD 102 is b11.

Similarly, letting t0 be an exposure time, in an exposure time t0 from the time 3*t0 to a time 4*t0 (time at which four times t0 passes from the time 0), a signal corresponding to the pixel P0 of the CCD 102 is b12; a signal corresponding to the pixel P1 of the CCD 102 is b13; a signal corresponding to the pixel P2 of the CCD 102 is b14; and a signal corresponding to the pixel P3 of the CCD 102 is b15.

The times t0, 2*t0, 3*t0, and 4*t0 in FIG. 15 correspond to timing of transmission of charge accumulated in the CCD 102. The transmission time is sufficiently short as compared with the exposure time.

Figure 16:
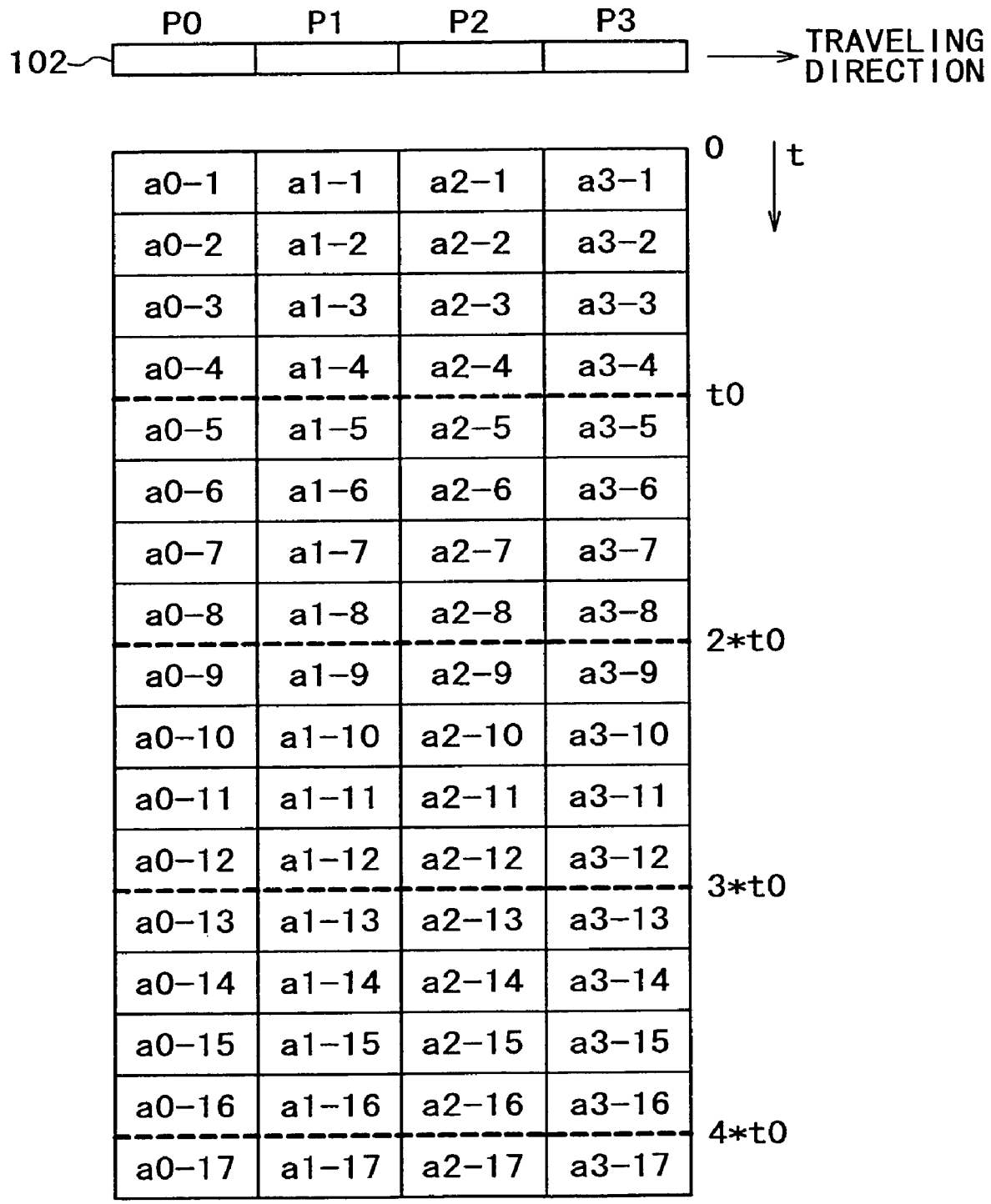
FIG. 16 is a diagram showing an example of image components included in the signals outputted by the CCD 102 when the CCD 102 stands still.

FIG. 16 is a diagram showing an example of image components included in the signals outputted by the CCD 102 when the CCD 102 stands still with the pixel p0 corresponding to the area a0.

Consideration will be given to dividing the exposure time into four equal lengths. A divided period of the exposure time corresponds to a divided unit time.

In a first period of the four divided periods of the exposure time t0 from the time 0 to the time t0, the pixel P0 of the CCD 102 is reading the image area A0 of the original 21. Therefore the signal b0 corresponding to the pixel P0 of the CCD 102 in the first period of the four divided periods includes an image component a0-1 corresponding to the image area A0 of the original 21.

The CCD 102 stands still and in a second period of the four divided periods of the exposure time t0 from the time 0 to the time t0, the pixel P0 of the CCD 102 is reading the image area A0 of the original 21. Therefore the signal b0 corresponding to the pixel P0 of the CCD 102 in the second period of the four divided periods includes an image component a0-2 corresponding to the image area A0 of the original 21.

The CCD 102 stands still and in a third period of the four divided periods of the exposure time t0 from the time 0 to the time t0, the pixel P0 of the CCD 102 is reading the image area A0 of the original 21. Therefore the signal b0 corresponding to the pixel P0 of the CCD 102 in the third period of the four divided periods includes an image component a0-3 corresponding to the image area A0 of the original 21.

The CCD 102 stands still and in a fourth period of the four divided periods of the exposure time t0 from the time 0 to the time t0, the pixel P0 of the CCD 102 is reading the image area A0 of the original 21. Therefore the signal b0 corresponding to the pixel P0 of the CCD 102 in the fourth period of the four divided periods includes an image component a0-4 corresponding to the image area A0 of the original 21.

Similarly, because the CCD 102 stands still, the signal b4 corresponding to the pixel P0 of the CCD 102 includes image components a0-5 to a0-8 corresponding to the image area A0 of the original 21. Because the CCD 102 stands still, the signal b8 corresponding to the pixel P0 of the CCD 102 includes image components a0-9 to a0-12 corresponding to the image area A0 of the original 21. Because the CCD 102 stands still, the signal b12 corresponding to the pixel P0 of the CCD 102 includes image components a0-13 to a0-16 corresponding to the image area A0 of the original 21.

Because the CCD 102 stands still, the signals corresponding to the pixel P0 of the CCD 102 comprise only the image components corresponding to the image area A0 of the original 21.

In the first period of the four divided periods of the exposure time t0 from the time 0 to the time t0, the pixel P1 of the CCD 102 is reading the image area A1 of the original 21. Therefore the signal b1 corresponding to the pixel P1 of the CCD 102 in the first period of the four divided periods includes an image component a1-1 corresponding to the image area A1 of the original 21.

The CCD 102 stands still and in the second period of the four divided periods of the exposure time t0 from the time 0 to the time t0, the pixel P1 of the CCD 102 is reading the image area A1 of the original 21. Therefore the signal b1 corresponding to the pixel P1 of the CCD 102 in the second period of the four divided periods includes an image component a1-2 corresponding to the image area A1 of the original 21.

The CCD 102 stands still and in the third period of the four divided periods of the exposure time t0 from the time 0 to the time t0, the pixel P1 of the CCD 102 is reading the image area A1 of the original 21. Therefore the signal b1 corresponding to the pixel P1 of the CCD 102 in the third period of the four divided periods includes an image component a1-3 corresponding to the image area A1 of the original 21.

The CCD 102 stands still and in the fourth period of the four divided periods of the exposure time t0 from the time 0 to the time t0, the pixel P1 of the CCD 102 is reading the image area A1 of the original 21. Therefore the signal b1 corresponding to the pixel P1 of the CCD 102 in the fourth period of the four divided periods includes an image component a1-4 corresponding to the image area A1 of the original 21.

Similarly, because the CCD 102 stands still, the signal b5 corresponding to the pixel P1 of the CCD 102 includes image components a1-5 to a1-8 corresponding to the image area A1 of the original 21. Because the CCD 102 stands still, the signal b9 corresponding to the pixel P1 of the CCD 102 includes image components a1-9 to a1-12 corresponding to the image area A1 of the original 21. Because the CCD 102 stands still, the signal b13 corresponding to the pixel P1 of the CCD 102 includes image components a1-13 to a1-16 corresponding to the image area A1 of the original 21.

Because the CCD 102 stands still, the signals corresponding to the pixel P1 of the CCD 102 comprise only the image components corresponding to the image area A1 of the original 21.

In the first period of the four divided periods of the exposure time t0 from the time 0 to the time t0, the pixel P2 of the CCD 102 is reading the image area A2 of the original 21. Therefore the signal b2 corresponding to the pixel P2 of the CCD 102 in the first period of the four divided periods includes an image component a2-1 corresponding to the image area A2 of the original 21.

The CCD 102 stands still and in the second period of the four divided periods of the exposure time t0 from the time 0 to the time t0, the pixel P2 of the CCD 102 is reading the image area A2 of the original 21. Therefore the signal b2 corresponding to the pixel P2 of the CCD 102 in the second period of the four divided periods includes an image component a2-2 corresponding to the image area A2 of the original 21.

The CCD 102 stands still and in the third period of the four divided periods of the exposure time t0 from the time 0 to the time t0, the pixel P2 of the CCD 102 is reading the image area A2 of the original 21. Therefore the signal b2 corresponding to the pixel P2 of the CCD 102 in the third period of the four divided periods includes an image component a2-3 corresponding to the image area A2 of the original 21.

The CCD 102 stands still and in the fourth period of the four divided periods of the exposure time t0 from the time 0 to the time t0, the pixel P2 of the CCD 102 is reading the image area A2 of the original 21. Therefore the signal b2 corresponding to the pixel P2 of the CCD 102 in the fourth period of the four divided periods includes an image component a2-4 corresponding to the image area A2 of the original 21.

Similarly, because the CCD 102 stands still, the signal b6 corresponding to the pixel P2 of the CCD 102 includes image components a2-5 to a2-8 corresponding to the image area A2 of the original 21. Because the CCD 102 stands still, the signal b10 corresponding to the pixel P2 of the CCD 102 includes image components a2-9 to a2-12 corresponding to the image area A2 of the original 21. Because the CCD 102 stands still, the signal b14 corresponding to the pixel P2 of the CCD 102 includes image components a2-13 to a2-16 corresponding to the image area A2 of the original 21.

Because the CCD 102 stands still, the signals corresponding to the pixel P2 of the CCD 102 comprise only the image components corresponding to the image area A2 of the original 21.

In the first period of the four divided periods of the exposure time t0 from the time 0 to the time t0, the pixel P3 of the CCD 102 is reading the image area A3 of the original 21. Therefore the signal b3 corresponding to the pixel P3 of the CCD 102 in the first period of the four divided periods includes an image component a3-1 corresponding to the image area A3 of the original 21.

The CCD 102 stands still and in the second period of the four divided periods of the exposure time t0 from the time 0 to the time t0, the pixel P3 of the CCD 102 is reading the image area A3 of the original 21. Therefore the signal b3 corresponding to the pixel P3 of the CCD 102 in the second period of the four divided periods includes an image component a3-2 corresponding to the image area A3 of the original 21.

The CCD 102 stands still and in the third period of the four divided periods of the exposure time t0 from the time 0 to the time t0, the pixel P3 of the CCD 102 is reading the image area A3 of the original 21. Therefore the signal b3 corresponding to the pixel P3 of the CCD 102 in the third period of the four divided periods includes an image component a3-3 corresponding to the image area A3 of the original 21.

The CCD 102 stands still and in the fourth period of the four divided periods of the exposure time t0 from the time 0 to the time t0, the pixel P3 of the CCD 102 is reading the image area A3 of the original 21. Therefore the signal b3 corresponding to the pixel P3 of the CCD 102 in the fourth period of the four divided periods includes an image component a3-4 corresponding to the image area A3 of the original 21.

Similarly, because the CCD 102 stands still, the signal b7 corresponding to the pixel P3 of the CCD 102 includes image components a3-5 to a3-8 corresponding to the image area A3 of the original 21. Because the CCD 102 stands still, the signal b11 corresponding to the pixel P3 of the CCD 102 includes image components a3-9 to a3-12 corresponding to the image area A3 of the original 21. Because the CCD 102 stands still, the signal b15 corresponding to the pixel P3 of the CCD 102 includes image components a3-13 to a3-16 corresponding to the image area A3 of the original 21.

Because the CCD 102 stands still, the signals corresponding to the pixel P3 of the CCD 102 comprise only the image components corresponding to the image area A3 of the original 21.

Figure 17:
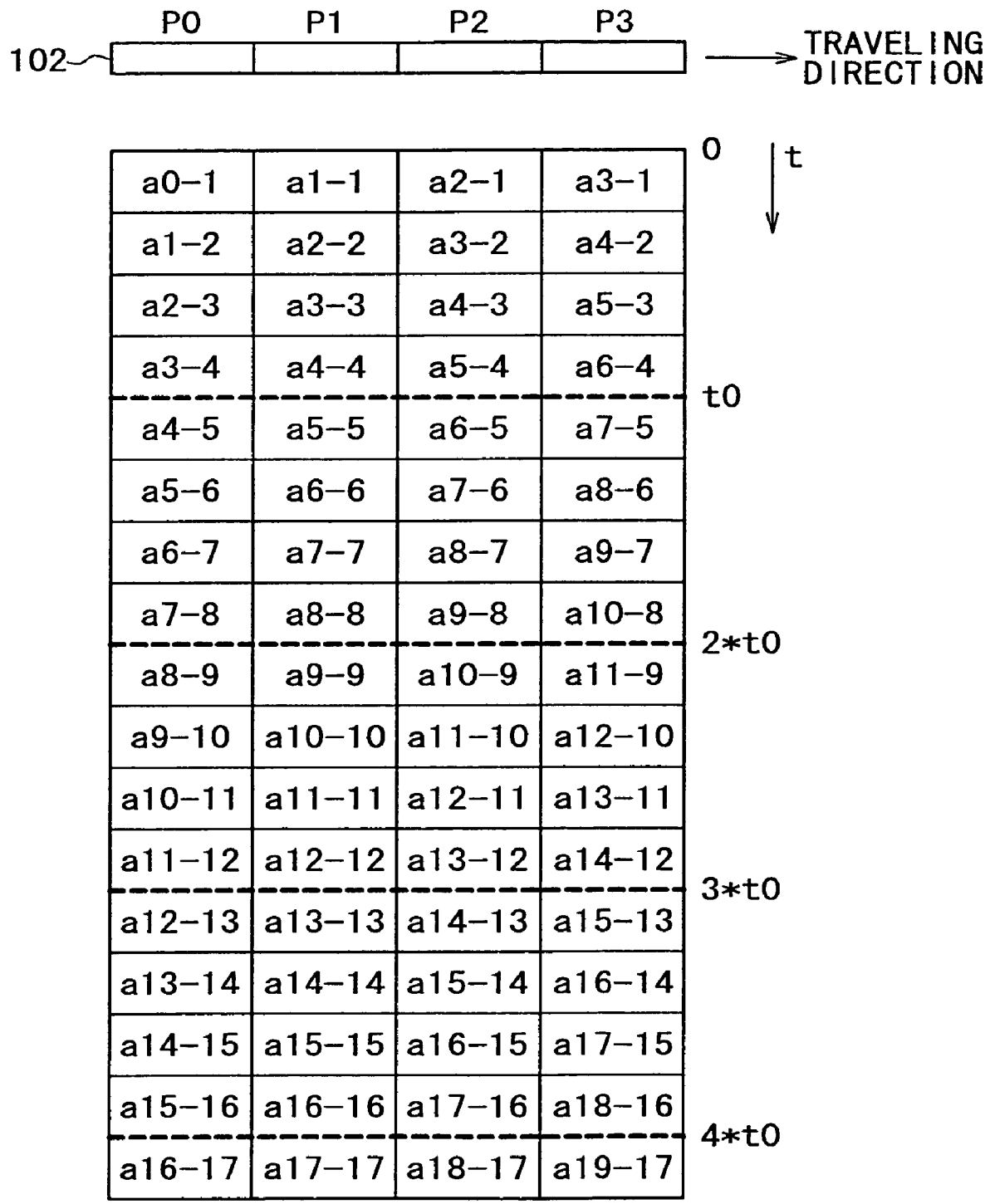
FIG. 17 is a diagram showing an example of image components included in the signals outputted by the CCD 102 when the CCD 102 moves.

On the other hand, FIG. 17 is a diagram showing an example of image components included in the signals outputted by the CCD 102 when length of a read area of the original 21 which length corresponds to movement in an exposure time is four times the length of one pixel of the CCD 102.

As in FIG. 16, consideration will be given to dividing the exposure time into four equal lengths.

In a first period of the four divided periods of the exposure time t0 from the time 0 to the time t0, the pixel P0 of the CCD 102 is reading the image area A0 of the original 21. Therefore the signal b0 corresponding to the pixel P0 of the CCD 102 in the first period of the four divided periods includes an image component a0-1 corresponding to the image area A0 of the original 21.

The CCD 102 moves relative to the original 21 and in a second period of the four divided periods of the exposure time t0 from the time 0 to the time t0, the pixel P0 of the CCD 102 is reading the image area A1 of the original 21. Therefore the signal b0 corresponding to the pixel P0 of the CCD 102 in the second period of the four divided periods includes an image component a1-2 corresponding to the image area A1 of the original 21.

The CCD 102 moves relative to the original 21 and in a third period of the four divided periods of the exposure time t0 from the time 0 to the time t0, the pixel P0 of the CCD 102 is reading the image area A2 of the original 21. Therefore the signal b0 corresponding to the pixel P0 of the CCD 102 in the third period of the four divided periods includes an image component a2-3 corresponding to the image area A2 of the original 21.

The CCD 102 moves relative to the original 21 and in a fourth period of the four divided periods of the exposure time t0 from the time 0 to the time t0, the pixel P0 of the CCD 102 is reading the image area A3 of the original 21. Therefore the signal b0 corresponding to the pixel P0 of the CCD 102 in the fourth period of the four divided periods includes an image component a3-4 corresponding to the image area A3 of the original 21.

Similarly, because the CCD 102 moves relative to the original 21, the signal b4 corresponding to the pixel P0 of the CCD 102 includes image components a4-5 to a7-8 corresponding to the image areas A4 to A7 of the original 21. Because the CCD 102 moves relative to the original 21, the signal b8 corresponding to the pixel P0 of the CCD 102 includes image components a8-9 to a11-12 corresponding to the image areas A8 to A11 of the original 21. Because the CCD 102 moves relative to the original 21, the signal b12 corresponding to the pixel P0 of the CCD 102 includes image components a12-13 to a15-16 corresponding to the image areas A12 to A15 of the original 21.

Thus, because the CCD 102 moves relative to the original 21, the signals corresponding to the pixel P0 of the CCD 102 comprise different image components corresponding to different areas of the image of the original 21.

In the first period of the four divided periods of the exposure time t0 from the time 0 to the time t0, the pixel P1 of the CCD 102 is reading the image area A1 of the original 21. Therefore the signal b1 corresponding to the pixel P1 of the CCD 102 in the first period of the four divided periods includes an image component a1-1 corresponding to the image area A1 of the original 21.

The CCD 102 moves relative to the original 21 and in the second period of the four divided periods of the exposure time t0 from the time 0 to the time t0, the pixel P1 of the CCD 102 is reading the image area A2 of the original 21. Therefore the signal b1 corresponding to the pixel P1 of the CCD 102 in the second period of the four divided periods includes an image component a2-2 corresponding to the image area A2 of the original 21.

The CCD 102 moves relative to the original 21 and in a third period of the four divided periods of the exposure time t0 from the time 0 to the time t0, the pixel P1 of the CCD 102 is reading the image area A3 of the original 21. Therefore the signal b1 corresponding to the pixel P1 of the CCD 102 in the third period of the four divided periods includes an image component a3-3 corresponding to the image area A3 of the original 21.

The CCD 102 moves relative to the original 21 and in the fourth period of the four divided periods of the exposure time t0 from the time 0 to the time t0, the pixel P1 of the CCD 102 is reading the image area A4 of the original 21. Therefore the signal b1 corresponding to the pixel P1 of the CCD 102 in the fourth period of the four divided periods includes an image component a4-4 corresponding to the image area A4 of the original 21.

Similarly, because the CCD 102 moves relative to the original 21, the signal b5 corresponding to the pixel P1 of the CCD 102 includes image components a5-5 to a8-8 corresponding to the image areas A5 to A8 of the original 21. Because the CCD 102 moves relative to the original 21, the signal b9 corresponding to the pixel P1 of the CCD 102 includes image components a9-9 to a12-12 corresponding to the image areas A9 to A12 of the original 21. Because the CCD 102 moves relative to the original 21, the signal b13 corresponding to the pixel P1 of the CCD 102 includes image components a13-13 to a16-16 corresponding to the image areas A13 to A16 of the original 21.

Because the CCD 102 moves relative to the original 21, the signals corresponding to the pixel P1 of the CCD 102 comprise different image components corresponding to different areas of the image of the original 21.

In the first period of the four divided periods of the exposure time t0 from the time 0 to the time t0, the pixel P2 of the CCD 102 is reading the image area A2 of the original 21. Therefore the signal b2 corresponding to the pixel P2 of the CCD 102 in the first period of the four divided periods includes an image component a2-1 corresponding to the image area A2 of the original 21.

The CCD 102 moves relative to the original 21 and in the second period of the four divided periods of the exposure time t0 from the time 0 to the time t0, the pixel P2 of the CCD 102 is reading the image area A3 of the original 21. Therefore the signal b2 corresponding to the pixel P2 of the CCD 102 in the second period of the four divided periods includes an image component a3-2 corresponding to the image area A3 of the original 21.

The CCD 102 moves relative to the original 21 and in the third period of the four divided periods of the exposure time t0 from the time 0 to the time t0, the pixel P2 of the CCD 102 is reading the image area A4 of the original 21. Therefore the signal b2 corresponding to the pixel P2 of the CCD 102 in the third period of the four divided periods includes an image component a4-3 corresponding to the image area A4 of the original 21.

The CCD 102 moves relative to the original 21 and in the fourth period of the four divided periods of the exposure time t0 from the time 0 to the time t0, the pixel P2 of the CCD 102 is reading the image area A5 of the original 21. Therefore the signal b2 corresponding to the pixel P2 of the CCD 102 in the fourth period of the four divided periods includes an image component a5-4 corresponding to the image area A5 of the original 21.

Similarly, because the CCD 102 moves relative to the original 21, the signal b6 corresponding to the pixel P2 of the CCD 102 includes image components a6-5 to a9-8 corresponding to the image areas A6 to A9 of the original 21. Because the CCD 102 moves relative to the original 21, the signal b10 corresponding to the pixel P2 of the CCD 102 includes image components a10-9 to a13-12 corresponding to the image areas A10 to A13 of the original 21. Because the CCD 102 moves relative to the original 21, the signal b14 corresponding to the pixel P2 of the CCD 102 includes image components a14-13 to a17-16 corresponding to the image areas A14 to A17 of the original 21.

Because the CCD 102 moves relative to the original 21, the signals corresponding to the pixel P2 of the CCD 102 comprise different image components corresponding to different areas of the image of the original 21.

In the first period of the four divided periods of the exposure time t0 from the time 0 to the time t0, the pixel P3 of the CCD 102 is reading the image area A3 of the original 21. Therefore the signal b3 corresponding to the pixel P3 of the CCD 102 in the first period of the four divided periods includes an image component a3-1 corresponding to the image area A3 of the original 21.

The CCD 102 moves relative to the original 21 and in the second period of the four divided periods of the exposure time t0 from the time 0 to the time t0, the pixel P3 of the CCD 102 is reading the image area A4 of the original 21. Therefore the signal b3 corresponding to the pixel P3 of the CCD 102 in the second period of the four divided periods includes an image component a4-2 corresponding to the image area A4 of the original 21.

The CCD 102 moves relative to the original 21 and in the third period of the four divided periods of the exposure time t0 from the time 0 to the time t0, the pixel P3 of the CCD 102 is reading the image area A5 of the original 21. Therefore the signal b3 corresponding to the pixel P3 of the CCD 102 in the third period of the four divided periods includes an image component a5-3 corresponding to the image area A5 of the original 21.

The CCD 102 moves relative to the original 21 and in the fourth period of the four divided periods of the exposure time t0 from the time 0 to the time t0, the pixel P3 of the CCD 102 is reading the image area A6 of the original 21. Therefore the signal b3 corresponding to the pixel P3 of the CCD 102 in the fourth period of the four divided periods includes an image component a6-4 corresponding to the image area A6 of the original 21.

Similarly, because the CCD 102 moves relative to the original 21, the signal b7 corresponding to the pixel P3 of the CCD 102 includes image components a7-5 to a10-8 corresponding to the image areas A7 to A10 of the original 21. Because the CCD 102 moves relative to the original 21, the signal b11 corresponding to the pixel P3 of the CCD 102 includes image components a11-9 to a14-12 corresponding to the image areas A11 to A14 of the original 21. Because the CCD 102 moves relative to the original 21, the signal b15 corresponding to the pixel P3 of the CCD 102 includes image components a15-13 to a18-16 corresponding to the image areas A15 to A18 of the original 21.

Because the CCD 102 moves relative to the original 21, the signals corresponding to the pixel P3 of the CCD 102 comprise different image components corresponding to different areas of the image of the original 21.

In FIG. 17, a0-1 can be represented as a0.

In FIG. 17, a1-1 and a1-2, which are the image components corresponding to the image area A1 of the original 21 and therefore have the same value, can be represented as a1.

In FIG. 17, a2-1 to a2-3, which are the image components corresponding to the image area A2 of the original 21 and therefore have the same value, can be represented as a2.

In FIG. 17, a3-1 to a3-4, which are the image components corresponding to the image area A3 of the original 21 and therefore have the same value, can be represented as a3.

Similarly, the subsequent image components corresponding to the image areas A4 to A19 of the original 21 can be represented as a4 to a19.

Relations between the signals outputted by the CCD 102 as illustrated in FIG. 15 and the image components as illustrated in FIG. 17 can be expressed by equations (1).

$$b0=a0+a1+a2+a3$$

$$b1=a1+a2+a3+a4$$

$$b2=a2+a3+a4+a5$$

$$b3=a3+a4+a5+a6$$

$$b4=a4+a5+a6+a7$$

$$b5=a5+a6+a7+a8$$

$$b6=a6+a7+a8+a9$$

$$b7=a7+a8+a9+a10$$

$$b8=a8+a9+a10+a11$$

$$b9=a9+a10+a11+a12$$

$$b10=a10+a11+a12+a13$$

$$b11=a11+a12+a13+a14$$

$$b12=a12+a13+a14+a15$$

$$b13=a13+a14+a15+a16$$

$$b14=a14+a15+a16+a17$$

$$b15=a15+a16+a17+a18 \quad (1)$$

In the equations (1), b1 to b15 are values of the signals outputted from the CCD 102, and a0 to a18 are unknown variables.

The equations (1) as simultaneous equations cannot be solved as they are because the number of unknown variables is larger than the number of equations.

In the equations including b0 to b3, when b0 to b3 are signals corresponding to the first reading position of the CCD 102, known values can be set as the unknown variables a0 to a2.

In this case, the equations including b0 to b3 have four unknown variables a3 to a6. Hence, the simultaneous equations comprising the four equations can be solved to obtain values of a3 to a6.

Further, the equations including b4 to b7 can be solved on the basis of the calculated values of a4 to a6, whereby values of a7 to a10 can be obtained.

By repeating such processing, values of a3 to a18 can be obtained.

To generalize the above method, supposing that the CCD 102 has detecting elements arranged in the line form of n columns in the sub-scanning direction and that the original 21 and the CCD 102 are moved relative to each other by m pixels in an exposure time, a value integrated by accumulation of charge is divided into m image components, and thus the numbers of unknown variables and equations of the equation group constructed in correspondence with the exposure time are expressed as follows:

Number of unknown variables: n+m−1

Number of equations: n

When m is 2 or more, the number of unknown variables exceeds the number of equations, and therefore the equation group cannot be solved. When all unknown variables are determined in an equation group immediately preceding that of an exposure time of interest, there are m−1 known variables in the equation group immediately preceding that of the exposure time of interest. By using the known variables, the number of unknown variables becomes equal to the number of equations.

Thus, all unknown variables can be determined.

In the above method, when the unknown variables corresponding to the first exposure time are determined, accuracy of the known values is important. This is because a chain of effects of errors in the first known values occurs as in calculating the values of the unknown variables corresponding to the first exposure time on the basis of the known values and calculating the values of the unknown variables corresponding to the next exposure time on the basis of a result of the calculation.

Accordingly, processing for breaking such a chain of effects is required.

Figure 18:
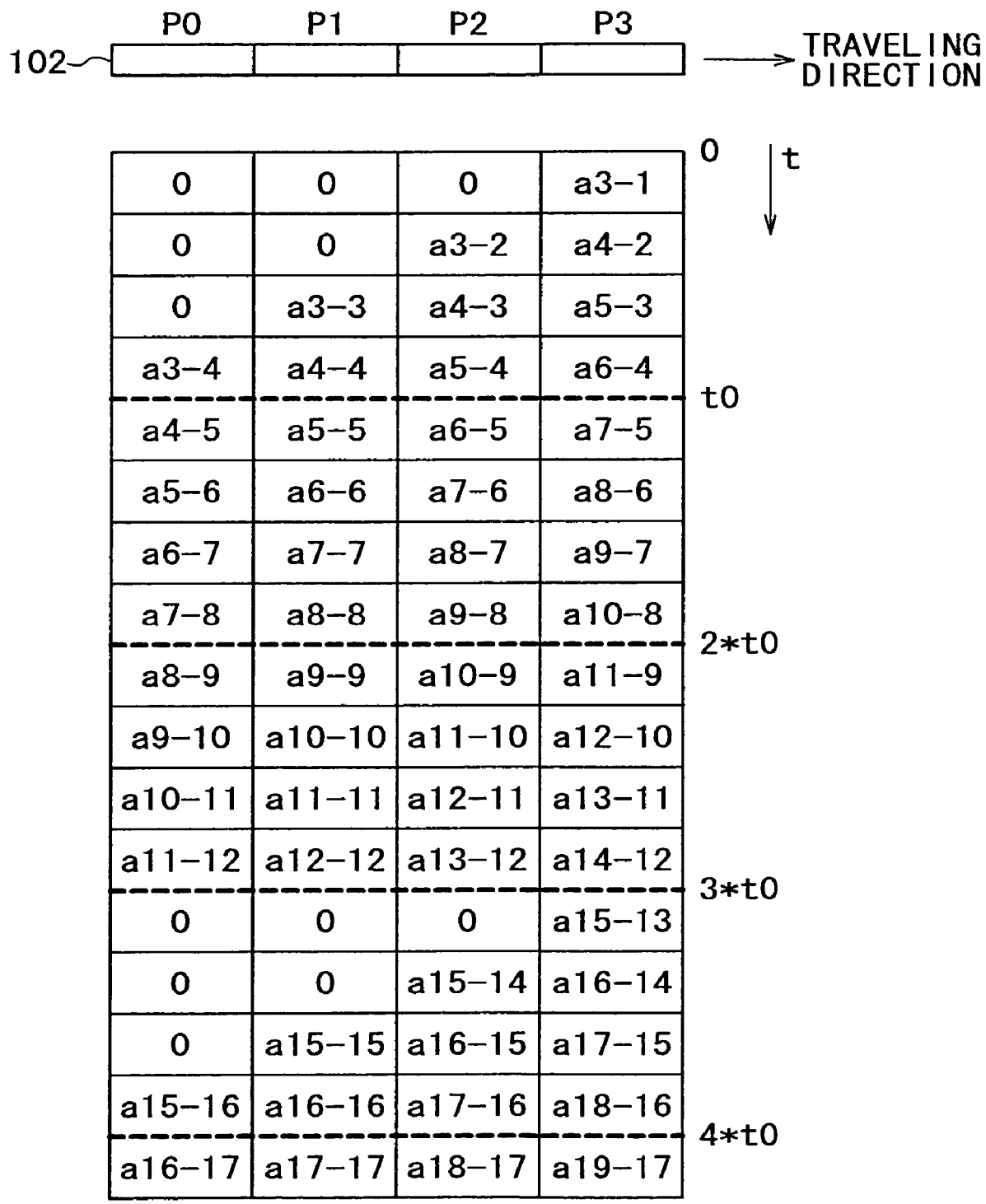
FIG. 18 is a diagram of assistance in explaining a concrete example of processing for obtaining known values and breaking a chain of effects of errors.

FIG. 18 is a diagram of assistance in explaining a concrete example of processing for obtaining known values and breaking a chain of effects of errors. In FIG. 18, in periods corresponding to image components described as "0," the CCD 102 operates respective electronic shutters of the pixels P0 to P3 to thereby sweep out charge accumulated in the photodiodes.

Specifically, at a start of the fourth period of the four divided periods of the exposure time t0 from the time 0 to the time t0 (when three fourths of the exposure time t0 has passed), the CCD 102 operates the electronic shutter of the pixel P0 and thereby sweeps out charge accumulated in the photodiode corresponding to the pixel P0. At a start of the third period of the four divided periods of the exposure time t0 from the time 0 to the time t0 (when one half of the exposure time t0 has passed), the CCD 102 operates the electronic shutter of the pixel P1 and thereby sweeps out charge accumulated in the photodiode corresponding to the pixel P1. At a start of the second period of the four divided periods of the exposure time t0 from the time 0 to the time t0 (when one fourth of the exposure time t0 has passed), the CCD 102 operates the electronic shutter of the pixel P2 and thereby sweeps out charge accumulated in the photodiode corresponding to the pixel P2. The CCD 102 does not operate the electronic shutter of the pixel P3 during the first exposure time t0.

Thus, the variables a0 to a2 in the equations corresponding to b0 to b3 in the equations (1) are zero, a known value. Therefore a3 to a6 can be calculated on the basis of the equations corresponding to b0 to b3 in the equations (1).

Further, at a start of the fourth period of the four divided periods of the exposure time t0 from the time 3*t0 to the time 4*t0, the CCD 102 operates the electronic shutter of the pixel P0 and thereby sweeps out charge accumulated in the photodiode corresponding to the pixel P0. At a start of the third period of the four divided periods of the exposure time t0 from the time 3*t0 to the time 4*t0, the CCD 102 operates the electronic shutter of the pixel P1 and thereby sweeps out charge accumulated in the photodiode corresponding to the pixel P1. At a start of the second period of the four divided periods of the exposure time t0 from the time 3*t0 to the time 4*t0, the CCD 102 operates the electronic shutter of the pixel P2 and thereby sweeps out charge accumulated in the photodiode corresponding to the pixel P2. The CCD 102 does not operate the electronic shutter of the pixel P3 during the exposure time from the time 3*t0 to the time 4*t0.

Similarly, the variables a12 to a14 in the equations corresponding to b12 to b15 in the equations (1) are zero, a known value. Therefore a15 to a18 can be calculated on the basis of the equations corresponding to b12 to b15 in the equations (1).

Thus, effects of errors included in the result obtained by solving the equations corresponding to the first exposure time t0 are eliminated in the values calculated as solutions of a15 to a18, whereby propagation of errors can be blocked.

Relations between the signals outputted by the CCD 102 and the image components as illustrated in FIG. 18 can be expressed by equations (2).

$b0 = a3$ $b1 = a3 + a4$ $b2 = a3 + a4 + a5$ $b3 = a3 + a4 + a5 + a6$ $b4 = a4 + a5 + a6 + a7$ $b5 = a5 + a6 + a7 + a8$ $b6 = a6 + a7 + a8 + a9$ $b7 = a7 + a8 + a9 + a10$ $b8 = a8 + a9 + a10 + a11$ $b9 = a9 + a10 + a11 + a12$ $b10 = a10 + a11 + a12 + a13$ $b11 = a11 + a12 + a13 + a14$ $b12 = a15$ $b13 = a15 + a16$ $b14 = a15 + a16 + a17$ $b15 = a15 + a16 + a17 + a18$ (2)

The equations including b0 to b3 in the equations (2) have four unknown variables a3 to a6. Hence, the values of a3 to a6 are obtained.

Next, the equations including b4 to b7 are solved on the basis of the calculated values of a4 to a6, whereby values of a7 to a10 are calculated. The equations including b8 to b11 are solved on the basis of the values of a8 to a10, whereby values of a11 to a14 are calculated.

The equations including b12 to b15 have four unknown variables a15 to a18. Hence, the values of a15 to a18 are obtained without using the values of a12 to a14.

Figure 19:
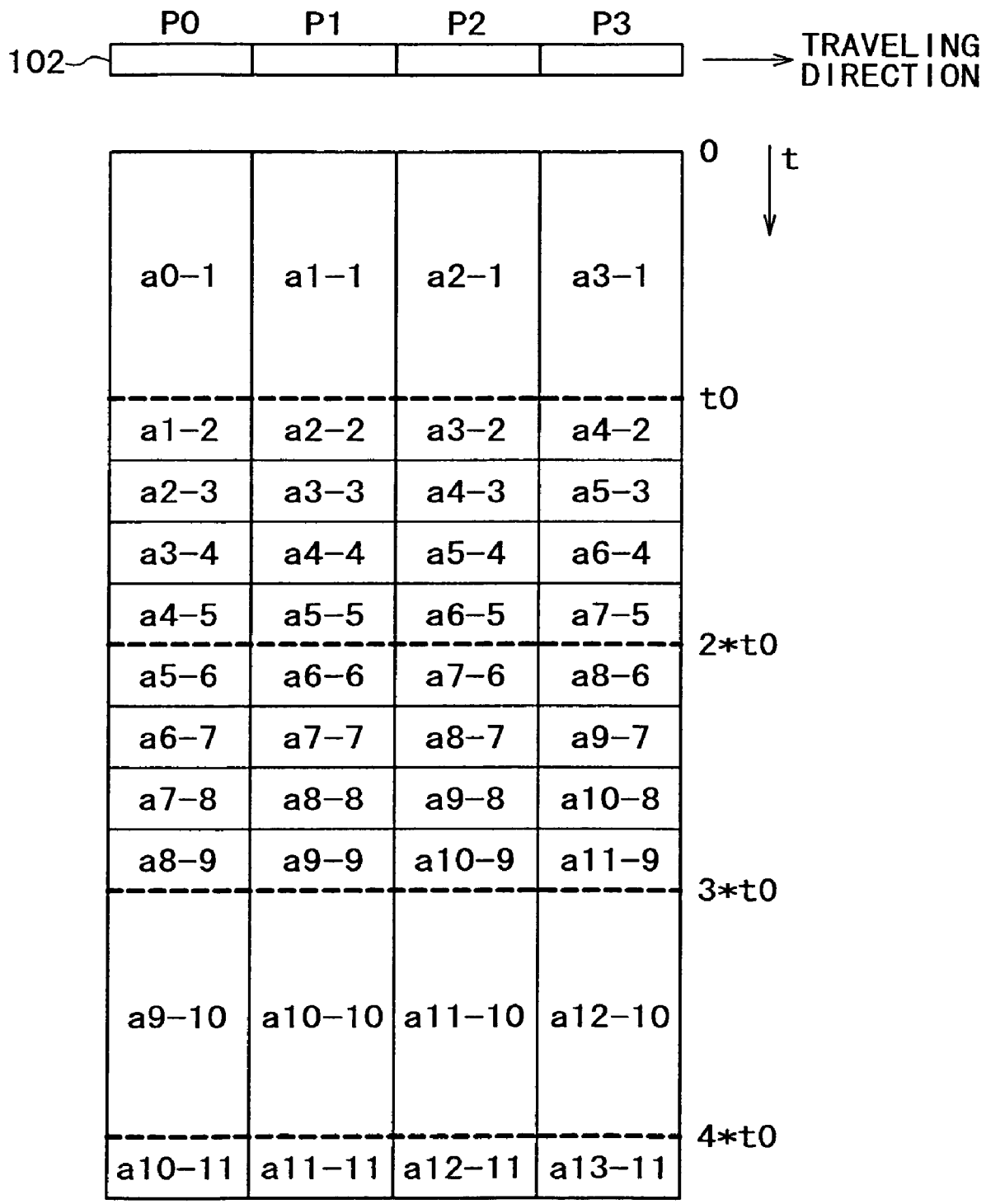
FIG. 19 is a diagram illustrating another concrete example of processing for obtaining known values and breaking a chain of effects of errors.

FIG. 19 is a diagram showing another concrete example of processing for obtaining known values and breaking a chain of effects of errors. In the example shown in FIG. 19, a plurality of relative speeds between the original 21 and the CCD 102 are used properly to block the propagation of errors.

In the first exposure time t0, the relative speed between the original 21 and the CCD 102 is controlled such that length of a read area of the original 21 which length corresponds to movement in the exposure time t0 is the length of one pixel of the CCD.

In the exposure time t0 from the time t0 to the time 2*t0 and the exposure time t0 from the time 2*t0 to the time 3*t0, the relative speed between the original 21 and the CCD 102 is controlled such that length of a read area of the original which length corresponds to movement in the exposure time t0 is four times the length of one pixel of the CCD.

In the exposure time t0 from the time 3*t0 to the time 4*t0, the relative speed between the original 21 and the CCD 102 is controlled such that length of a read area of the original 21 which length corresponds to movement in the exposure time t0 is the length of one pixel of the CCD.

In a next exposure time t0 and a further exposure time t0, the relative speed between the original 21 and the CCD 102 is controlled such that length of a read area of the original which length corresponds to movement in the exposure time t0 is four times the length of one pixel of the CCD.

Thus, the relative speed between the original 21 and the CCD 102 is controlled according to the passage of the exposure times t0.

Relations between the signals outputted by the CCD 102 and the image components as illustrated in FIG. 19 can be expressed by equations (3).

$b0 = 4*a0$ $b1 = 4*a1$ $b2 = 4*a2$ $$b3=4*a3$$

$$b4=a1+a2+a3+a4$$

$$b5=a2+a3+a4+a5$$

$$b6=a3+a4+a5+a6$$

$$b7=a4+a5+a6+a7$$

$$b8=a5+a6+a7+a8$$

$$b9=a6+a7+a8+a9$$

$$b10=a7+a8+a9+a10$$

$$b11=a8+a9+a10+a11$$

$$b12=4*a9$$

$$b13=4*a10$$

$$b14=4*a11$$

$$b15=4*a12 \quad (3)$$

The signals b0 to b3 corresponding to the first exposure time each comprise only the image component of an area having the same length as the length of one pixel of the CCD. Values of a0 to a3 are obtained in the equations including b0 to b3 in the equations (3).

Then the equations including b4 to b7 are solved on the basis of the calculated values of a1 to a3, whereby values of a4 to a7 are calculated. The equations including b8 to b11 are solved on the basis of the values of a5 to a7, whereby values of a8 to a11 are calculated.

The signals b12 to b15 corresponding to the exposure time from the time 3*t0 to the time 4*t0 each comprise only the image component of an area having the same length as the length of one pixel of the CCD. Values of a9 to a12 are obtained in the equations including b12 to b15 in the equations (3).

Thus, although the control of the relative speed between the original 21 and the CCD 102 becomes complex, charge accumulation time is lengthened, and therefore S/N and accuracy of the calculated image data are improved as compared with the case shown in FIG. 18.

Description will next be made of a case where an exposure time is t1 and length of a read area of the original moved in the exposure time t1 is changed.

The description will be made by taking as an example a case where the exposure time of the CCD 102 is t1 as different from t0, the moving speed of the CCD 102 is v1 as different from v0, and an amount of movement corresponding to the exposure time t1 is twice an amount of movement corresponding to the exposure time t0 described with reference to FIGS. 14 to 19.

Figure 20:
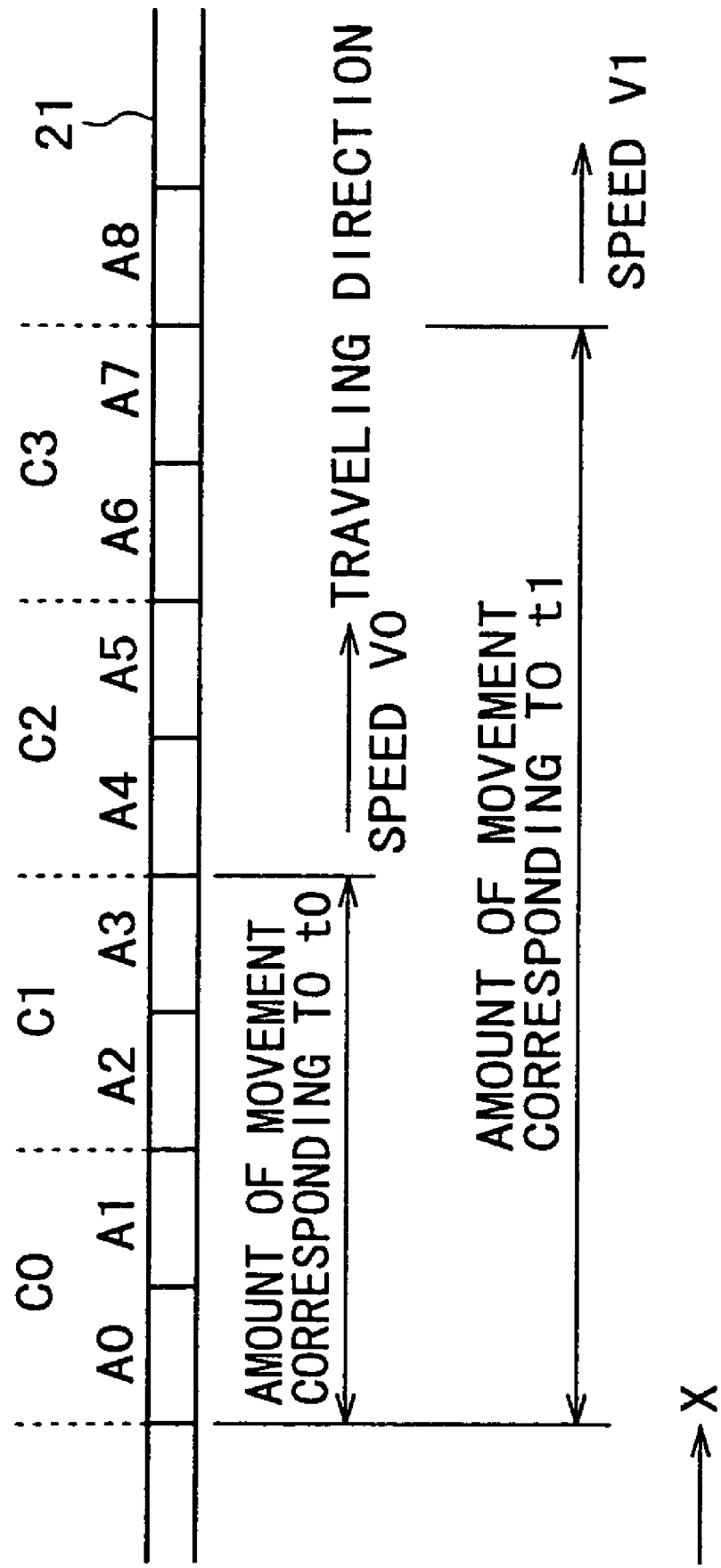
FIG. 20 is a diagram of assistance in explaining a read area of an original 21.

As shown in FIG. 20, the amount of movement corresponding to the exposure time t1 is twice the amount of movement corresponding to the exposure time t0, and therefore length of a read area of the original 21 in correspondence with movement in the exposure time t1 is eight times the length of one pixel of the CCD.

Each of image areas C0 to C3 has a length twice that of each of the image areas A0 to A10.

Figure 21:
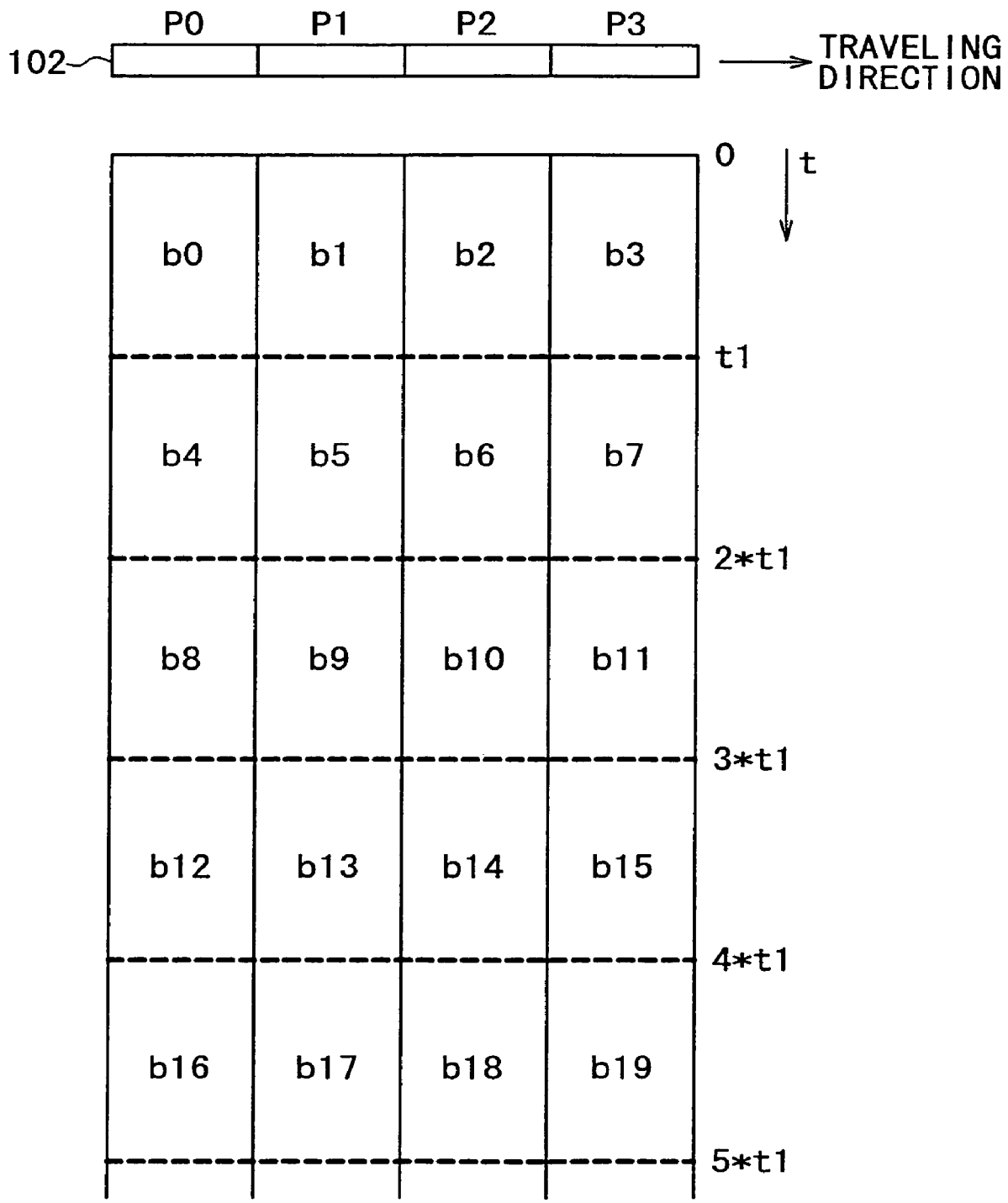
FIG. 21 is a diagram of assistance in explaining signals outputted by the CCD 102.

FIG. 21 is a diagram of assistance in explaining signals outputted by the CCD 102 when the length of a read area of the original 21 moved in the exposure time t1 is eight times the length of one pixel of the CCD 102.

In an exposure time t1 from a time 0 to a time t1, a signal corresponding to the pixel P0 of the CCD 102 is b0; a signal corresponding to the pixel P1 of the CCD 102 is b1; a signal corresponding to the pixel P2 of the CCD 102 is b2; and a signal corresponding to the pixel P3 of the CCD 102 is b3.

In an exposure time t1 from the time t1 to a time 2*t1 (time at which twice t1 passes from the time 0), a signal corresponding to the pixel P0 of the CCD 102 is b4; a signal corresponding to the pixel P1 of the CCD 102 is b5; a signal corresponding to the pixel P2 of the CCD 102 is b6; and a signal corresponding to the pixel P3 of the CCD 102 is b7.

In an exposure time t1 from the time 2*t1 to a time 3*t1 (time at which three times t1 passes from the time 0), a signal corresponding to the pixel P0 of the CCD 102 is b8; a signal corresponding to the pixel P1 of the CCD 102 is b9; a signal corresponding to the pixel P2 of the CCD 102 is b10; and a signal corresponding to the pixel P3 of the CCD 102 is b11.

In an exposure time t1 from the time 3*t1 to a time 4*t1 (time at which four times t1 passes from the time 0), a signal corresponding to the pixel P0 of the CCD 102 is b12; a signal corresponding to the pixel P1 of the CCD 102 is b13; a signal corresponding to the pixel P2 of the CCD 102 is b14; and a signal corresponding to the pixel P3 of the CCD 102 is b15.

Similarly, in an exposure time t1 from the time 4*t1 to a time 5*t1 (time at which five times t1 passes from the time 0), a signal corresponding to the pixel P0 of the CCD 102 is b16; a signal corresponding to the pixel P1 of the CCD 102 is b17; a signal corresponding to the pixel P2 of the CCD 102 is b18; and a signal corresponding to the pixel P3 of the CCD 102 is b19.

Figure 22:
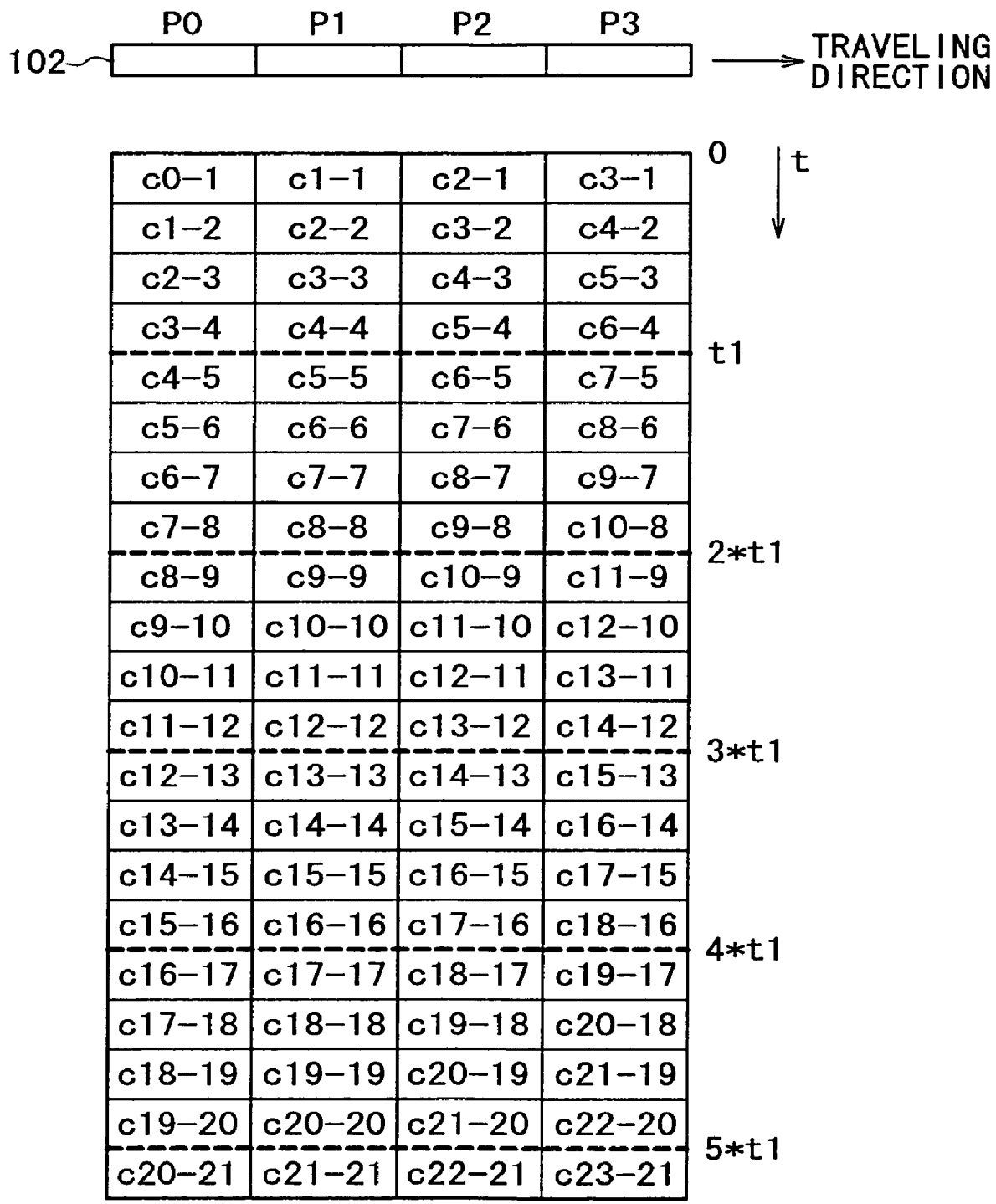
FIG. 22 is a diagram showing an example of image components included in the signals outputted by the CCD 102.

FIG. 22 is a diagram showing an example of image components included in the signals outputted by the CCD 102 when length of a read area of the original 21 moved in an exposure time t1 is eight times the length of one pixel of the CCD 102.

Consideration will be given to dividing the exposure time into four equal lengths.

In a first period of the four divided periods of the exposure time t1 from the time 0 to the time t1, the pixel P0 of the CCD 102 is reading the image area C0 of the original 21. Therefore the signal b0 corresponding to the pixel P0 of the CCD 102 in the first period of the four divided periods includes an image component c0-1 corresponding to the image area C0 of the original 21.

The CCD 102 moves relative to the original 21 and in a second period of the four divided periods of the exposure time t1 from the time 0 to the time t1, the pixel P0 of the CCD 102 is reading the image area C1 of the original 21. Therefore the signal b0 corresponding to the pixel P0 of the CCD 102 in the second period of the four divided periods includes an image component c1-2 corresponding to the image area C1 of the original 21.

The CCD 102 moves relative to the original 21 and in a third period of the four divided periods of the exposure time t1 from the time 0 to the time t1, the pixel P0 of the CCD 102 is reading the image area C2 of the original 21. Therefore the signal b0 corresponding to the pixel P0 of the CCD 102 in the third period of the four divided periods includes an image component c2-3 corresponding to the image area C2 of the original 21.

The CCD 102 moves relative to the original 21 and in a fourth period of the four divided periods of the exposure time t1 from the time 0 to the time t1, the pixel P0 of the CCD 102 is reading the image area C3 of the original 21. Therefore the signal b0 corresponding to the pixel P0 of the CCD 102 in the fourth period of the four divided periods includes an image component c3-4 corresponding to the image area C3 of the original 21.

Similarly, because the CCD 102 moves relative to the original 21, the signal b4 corresponding to the pixel P0 of the CCD 102 includes image components c4-5 to c7-8 corresponding to image areas C4 to C7 of the original 21. Because the CCD 102 moves relative to the original 21, the signal b8 corresponding to the pixel P0 of the CCD 102 includes image components c8-9 to c11-12 corresponding to image areas C8 to C11 of the original 21. Because the CCD 102 moves relative to the original 21, the signal b12 corresponding to the pixel P0 of the CCD 102 includes image components c12-13 to c15-16 corresponding to image areas C12 to C15 of the original 21. Because the CCD 102 moves relative to the original 21, the signal b16 corresponding to the pixel P0 of the CCD 102 includes image components c16-17 to c19-20 corresponding to image areas C16 to C19 of the original 21.

Thus, because the CCD 102 moves relative to the original 21, the signals corresponding to the pixel P0 of the CCD 102 comprise different image components corresponding to different areas of the image of the original 21.

In the first period of the four divided periods of the exposure time t1 from the time 0 to the time t1, the pixel P1 of the CCD 102 is reading the image area C1 of the original 21. Therefore the signal b1 corresponding to the pixel P1 of the CCD 102 in the first period of the four divided periods includes an image component c1-1 corresponding to the image area C1 of the original 21.

The CCD 102 moves relative to the original 21 and in the second period of the four divided periods of the exposure time t1 from the time 0 to the time t1, the pixel P1 of the CCD 102 is reading the image area C2 of the original 21. Therefore the signal b1 corresponding to the pixel P1 of the CCD 102 in the second period of the four divided periods includes an image component c2-2 corresponding to the image area C2 of the original 21.

The CCD 102 moves relative to the original 21 and in the third period of the four divided periods of the exposure time t1 from the time 0 to the time t1, the pixel P1 of the CCD 102 is reading the image area C3 of the original 21. Therefore the signal b1 corresponding to the pixel P1 of the CCD 102 in the third period of the four divided periods includes an image component c3-3 corresponding to the image area C3 of the original 21.

The CCD 102 moves relative to the original 21 and in the fourth period of the four divided periods of the exposure time t1 from the time 0 to the time t1, the pixel P1 of the CCD 102 is reading the image area C4 of the original 21. Therefore the signal b1 corresponding to the pixel P1 of the CCD 102 in the fourth period of the four divided periods includes an image component c4-4 corresponding to the image area C4 of the original 21.

Similarly, because the CCD 102 moves relative to the original 21, the signal b5 corresponding to the pixel P1 of the CCD 102 includes image components c5-5 to c8-8 corresponding to the image areas C5 to C8 of the original 21. Because the CCD 102 moves relative to the original 21, the signal b9 corresponding to the pixel P1 of the CCD 102 includes image components c9-9 to c12-12 corresponding to the image areas C9 to C12 of the original 21. Because the CCD 102 moves relative to the original 21, the signal b13 corresponding to the pixel P1 of the CCD 102 includes image components c13-13 to c16-16 corresponding to the image areas C13 to C16 of the original 21. Because the CCD 102 moves relative to the original 21, the signal b17 corresponding to the pixel P1 of the CCD 102 includes image components c17-17 to c20-20 corresponding to the image areas C17 to C20 of the original 21.

Because the CCD 102 moves relative to the original 21, the signals corresponding to the pixel P1 of the CCD 102 comprise different image components corresponding to different areas of the image of the original 21.

In the first period of the four divided periods of the exposure time t1 from the time 0 to the time t1, the pixel P2 of the CCD 102 is reading the image area C2 of the original 21. Therefore the signal b2 corresponding to the pixel P2 of the CCD 102 in the first period of the four divided periods includes an image component c2-1 corresponding to the image area C2 of the original 21.

The CCD 102 moves relative to the original 21 and in the second period of the four divided periods of the exposure time t1 from the time 0 to the time t1, the pixel P2 of the CCD 102 is reading the image area C3 of the original 21. Therefore the signal b2 corresponding to the pixel P2 of the CCD 102 in the second period of the four divided periods includes an image component c3-2 corresponding to the image area C3 of the original 21.

The CCD 102 moves relative to the original 21 and in the third period of the four divided periods of the exposure time t1 from the time 0 to the time t1, the pixel P2 of the CCD 102 is reading the image area C4 of the original 21. Therefore the signal b2 corresponding to the pixel P2 of the CCD 102 in the third period of the four divided periods includes an image component c4-3 corresponding to the image area C4 of the original 21.

The CCD 102 moves relative to the original 21 and in the fourth period of the four divided periods of the exposure time t1 from the time 0 to the time t1, the pixel P2 of the CCD 102 is reading the image area C5 of the original 21. Therefore the signal b2 corresponding to the pixel P2 of the CCD 102 in the fourth period of the four divided periods includes an image component c5-4 corresponding to the image area C5 of the original 21.

Similarly, because the CCD 102 moves relative to the original 21, the signal b6 corresponding to the pixel P2 of the CCD 102 includes image components c6-5 to c9-8 corresponding to the image areas C6 to C9 of the original 21. Because the CCD 102 moves relative to the original 21, the signal b10 corresponding to the pixel P2 of the CCD 102 includes image components c10-9 to c13-12 corresponding to the image areas C10 to C13 of the original 21. Because the CCD 102 moves relative to the original 21, the signal b14 corresponding to the pixel P2 of the CCD 102 includes image components c14-13 to c17-16 corresponding to the image areas C14 to C17 of the original 21. Because the CCD 102 moves relative to the original 21, the signal b18 corresponding to the pixel P2 of the CCD 102 includes image components c18-17 to c21-20 corresponding to the image areas C18 to C21 of the original 21.

Because the CCD 102 moves relative to the original 21, the signals corresponding to the pixel P2 of the CCD 102 comprise different image components corresponding to different areas of the image of the original 21.

In the first period of the four divided periods of the exposure time t1 from the time 0 to the time t1, the pixel P3 of the CCD 102 is reading the image area C3 of the original 21. Therefore the signal b3 corresponding to the pixel P3 of the CCD 102 in the first period of the four divided periods includes an image component c3-1 corresponding to the image area C3 of the original 21.

The CCD 102 moves relative to the original 21 and in the second period of the four divided periods of the exposure time t1 from the time 0 to the time t1, the pixel P3 of the CCD 102 is reading the image area C4 of the original 21. Therefore the signal b3 corresponding to the pixel P3 of the CCD 102 in the second period of the four divided periods includes an image component c4-2 corresponding to the image area C4 of the original 21.

The CCD 102 moves relative to the original 21 and in the third period of the four divided periods of the exposure time t1 from the time 0 to the time t1, the pixel P3 of the CCD 102 is reading the image area C5 of the original 21. Therefore the signal b3 corresponding to the pixel P3 of the CCD 102 in the third period of the four divided periods includes an image component c5-3 corresponding to the image area C5 of the original 21.

The CCD 102 moves relative to the original 21 and in the fourth period of the four divided periods of the exposure time t1 from the time 0 to the time t1, the pixel P3 of the CCD 102 is reading the image area C6 of the original 21. Therefore the signal b3 corresponding to the pixel P3 of the CCD 102 in the fourth period of the four divided periods includes an image component c6-4 corresponding to the image area C6 of the original 21.

Similarly, because the CCD 102 moves relative to the original 21, the signal b7 corresponding to the pixel P3 of the CCD 102 includes image components c7-5 to c10-8 corresponding to the image areas C7 to C10 of the original 21. Because the CCD 102 moves relative to the original 21, the signal b11 corresponding to the pixel P3 of the CCD 102 includes image components c11-9 to c14-12 corresponding to the image areas C11 to C14 of the original 21. Because the CCD 102 moves relative to the original 21, the signal b15 corresponding to the pixel P3 of the CCD 102 includes image components c15-13 to c18-16 corresponding to the image areas C15 to C18 of the original 21. Because the CCD 102 moves relative to the original 21, the signal b19 corresponding to the pixel P3 of the CCD 102 includes image components c19-17 to c22-20 corresponding to the image areas C19 to C22 of the original 21.

Because the CCD 102 moves relative to the original 21, the signals corresponding to the pixel P3 of the CCD 102 comprise different image components corresponding to different areas of the image of the original 21.

In FIG. 22, c0-1 can be represented as c0.

In FIG. 22, c1-1 and c1-2, which are the image components corresponding to the image area C1 of the original 21 and therefore have the same value, can be represented as c1.

In FIG. 22, c2-1 to c2-3, which are the image components corresponding to the image area C2 of the original 21 and therefore have the same value, can be represented as c2.

In FIG. 22, c3-1 to c3-4, which are the image components corresponding to the image area C3 of the original 21 and therefore have the same value, can be represented as c3.

Similarly, the subsequent image components corresponding to the image areas C4 to C22 of the original 21 can be represented as c4 to c22.

Relations between the signals outputted by the CCD 102 as illustrated in FIG. 21 and the image components as illustrated in FIG. 22 can be expressed by equations (4).

$b0 = c0 + c1 + c2 + c3$ $b1 = c1 + c2 + c3 + c4$ $b2 = c2 + c3 + c4 + c5$ $b3 = c3 + c4 + c5 + c6$ $b4 = c4 + c5 + c6 + c7$ $b5 = c5 + c6 + c7 + c8$ $b6 = c6 + c7 + c8 + c9$ $b7 = c7 + c8 + c9 + c10$ $b8 = c8 + c9 + c10 + c11$ $b9 = c9 + c10 + c11 + c12$ $b10 = c10 + c11 + c12 + c13$ $b11 = c11 + c12 + c13 + c14$ $b12 = c12 + c13 + c14 + c15$ $b13 = c13 + c14 + c15 + c16$ $b14 = c14 + c15 + c16 + c17$ $b15 = c15 + c16 + c17 + c18$ \hfill (4)

In the equations (4), b1 to b15 are values of the signals outputted from the CCD 102, and c0 to c18 are unknown variables.

Figure 23:
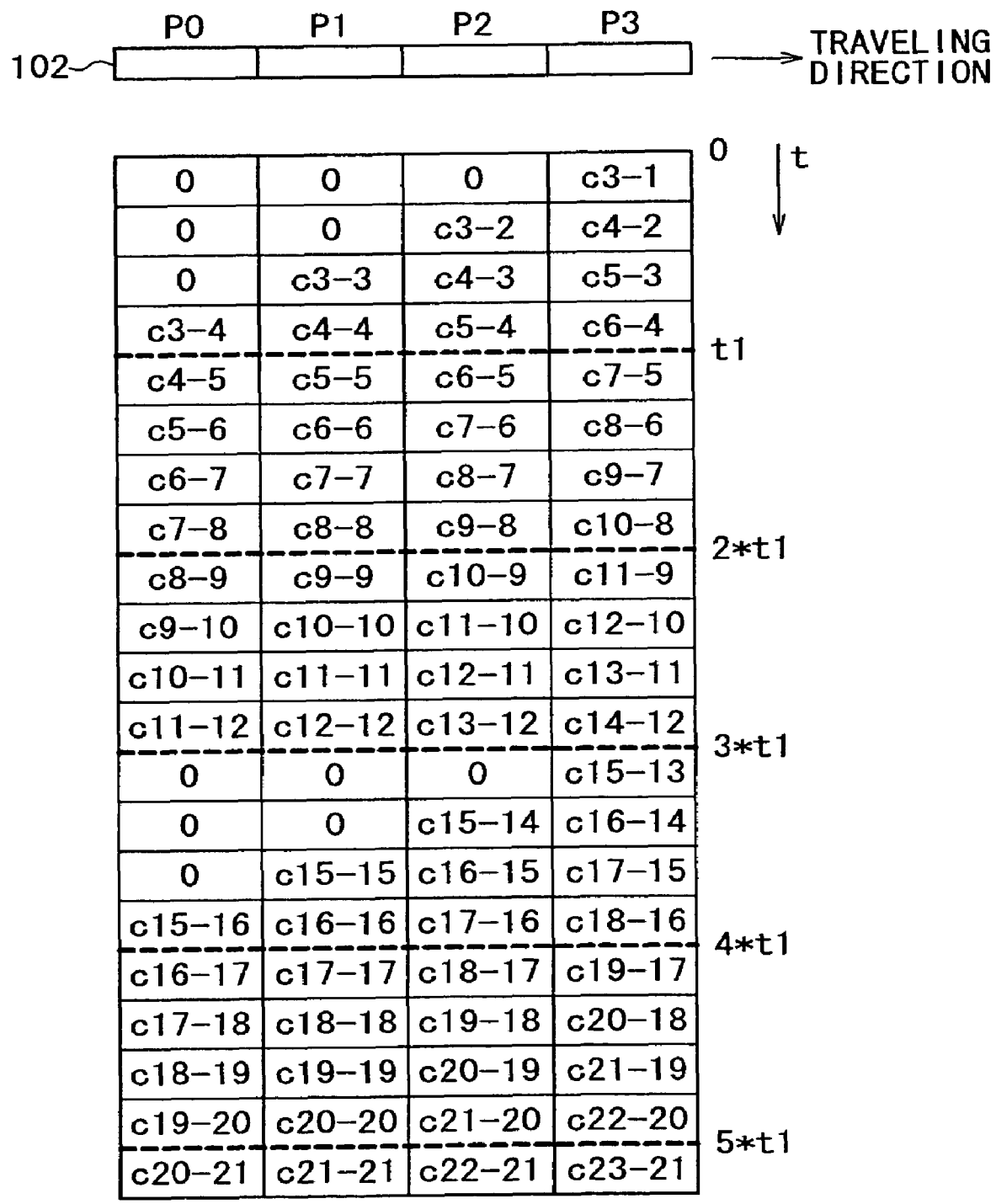
FIG. 23 is a diagram of assistance in explaining a concrete example of processing for obtaining known values and breaking a chain of effects of errors.

FIG. 23 is a diagram illustrating a concrete example of obtaining known values and breaking a chain of effects of errors. In FIG. 23, in periods corresponding to image components described as "0," the CCD 102 operates the respective electronic shutters of the pixels P0 to P3 to thereby sweep out charge accumulated in the photodiodes.

Specifically, at a start of the fourth period of the four divided periods of the exposure time from the time 0 to the time t1 (when three fourths of the exposure time t1 has passed), the CCD 102 operates the electronic shutter of the pixel P0 and thereby sweeps out charge accumulated in the photodiode corresponding to the pixel P0. At a start of the third period of the four divided periods of the exposure time from the time 0 to the time t1 (when one half of the exposure time t1 has passed), the CCD 102 operates the electronic shutter of the pixel P1 and thereby sweeps out charge accumulated in the photodiode corresponding to the pixel P1. At a start of the second period of the four divided periods of the exposure time from the time 0 to the time t1 (when one fourth of the exposure time t1 has passed), the CCD 102 operates the electronic shutter of the pixel P2 and thereby sweeps out charge accumulated in the photodiode corresponding to the pixel P2. The CCD 102 does not operate the electronic shutter of the pixel P3 during the first exposure time t1.

Thus, the variables c0 to c2 in the equations corresponding to b0 to b3 in the equations (4) are zero, a known value. Therefore c3 to c6 can be calculated on the basis of the equations corresponding to b0 to b3 in the equations (4).

Further, at a start of the fourth period of the four divided periods of the exposure time from the time 3*t1 to the time 4*t1, the CCD 102 operates the electronic shutter of the pixel P0 and thereby sweeps out charge accumulated in the photodiode corresponding to the pixel P0. At a start of the third period of the four divided periods of the exposure time from the time 3*t1 to the time 4*t1, the CCD 102 operates the electronic shutter of the pixel P1 and thereby sweeps out charge accumulated in the photodiode corresponding to the pixel P1. At a start of the second period of the four divided periods of the exposure time from the time 3*t1 to the time 4*t1, the CCD 102 operates the electronic shutter of the pixel P2 and thereby sweeps out charge accumulated in the photodiode corresponding to the pixel P2. The CCD 102 does not operate the electronic shutter of the pixel P3 during the exposure time from the time 3*t1 to the time 4*t1.

Similarly, the variables $c_{12}$ to $c_{14}$ in the equations corresponding to $b_{12}$ to $b_{15}$ in the equations (4) are zero, a known value. Therefore $c_{15}$ to $c_{18}$ can be calculated on the basis of the equations corresponding to $b_{12}$ to $b_{15}$ in the equations (4).

Thus, effects of errors included in the result obtained by solving the equations corresponding to the first exposure time are eliminated in the values calculated as solutions of $c_{15}$ to $c_{18}$, whereby propagation of errors can be blocked.

Relations between the signals outputted by the CCD 102 and the image components as illustrated in FIG. 23 can be expressed by equations (5).

$$b0 = c3$$
$$b1 = c3 + c4$$
$$b2 = c3 + c4 + c5$$
$$b3 = c3 + c4 + c5 + c6$$
$$b4 = c4 + c5 + c6 + c7$$
$$b5 = c5 + c6 + c7 + c8$$
$$b6 = c6 + c7 + c8 + c9$$
$$b7 = c7 + c8 + c9 + c10$$
$$b8 = c8 + c9 + c10 + c11$$
$$b9 = c9 + c10 + c11 + c12$$
$$b10 = c10 + c11 + c12 + c13$$
$$b11 = c11 + c12 + c13 + c14$$
$$b12 = c15$$
$$b13 = c15 + c16$$
$$b14 = c15 + c16 + c17$$
$$b15 = c15 + c16 + c17 + c18 \qquad (5)$$

The equations including $b0$ to $b3$ in the equations (5) have four unknown variables $c3$ to $c6$. Hence, the values of $c3$ to $c6$ are obtained.

Next, the equations including $b4$ to $b7$ are solved on the basis of the calculated values of $c4$ to $c6$, whereby values of $c7$ to $c10$ are calculated. The equations including $b8$ to $b11$ are solved on the basis of the values of $c8$ to $c10$, whereby values of $c11$ to $c14$ are calculated.

The equations including $b12$ to $b15$ have four unknown variables $c15$ to $c18$. Hence, the values of $c15$ to $c18$ are obtained without using the values of $c12$ to $c14$.

Description will next be made of processing when the CCD 102 reads the original 21 at a slower speed. The signal processing unit 107 performs the following processing on the basis of the relative speed between the original 21 and the CCD 102.

Figure 24:
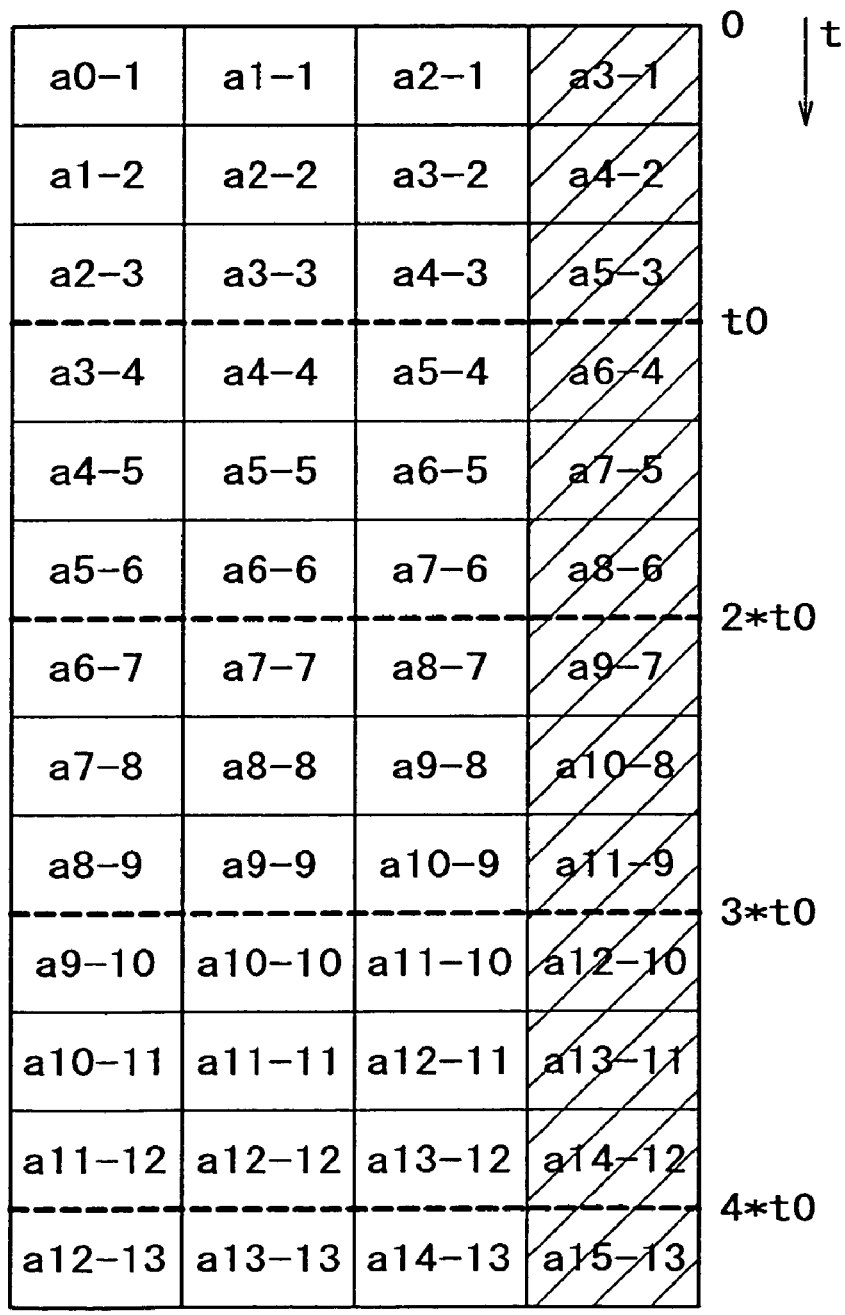
FIG. 24 is a diagram showing an example of image components included in the signals outputted by the CCD 102.

FIG. 24 is a diagram showing an example of image components included in the signals outputted by the CCD 102 when length of a read area of the original 21 which length corresponds to relative movement in an exposure time t0 is three times the length of one pixel of the CCD 102.

Consideration will be given to dividing the exposure time into three equal periods.

In a first period of the three divided periods of the exposure time t0 from the time 0 to the time t0, the pixel P0 of the CCD 102 is reading the image area A0 of the original 21. Therefore the signal b0 corresponding to the pixel P0 of the CCD 102 in the first period of the three divided periods includes an image component a0-1 corresponding to the image area A0 of the original 21.

The CCD 102 moves relative to the original 21 and in a second period of the three divided periods of the exposure time t0 from the time 0 to the time t0, the pixel P0 of the CCD 102 is reading the image area A1 of the original 21. Therefore the signal b0 corresponding to the pixel P0 of the CCD 102 in the second period of the three divided periods includes an image component a1-2 corresponding to the image area A1 of the original 21.

The CCD 102 moves relative to the original 21 and in a third period of the three divided periods of the exposure time t0 from the time 0 to the time t0, the pixel P0 of the CCD 102 is reading the image area A2 of the original 21. Therefore the signal b0 corresponding to the pixel P0 of the CCD 102 in the third period of the three divided periods includes an image component a2-3 corresponding to the image area A2 of the original 21.

Similarly, because the CCD 102 moves relative to the original 21, the signal b4 corresponding to the pixel P0 of the CCD 102 includes image components a3-4 to a5-6 corresponding to the image areas A3 to A5 of the original 21. Because the CCD 102 moves relative to the original 21, the signal b8 corresponding to the pixel P0 of the CCD 102 includes image components a6-7 to a8-9 corresponding to the image areas A6 to A8 of the original 21. Because the CCD 102 moves relative to the original 21, the signal b12 corresponding to the pixel P0 of the CCD 102 includes image components a9-10 to a11-12 corresponding to the image areas A9 to A11 of the original 21.

In the first period of the three divided periods of the exposure time t0 from the time 0 to the time t0, the pixel P1 of the CCD 102 is reading the image area A1 of the original 21. Therefore the signal b1 corresponding to the pixel P1 of the CCD 102 in the first period of the three divided periods includes an image component a1-1 corresponding to the image area A1 of the original 21.

The CCD 102 moves relative to the original 21 and in the second period of the three divided periods of the exposure time t0 from the time 0 to the time t0, the pixel P1 of the CCD 102 is reading the image area A2 of the original 21. Therefore the signal b1 corresponding to the pixel P1 of the CCD 102 in the second period of the three divided periods includes an image component a2-2 corresponding to the image area A2 of the original 21.

The CCD 102 moves relative to the original 21 and in the third period of the three divided periods of the exposure time t0 from the time 0 to the time t0, the pixel P1 of the CCD 102 is reading the image area A3 of the original 21. Therefore the signal b1 corresponding to the pixel P1 of the CCD 102 in the third period of the three divided periods includes an image component a3-3 corresponding to the image area A3 of the original 21.

Similarly, because the CCD 102 moves relative to the original 21, the signal b5 corresponding to the pixel P1 of the CCD 102 includes image components a4-4 to a6-6 corresponding to the image areas A4 to A6 of the original 21. Because the CCD 102 moves relative to the original 21, the signal b9 corresponding to the pixel P1 of the CCD 102 includes image components a7-7 to a9-9 corresponding to the image areas A7 to A9 of the original 21. Because the CCD 102 moves relative to the original 21, the signal b13 corresponding to the pixel P1 of the CCD 102 includes image components a10-10 to a12-12 corresponding to the image areas A10 to A12 of the original 21.

In the first period of the three divided periods of the exposure time t0 from the time 0 to the time t0, the pixel P2 of the CCD 102 is reading the image area A2 of the original 21. Therefore the signal b2 corresponding to the pixel P2 of the CCD 102 in the first period of the three divided periods includes an image component a2-1 corresponding to the image area A2 of the original 21.

The CCD 102 moves relative to the original 21 and in the second period of the three divided periods of the exposure time t0 from the time 0 to the time t0, the pixel P2 of the CCD 102 is reading the image area A3 of the original 21. Therefore the signal b2 corresponding to the pixel P2 of the CCD 102 in the second period of the three divided periods includes an image component a3-2 corresponding to the image area A3 of the original 21.

The CCD 102 moves relative to the original 21 and in the third period of the three divided periods of the exposure time t0 from the time 0 to the time t0, the pixel P2 of the CCD 102 is reading the image area A4 of the original 21. Therefore the signal b2 corresponding to the pixel P2 of the CCD 102 in the third period of the three divided periods includes an image component a4-3 corresponding to the image area A4 of the original 21.

Similarly, because the CCD 102 moves relative to the original 21, the signal b6 corresponding to the pixel P2 of the CCD 102 includes image components a5-4 to a7-6 corresponding to the image areas A5 to A7 of the original 21. Because the CCD 102 moves relative to the original 21, the signal b10 corresponding to the pixel P2 of the CCD 102 includes image components a8-7 to a10-9 corresponding to the image areas A8 to A10 of the original 21. Because the CCD 102 moves relative to the original 21, the signal b14 corresponding to the pixel P2 of the CCD 102 includes image components a11-10 to a13-12 corresponding to the image areas A11 to A13 of the original 21.

Because the CCD 102 moves relative to the original 21 at the slower speed, the signals corresponding to the pixel P2 of the CCD 102 comprise fewer image components corresponding to different areas of the image of the original 21 as compared with the higher-speed movement.

The signals outputted by the pixel P3 of the CCD 102 are not used.

In FIG. 24, a0-1 can be represented as a0.

In FIG. 24, a1-1 and a1-2, which are the image components corresponding to the image area A1 of the original 21 and therefore have the same value, can be represented as a1.

In FIG. 24, a2-1 to a2-3, which are the image components corresponding to the image area A2 of the original 21 and therefore have the same value, can be represented as a2.

In FIG. 24, a3-2 to a3-4, which are the image components corresponding to the image area A3 of the original 21 and therefore have the same value, can be represented as a3.

Similarly, the subsequent image components corresponding to the image areas A4 to A13 of the original 21 can be represented as a4 to a13.

Relations between the signals outputted by the CCD 102 as illustrated in FIG. 15 and the image components as illustrated in FIG. 24 can be expressed by equations (6).

$$b0 = a0 + a1 + a2$$

$$b1 = a1 + a2 + a3$$

$$b2 = a2 + a3 + a4$$

$$b4 = a3 + a4 + a5$$

$$b5 = a4 + a5 + a6$$

$$b6 = a5 + a6 + a7$$

$$b8 = a6 + a7 + a8$$

$$b9 = a7 + a8 + a9$$

$$b10 = a8 + a9 + a10$$

$$b12 = a9 + a10 + a11$$

$$b13 = a10 + a11 + a12$$

$$b14 = a10 + a12 + a13 \qquad (6)$$

In the equations (6), b0 to b2, b4 to b6, b8 to b10, and b12 to b14 are values of the signals outputted from the CCD 102, and a0 to a13 are unknown variables.

Figure 25:
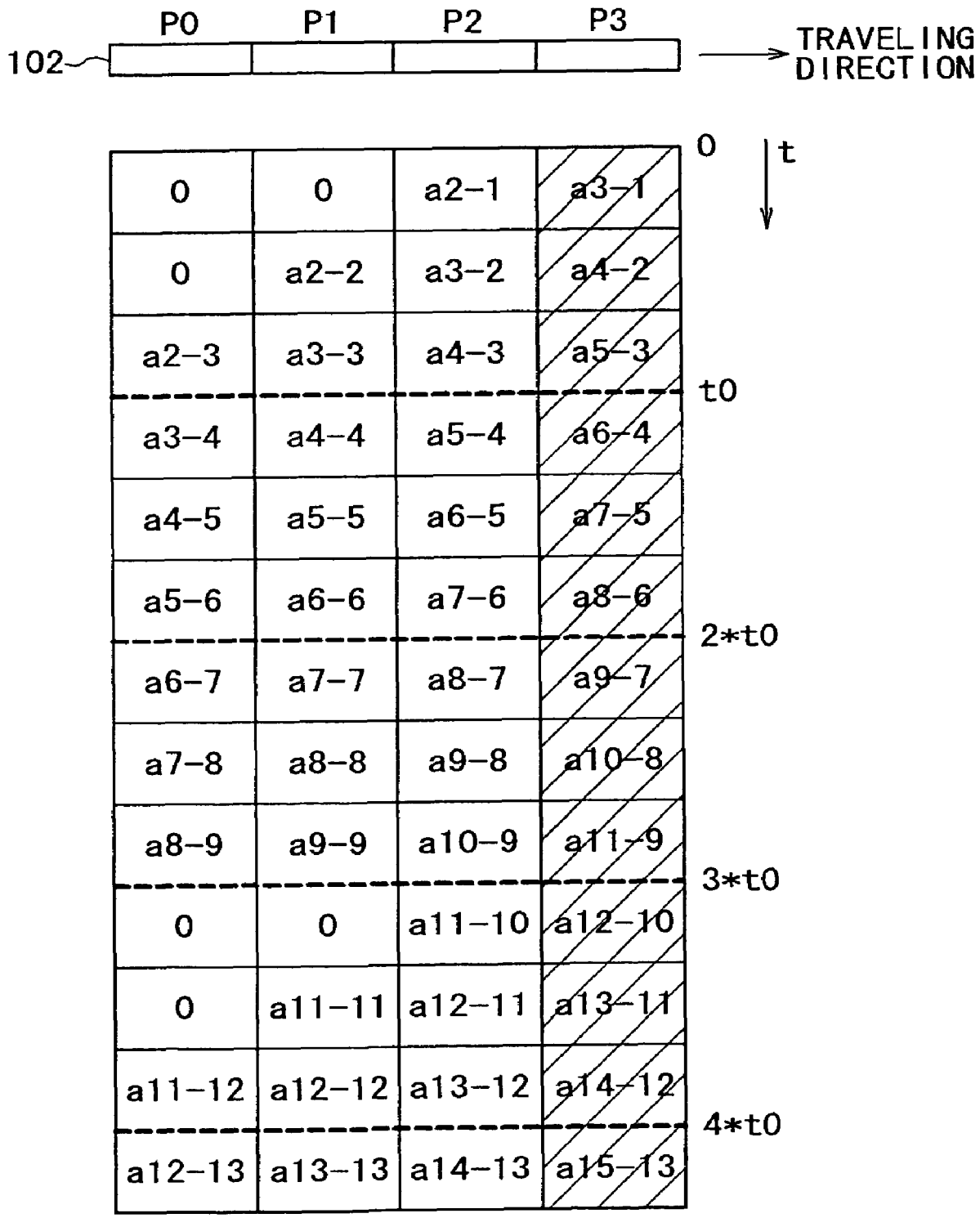
FIG. 25 is a diagram of assistance in explaining a concrete example of processing for obtaining known values and breaking a chain of effects of errors.

FIG. 25 is a diagram illustrating a concrete example of obtaining known values and breaking a chain of effects of errors. In FIG. 25, in periods corresponding to image components described as "0," the CCD 102 operates the respective electronic shutters of the pixels P0 to P2 to thereby sweep out charge accumulated in the photodiodes.

Specifically, at a start of the third period of the three divided periods of the exposure time from the time 0 to the time t0 (when two thirds of the exposure time t0 has passed), the CCD 102 operates the electronic shutter of the pixel P0 and thereby sweeps out charge accumulated in the photodiode corresponding to the pixel P0. At a start of the second period of the three divided periods of the exposure time from the time 0 to the time t0 (when one third of the exposure time t0 has passed), the CCD 102 operates the electronic shutter of the pixel P1 and thereby sweeps out charge accumulated in the photodiode corresponding to the pixel P1. The CCD 102 does not operate the electronic shutter of the pixel P2 during the first exposure time t0.

Thus, the variables a0 and a1 in the equations corresponding to b0 to b2 in the equations (6) are zero, a known value. Therefore a2 to a4 can be calculated on the basis of the equations corresponding to b0 to b2 in the equations (6).

Further, at a start of the third period of the three divided periods of the exposure time from the time 3*t0 to the time 4*t0, the CCD 102 operates the electronic shutter of the pixel P0 and thereby sweeps out charge accumulated in the photodiode corresponding to the pixel P0. At a start of the second period of the three divided periods of the exposure time from the time 3*t0 to the time 4*t0, the CCD 102 operates the electronic shutter of the pixel P1 and thereby sweeps out charge accumulated in the photodiode corresponding to the pixel P1. The CCD 102 does not operate the electronic shutter of the pixel P2 during the exposure time from the time 3*t0 to the time 4*t0.

Similarly, the variables a9 and a10 in the equations corresponding to b12 to b14 in the equations (6) are zero, a known value. Therefore a11 to a13 can be calculated on the basis of the equations corresponding to b12 to b14 in the equations (6).

Thus, effects of errors included in the result obtained by solving the equations corresponding to the first exposure time are eliminated in the values calculated as solutions of a11 to a13, whereby propagation of errors can be blocked.

Relations between the signals outputted by the CCD. 102 and the image components as illustrated in FIG. 25 can be expressed by equations (7).

$$b0 = a2$$

$$b1 = a2 + a3$$

$$b2=a2+a3+a4$$

$$b4=a3+a4+a5$$

$$b5=a4+a5+a6$$

$$b6=a5+a6+a7$$

$$b8=a6+a7+a8$$

$$b9=a7+a8+a9$$

$$b10=a8+a9+a10$$

$$b12=a11$$

$$b13=a11+a12$$

$$b14=a10+a12+a13 \quad (7)$$

The equations including b0 to b2 in the equations (7) have three unknown variables a2 to a4. Hence, the values of a2 to a4 are obtained.

Next, the equations including b4 to b6 are solved on the basis of the calculated values of a3 and a4, whereby values of a5 to a7 are calculated. The equations including b8 to b10 are solved on the basis of the values of a6 and a7, whereby values of a8 to a10 are calculated.

The equations including b12 to b14 have three unknown variables a11 to a13. Hence, the values of a11 to a13 are obtained without using the calculated values of a9 and a10.

Description will next be made of processing when the CCD 102 reads the original 21 at a still slower speed. The signal processing unit 107 performs the following processing on the basis of the relative speed between the original 21 and the CCD 102.

Figure 26:
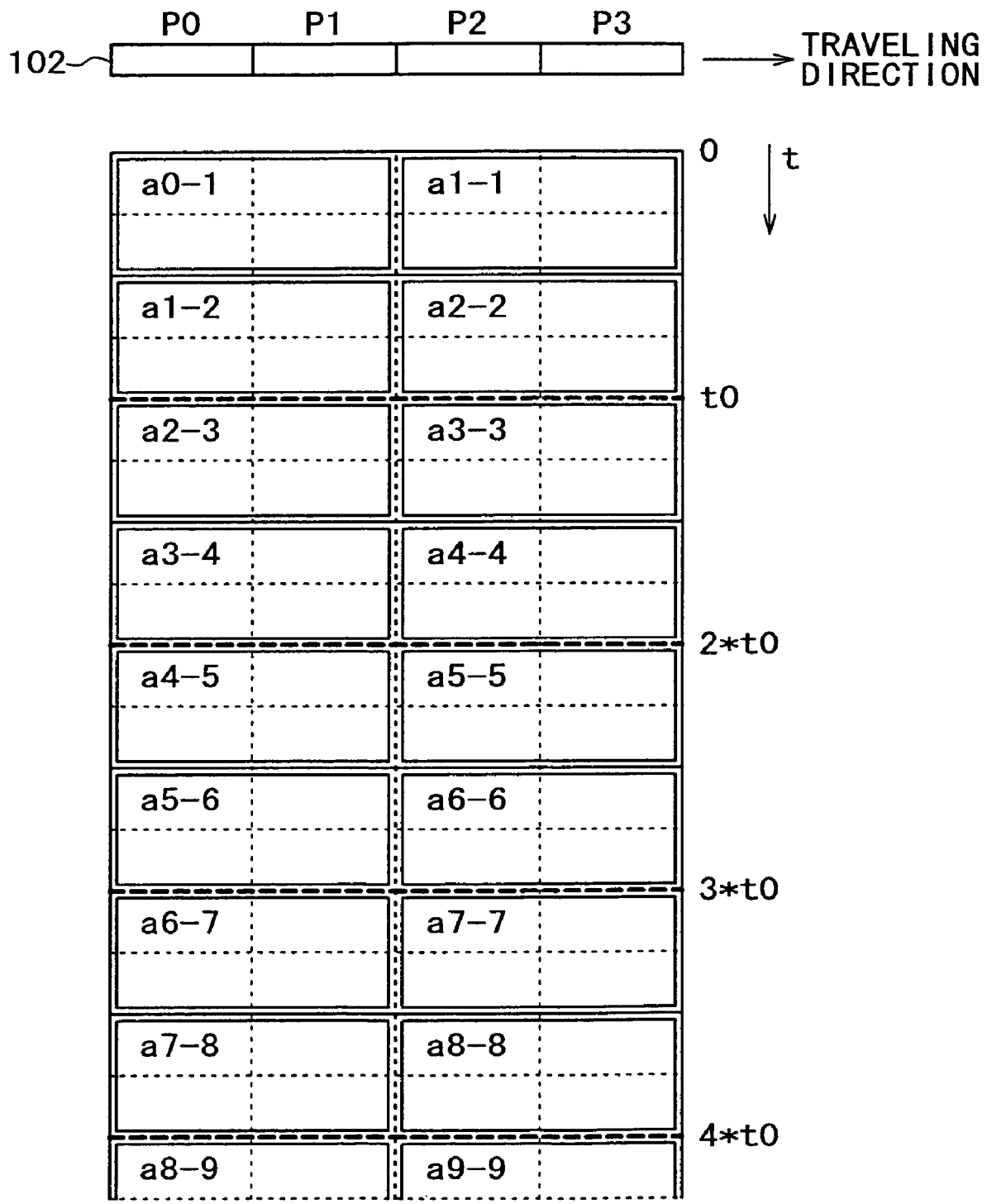
FIG. 26 is a diagram showing an example of image components included in the signals outputted by the CCD 102.

FIG. 26 is a diagram showing an example of image components included in the signals outputted by the CCD 102 when length of a read area of the original 21 moved in an exposure time t0 is twice the length of one pixel of the CCD 102.

Consideration will be given to dividing the exposure time into two equal periods.

In a first period of the two divided periods of the exposure time t0 from the time 0 to the time t0, the pixel P0 of the CCD 102 is reading the image area A0 of the original 21. Therefore the signal b0 corresponding to the pixel P0 of the CCD 102 in the first period of the two divided periods includes an image component a0-1 corresponding to the image area A0 of the original 21.

In the first period of the two divided periods of the exposure time t0 from the time 0 to the time t0, the pixel P1 of the CCD 102 is reading the image area A0 of the original 21. Therefore the signal b1 corresponding to the pixel P1 of the CCD 102 in the first period of the two divided periods includes an image component a0-1 corresponding to the image area A0 of the original 21.

The CCD 102 moves relative to the original 21 and in a second period of the two divided periods of the exposure time t0 from the time 0 to the time t0, the pixel P0 of the CCD 102 is reading the image area A1 of the original 21. Therefore the signal b0 corresponding to the pixel P0 of the CCD 102 in the second period of the two divided periods includes an image component a1-2 corresponding to the image area A1 of the original 21.

The CCD 102 moves relative to the original 21 and in the second period of the two divided periods of the exposure time t0 from the time 0 to the time t0, the pixel P1 of the CCD 102 is reading the image area A1 of the original 21. Therefore the signal b1 corresponding to the pixel P1 of the CCD 102 in the second period of the two divided periods includes an image component a1-2 corresponding to the image area A1 of the original 21.

Similarly, because the CCD 102 moves relative to the original 21, the signal b4 corresponding to the pixel P0 of the CCD 102 includes image components a2-3 and a3-4 corresponding to the image areas A2 and A3 of the original 21. Because the CCD 102 moves relative to the original 21, the signal b5 corresponding to the pixel P1 of the CCD 102 includes image components a2-3 and a3-4 corresponding to the image areas A2 and A3 of the original 21.

Because the CCD 102 moves relative to the original 21, the signal b8 corresponding to the pixel P0 of the CCD 102 includes image components a4-5 and a5-6 corresponding to the image areas A4 and A5 of the original 21. Because the CCD 102 moves relative to the original 21, the signal b9 corresponding to the pixel P1 of the CCD 102 includes image components a4-5 and a5-6 corresponding to the image areas A4 and A5 of the original 21.

Because the CCD 102 moves relative to the original 21, the signal b12 corresponding to the pixel P0 of the CCD 102 includes image components a6-7 to a7-8 corresponding to the image areas A6 and A7 of the original 21. Because the CCD 102 moves relative to the original 21, the signal b13 corresponding to the pixel P1 of the CCD 102 includes image components a6-7 to a7-8 corresponding to the image areas A6 and A7 of the original 21.

In the first period of the two divided periods of the exposure time from the time 0 to the time t0, the pixel P2 of the CCD 102 is reading the image area A1 of the original 21. Therefore the signal b2 corresponding to the pixel P2 of the CCD 102 in the first period of the two divided periods includes an image component a1-1 corresponding to the image area A1 of the original 21.

In the first period of the two divided periods of the exposure time from the time 0 to the time t0, the pixel P3 of the CCD 102 is reading the image area A1 of the original 21. Therefore the signal b3 corresponding to the pixel P3 of the CCD 102 in the first period of the two divided periods includes an image component a1-1 corresponding to the image area A0 of the original 21.

The CCD 102 moves relative to the original 21 and in the second period of the two divided periods of the exposure time from the time 0 to the time t0, the pixel P2 of the CCD 102 is reading the image area A2 of the original 21. Therefore the signal b2 corresponding to the pixel P2 of the CCD 102 in the second period of the two divided periods includes an image component a2-2 corresponding to the image area A2 of the original 21.

The CCD 102 moves relative to the original 21 and in the second period of the two divided periods of the exposure time from the time 0 to the time t0, the pixel P3 of the CCD 102 is reading the image area A2 of the original 21. Therefore the signal b3 corresponding to the pixel P3 of the CCD 102 in the second period of the two divided periods includes an image component a2-2 corresponding to the image area A2 of the original 21.

Similarly, because the CCD 102 moves relative to the original 21, the signal b6 corresponding to the pixel P2 of the CCD 102 includes image components a3-3 and a4-4 corresponding to the image areas A3 and A4 of the original 21. Because the CCD 102 moves relative to the original 21, the signal b7 corresponding to the pixel P3 of the CCD 102 includes image components a3-3 and a4-4 corresponding to the image areas A3 and A4 of the original 21.

Because the CCD 102 moves relative to the original 21, the signal b10 corresponding to the pixel P2 of the CCD 102 includes image components a5-5 and a6-6 corresponding to the image areas A5 and A6 of the original 21. Because the CCD 102 moves relative to the original 21, the signal b11 corresponding to the pixel P3 of the CCD 102 includes image components a5-5 and a6-6 corresponding to the image areas A5 and A6 of the original 21.

Because the CCD 102 moves relative to the original 21, the signal b14 corresponding to the pixel P2 of the CCD 102 includes image components a7-7 to a8-8 corresponding to the image areas A7 and A8 of the original 21. Because the CCD 102 moves relative to the original 21, the signal b15 corresponding to the pixel P3 of the CCD 102 includes image components a7-7 to a8-8 corresponding to the image areas A7 and A8 of the original 21.

Because the CCD 102 moves relative to the original 21 at the slower speed, the signals corresponding to the pixel P2 of the CCD 102 comprise fewer image components corresponding to different areas of the image of the original 21 as compared with the higher-speed movement.

In FIG. 26, a0-1 can be represented as a0.

In FIG. 26, a1-1 and a1-2, which are the image components corresponding to the image area A1 of the original 21 and therefore have the same value, can be represented as a1.

In FIG. 26, a2-2 and a2-3, which are the image components corresponding to the image area A2 of the original 21 and therefore have the same value, can be represented as a2.

In FIG. 26, a3-3 and a3-4, which are the image components corresponding to the image area A3 of the original 21 and therefore have the same value, can be represented as a3.

Similarly, the subsequent image components corresponding to the image areas A4 to A8 of the original 21 can be represented as a4 to a8.

Relations between the signals outputted by the CCD 102 as illustrated in FIG. 15 and the image components as illustrated in FIG. 26 can be expressed by equations (8).

$$b0+b1=2*(a0+a1)$$
$$b2+b3=2*(a1+a2)$$
$$b4+b5=2*(a2+a3)$$
$$b6+b7=2*(a3+a4)$$
$$b8+b9=2*(a4+a5)$$
$$b10+b11=2*(a5+a6)$$
$$b12+b13=2*(a6+a7)$$
$$b14+b15=2*(a7+a8) \quad (8)$$

In the equations (8), b1 to b15 are values of the signals outputted from the CCD 102, and a0 to a8 are unknown variables.

Figure 27:
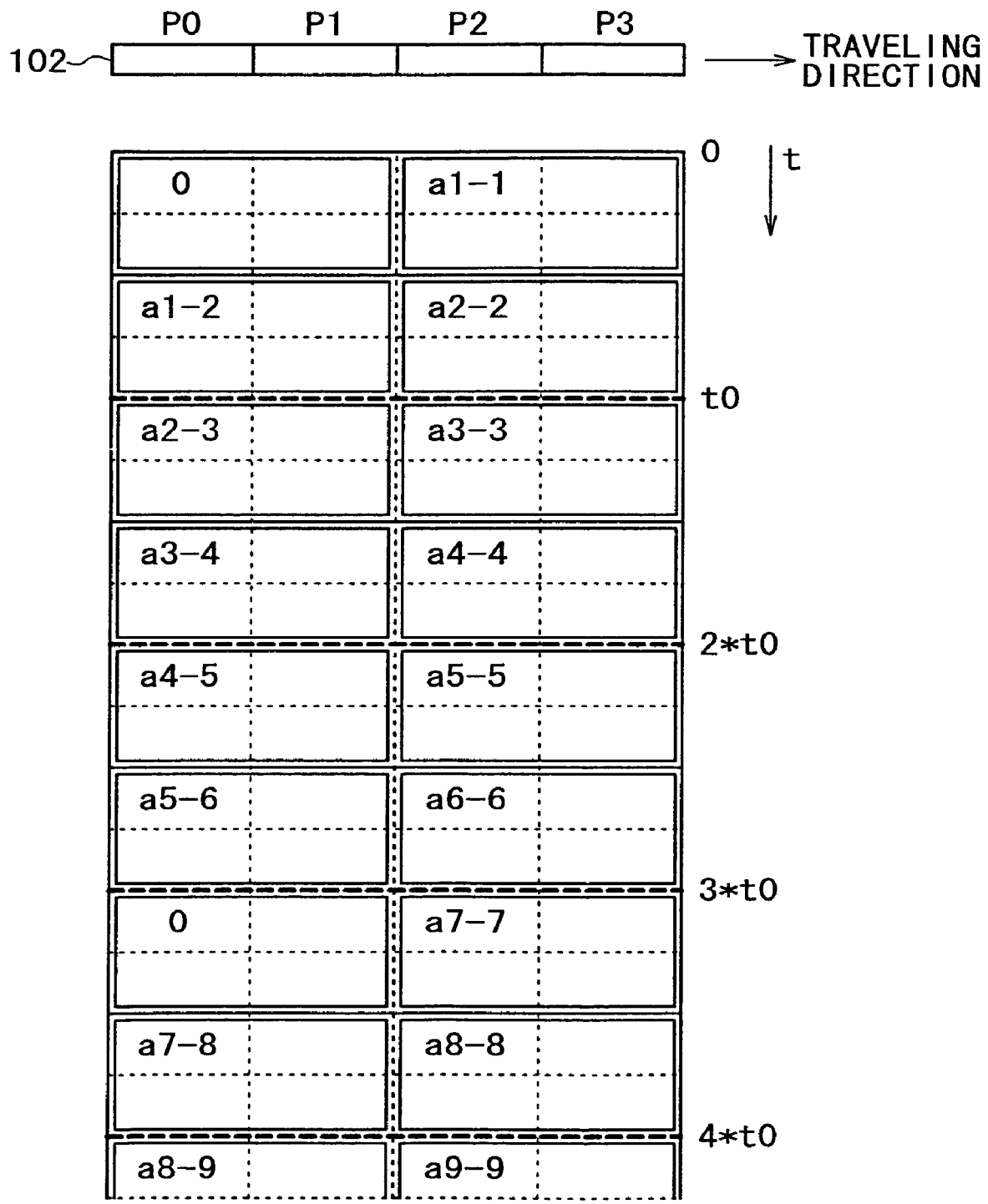
FIG. 27 is a diagram of assistance in explaining a concrete example of processing for obtaining known values and breaking a chain of effects of errors.

FIG. 27 is a diagram illustrating a concrete example of obtaining known values and breaking a chain of effects of errors. In FIG. 27, in periods corresponding to image components described as "0," the CCD 102 operates the respective electronic shutters of the pixels P0 to P2 to thereby sweep out charge accumulated in the photodiodes.

Specifically, at a start of the second period of the two divided periods of the exposure time from the time 0 to the time t0 (when one half of the exposure time t0 has passed), the CCD 102 operates the electronic shutters of the pixel P0 and the pixel P1 and thereby sweeps out charge accumulated in the photodiodes corresponding to the pixel P0 and the pixel P1. The CCD 102 does not operate the electronic shutters of the pixel P2 and the pixel P3 during the first exposure time t0.

Thus, the variable a0 in the equations corresponding to b0 to b4 in the equations (8) is zero, a known value. Therefore a1 and a2 can be calculated on the basis of the equations corresponding to b0 to b4 in the equations (8).

Further, at a start of the second period of the two divided periods of the exposure time from the time 3\*t0 to the time 4\*t0, the CCD 102 operates the electronic shutters of the pixel P0 and the pixel P1 and thereby sweeps out charge accumulated in the photodiodes corresponding to the pixel P0 and the pixel P1. The CCD 102 does not operate the electronic shutters of the pixel P2 and the pixel P3 during the exposure time from the time 3\*t0 to the time 4\*t0.

Similarly, the variable a6 in the equations corresponding to b12 to b15 in the equations (8) is zero, a known value. Therefore a7 and a8 can be calculated on the basis of the equations corresponding to b12 to b15 in the equations (8).

Thus, effects of errors included in the result obtained by solving the equations corresponding to the first exposure time are eliminated in the values calculated as solutions of a7 and a8, whereby propagation of errors can be blocked.

Relations between the signals outputted by the CCD 102 and the image components as illustrated in FIG. 27 can be expressed by equations (9).

$$b0+b1=2*a1$$
$$b2+b3=2*(a1+a2)$$
$$b4+b5=2*(a2+a3)$$
$$b6+b7=2*(a3+a4)$$
$$b8+b9=2*(a4+a5)$$
$$b10+b11=2*(a5+a6)$$
$$b12+b13=2*a7$$
$$b14+b15=2*(a7+a8) \quad (9)$$

The equations including b0 to b3 in the equations (9) have two unknown variables a1 and a2. Hence, the values of a1 and a2 are obtained.

Next, the equations including b4 to b7 are solved on the basis of the calculated value of a2, whereby values of a3 and a4 are calculated. The equations including b8 to b11 are solved on the basis of the value of a4, whereby values of a5 and a6 are calculated.

The equations including b12 to b15 have two unknown variables a7 and a8. Hence, the values of a7 and a8 are obtained without using the calculated value of a6.

Reading processing of the scanner or the image reading apparatus according to the present invention will next be described with reference to a flowchart of FIG. 28.

At a step S11, the main CPU 111 controls the driving unit not shown to move the CCD 102 and a reading area of the original 21 relatively to each other. For example, the main CPU 111 moves the CCD 102 and the reading area of the original 21 relatively to each other at the speed described with reference to FIG. 19.

At a step S12, the lens 12 condenses light corresponding to the reading area of the original 21 which light is reduced by the iris 101 on the CCD 102, and forms an image corresponding to the reading area of the original 21 on the CCD 102. At a step S13, the CCD 102 controls the electronic shutters to convert the incident light into charge. The CCD 102 further converts the converted charge into a voltage signal, and then supplies the obtained signal to the gain adjustment/noise suppression unit 104. The CCD 102 for example operates the electronic shutter for each pixel in the timing described with reference to FIG. 18 on the basis of the driving signal supplied from the timing generator 103.

At a step S14, the gain adjustment/noise suppression unit 104 adjusts gain of the signal supplied from the CCD 102, and suppresses noise such as 1/f noise or the like by applying correlated double sampling processing, for example. At a step S15, the A/D conversion unit 105 subjects the signal obtained by adjusting the gain and suppressing the noise to analog/digital conversion, and thereby generates a digital signal.

At a step S16, the A/D conversion unit 105 stores the one-dimensional digital signal in the memory 106. Incidentally, the A/D conversion unit 105 may store the digital signal in the memory 108.

At a step S17, the main CPU 111 determines whether or not scanning of the entire image surface of the original 21 is completed on the basis of a signal indicating the position of the CCD 102, for example. When the main CPU 111 determines that the scanning of the entire image surface of the original 21 is not completed, a next area of the original 21 needs to be read, and therefore the processing returns to the step 11 to repeat the reading processing.

When the main CPU 111 determines at the step S17 that the scanning of the entire image surface of the original 21 is completed, since the entire image surface of the original 21 is read and two-dimensional image data is formed, the processing proceeds to a step S18. The signal processing unit 107 applies image signal processing to the image data stored in the memory 106. The image signal processing will be described later in detail.

At a step S19, the signal processing unit 107 stores the image data to which the signal processing has been applied in the memory 110 or makes the data transmission unit 109 transmit the image data, whereby the processing is ended.

Figure 29:
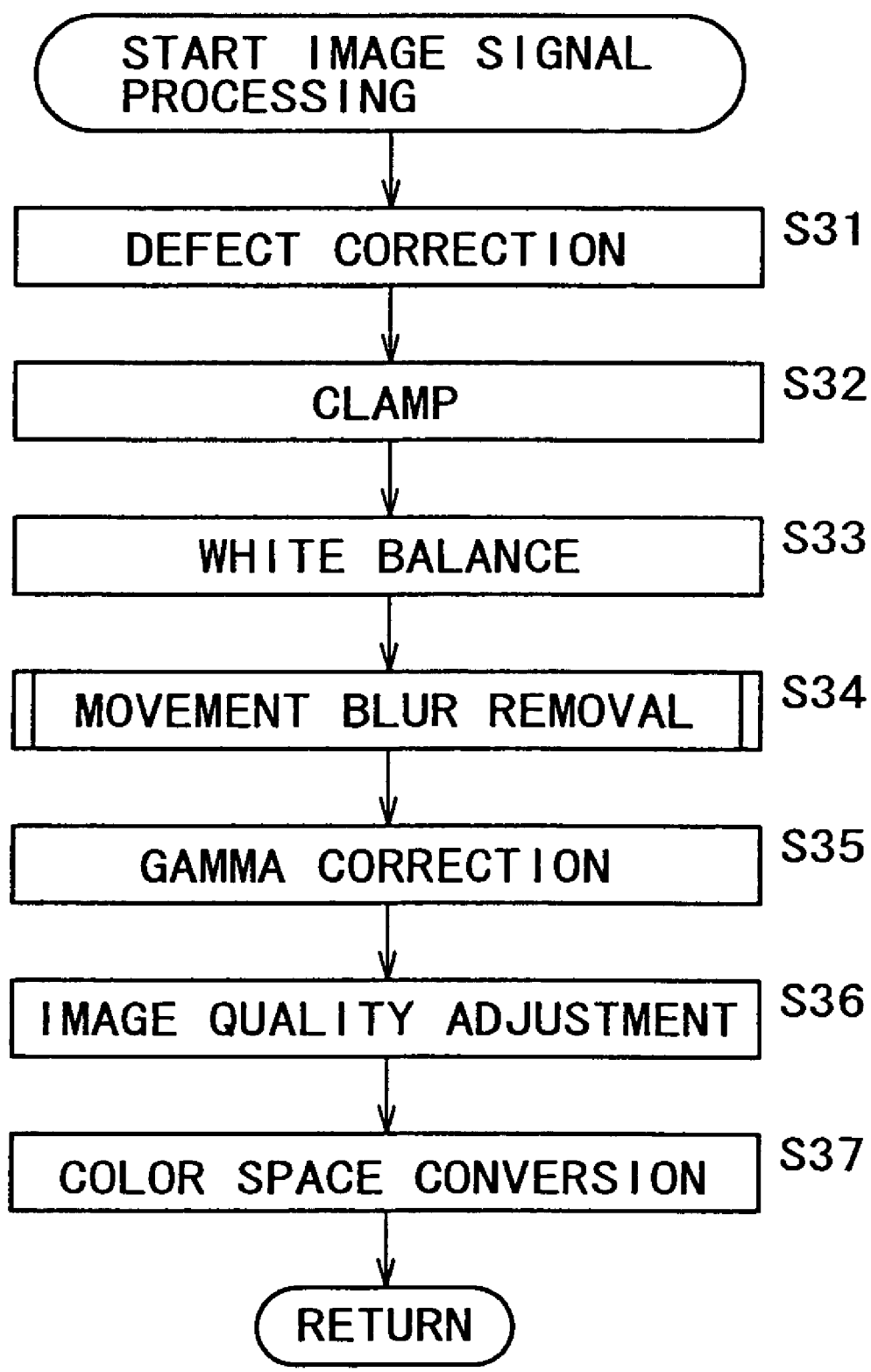
FIG. 29 is a flowchart of assistance in explaining image signal processing.

FIG. 29 is a flowchart of assistance in explaining details of the image signal processing corresponding to the step S18.

At a step S31, the defect correction unit 151 detects a position of a flawed or defective pixel of the input image data, and corrects the flawed or defective pixel by setting an adjacent pixel value in the flawed or defective pixel, for example. At a step S32, the clamp unit 152 sets a setup level of a luminance signal of the image data, and clamps the image data.

At a step S33, the white balance unit 153 adjusts RGB gain in correspondence with a predetermined color temperature, and thereby adjusts white balance of the image data.

At a step S34, the movement blur removing unit 154 removes movement blur included in the image data. The movement blur removal processing will be described later in detail.

At a step S35, the gamma correction unit 155 applies gamma correction for adjusting level of the image data corresponding to intensity of light of the CCD 102 to the image data without the movement blur.

At a step S36, the image quality adjustment unit 156 applies processing for visually improving the image, for example contour correction processing and other image quality adjustment processing to the image data.

At a step S37, the color space conversion unit 157 converts a color space according to an output format of the image data. Then the processing is ended.

The movement blur removal processing corresponding to the step S34 will next be described with reference to a flowchart of FIG. 30.

At a step S51, the processing unit extracting unit 171 extracts a processing unit comprising a predetermined number of pixels from the image data. For example, the processing unit extracting unit 171 extracts b0 to b11 shown in FIG. 15 as a processing unit.

At a step S52, the modeling unit 172 generates a model for dividing a signal integrated in an exposure time in a time direction from the relative speed between the original 21 and the CCD 102 on the basis of the processing unit supplied from the processing unit extracting unit 171. For example, the modeling unit 172 generates a model that indicates a relation between the number of pixels of the image data generated as a result of removing movement blur and the number of pixels included in the processing unit.

At a step S53, the equation constructing unit 173 constructs equations for calculating pixel values of the image data without movement blur on the basis of the generated model and the extracted processing unit.

At a step S54, the simultaneous equation calculating unit 174 calculates the simultaneous equations supplied from the equation constructing unit 173, thereby solves the simultaneous equations and calculates image components. Specifically, the simultaneous equation calculating unit 174 corrects gain of the calculated image components according to the number of divisions of the exposure time, and sets the gain-corrected image components as pixel values of the image data. Thus, the simultaneous equation calculating unit 174 removes movement blur from the image data, and then outputs the image data without movement blur.

At a step S55, the movement blur removing unit 154 determines whether or not the processing for the entire image surface is completed on the basis of a position of the extracted processing unit with respect to the image surface, for example. When the movement blur removing unit 154 determines that the processing for the entire image surface is not completed, the processing returns to the step S51 to extract another processing unit and repeat the movement blur removing processing.

When the movement blur removing unit 154 determines at the step S55 that the processing for the entire image surface is completed, the processing is ended.

Thus, the scanner according to the present invention can calculate image components and remove movement blur from read images.

S/N of the calculated image components is a better value than S/N of an image picked up by the CCD 102 at each original area corresponding to an image component. This is because when an electronic shutter is operated at each original area corresponding to an image component for image pickup, the image pickup needs to be performed in a very short exposure time and consequently the picked-up image includes a large amount of noise.

When the scanner has a mechanical shutter and performs image pickup by the mechanical shutter, the number of shutter operations is reduced, thus decreasing load on the mechanism and hence decreasing failures.

Further, because it is not necessary to stop the CCD 102 at each original area, the time required to pick up an image of a desired area of a subject is shortened as compared with the conventional apparatus.

Figure 31:
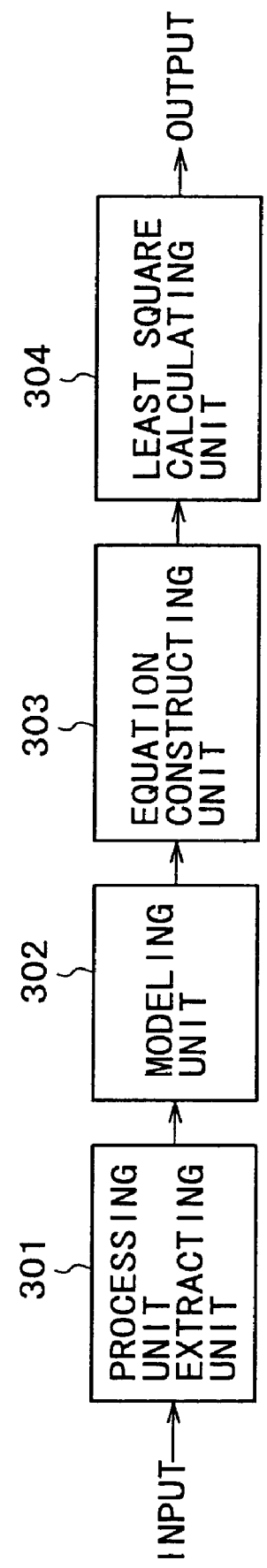
FIG. 31 is a block diagram showing a functional configuration of a movement blur removing unit 154.

FIG. 31 is a block diagram showing another functional configuration of the movement blur removing unit 154.

A processing unit extracting unit 301 extracts a processing unit comprising predetermined pixels of image data in correspondence with timing of the electronic shutters of the CCD 102 or the like. The processing unit extracting unit 301 supplies the extracted processing unit to a modeling unit 302.

The modeling unit 302 generates a model on the basis of the processing unit supplied from the processing unit extracting unit 301, and then supplies the processing unit together with the generated model to an equation constructing unit 303. The model generated by the modeling unit 302 for example indicates the number of image components without movement blur included in pixels and the number of pixels included in the processing unit.

The equation constructing unit 303 applies a method of least squares and thereby constructs equations for calculating image components free from movement blur on the basis of the model and the processing unit supplied from the modeling unit 302. The equation constructing unit 303 supplies the constructed equations to a least square calculating unit 304.

The least square calculating unit 304 solves the equations supplied from the equation constructing unit 303, and thereby calculates the image components without movement blur. The least square calculating unit 304 corrects gain of the calculated image components according to the number of image components included in a pixel value, and sets the gain-corrected image components as pixel values of the image data. The least square calculating unit 304 outputs the image data without movement blur.

As described with reference to the equations (1), when all unknown variables are determined in an equation group immediately preceding that of an exposure time of interest, there are m−1 known variables in the equation group immediately preceding that of the exposure time of interest. By using the known variables, the number of unknown variables becomes equal to the number of equations. Thus, all unknown variables can be determined.

However, the above method cannot be said to be resistant to disturbance such as noise because when a large error occurs in a calculation corresponding to some exposure time, errors are caused in results of calculations corresponding to subsequent exposure times.

Accordingly, a method is proposed which provides more accurate results even under disturbances by controlling timing of the shutters of the CCD 102 for each detecting element (pixel).

Figure 32:
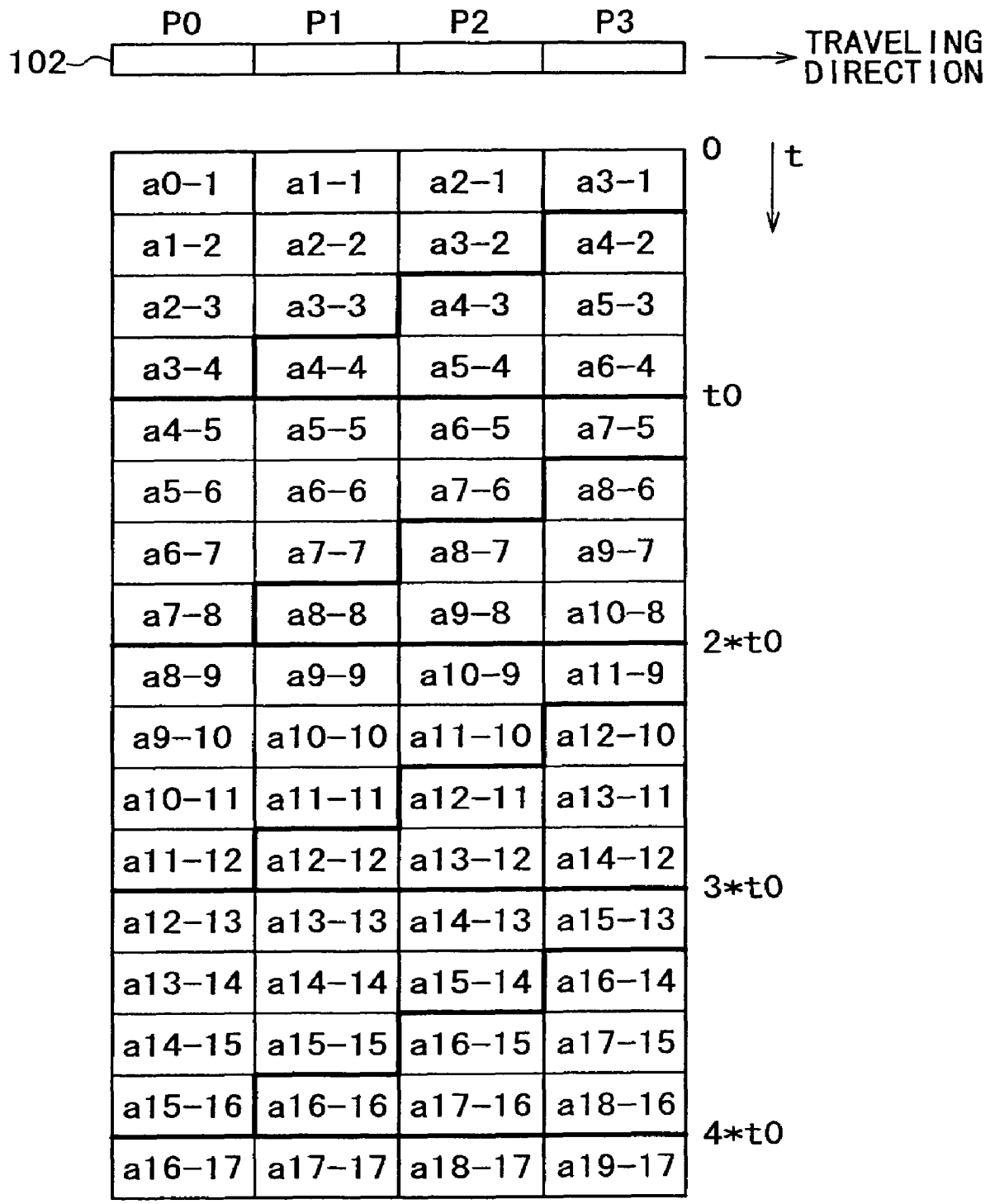
FIG. 32 is a diagram of assistance in explaining a concrete example of processing for controlling timing of shutters of the CCD 102 for each detecting element and calculating image components.
Figure 33:
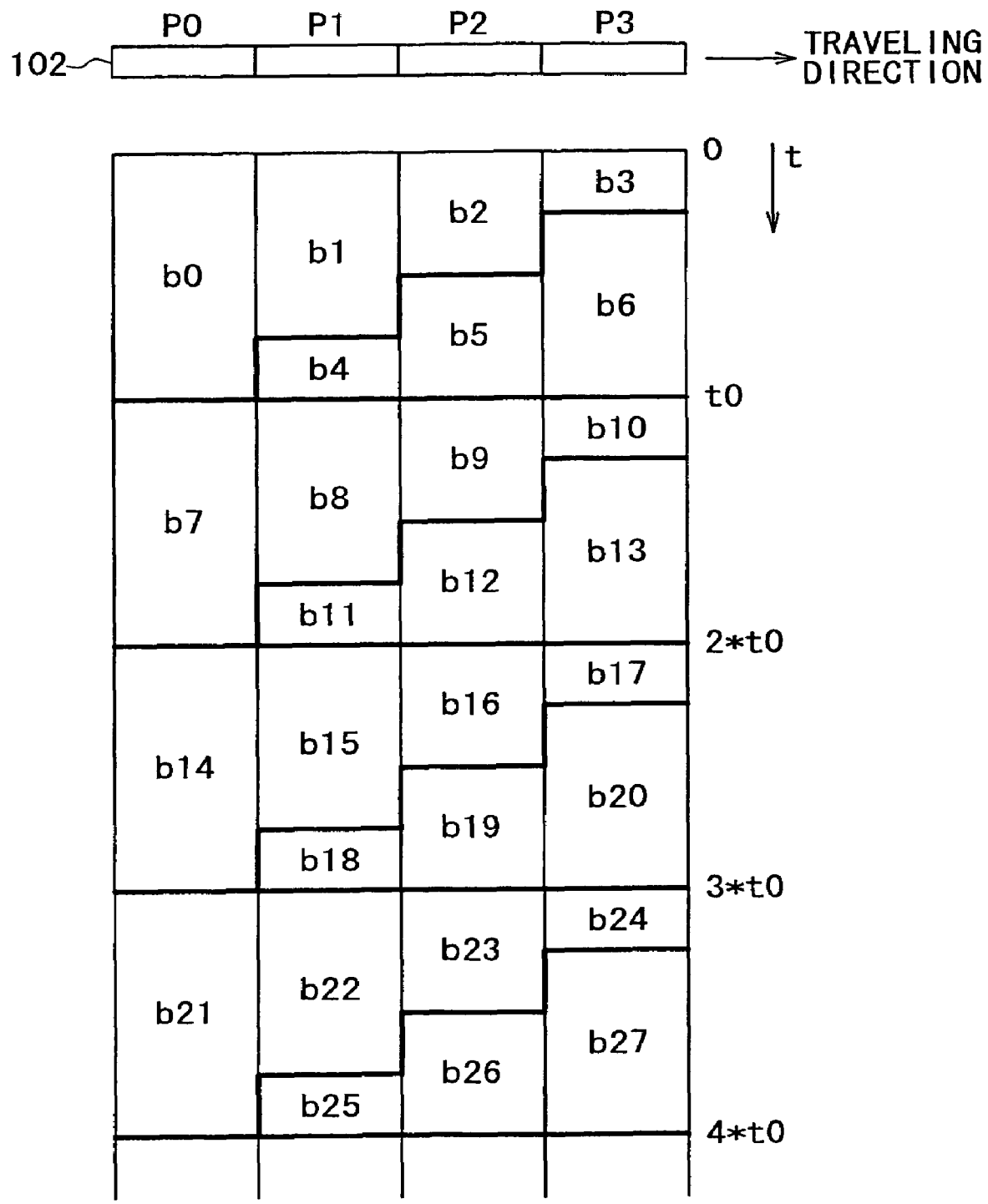
FIG. 33 is a diagram of assistance in explaining the concrete example of processing for controlling the timing of the shutters of the CCD 102 for each detecting element and calculating the image components.

FIG. 32 and FIG. 33 are diagrams of assistance in explaining a concrete example of processing for controlling the timing of the shutters of the CCD 102 for each detecting element and calculating image components. Thick lines in FIG. 32 and FIG. 33 indicate the timing of operation of the electronic shutters by the CCD 102.

FIG. 32 is a diagram showing image components included in signals outputted by the CCD 102. FIG. 33 is a diagram showing the signals outputted by the CCD 102.

Specifically, the CCD 102 does not operate the electronic shutter of the pixel P0 during a first exposure time t0, and operates the electronic shutter at a time t0. The CCD 102 makes the pixel P0 output a signal b0 including image components a0-1 to a3-4 at the time t0.

At a start of a fourth period of four divided periods of the exposure time t0 from a time 0 to the time t0 (when three fourths of the exposure time t0 has passed), the CCD 102 operates the electronic shutter of the pixel P1 to output a signal b1 corresponding to exposure until the passage of three fourths of the exposure time t0 from the time 0. The signal b1 includes image components a1-1 to a3-3.

At the time t0, the CCD 102 operates the electronic shutter of the pixel P1 to output a signal b4 corresponding to exposure from a time when three fourths of the exposure time t0 has passed to the time t0. The signal b4 includes an image component a4-4.

At a start of a third period of the four divided periods of the exposure time t0 from the time 0 to the time t0 (when one half of the exposure time t0 has passed), the CCD 102 operates the electronic shutter of the pixel P2 to output a signal b2 corresponding to exposure until the passage of one half of the exposure time t0 from the time 0. The signal b2 includes image components a2-1 and a3-2.

At the time t0, the CCD 102 operates the electronic shutter of the pixel P2 to output a signal b5 corresponding to exposure from a time when one half of the exposure time t0 has passed to the time t0. The signal b5 includes image components a4-3 and a5-4.

At a start of a second period of the four divided periods of the exposure time t0 from the time 0 to the time t0 (when one fourth of the exposure time t0 has passed), the CCD 102 operates the electronic shutter of the pixel P3 to output a signal b3 corresponding to exposure until the passage of one fourth of the exposure time t0 from the time 0. The signal b3 includes an image component a3-1.

At the time t0, the CCD 102 operates the electronic shutter of the pixel P3 to output a signal b6 corresponding to exposure from a time when one fourth of the exposure time t0 has passed to the time t0. The signal b6 includes image components a4-2 to a6-4.

Similarly, in image pickup after the time t0, the CCD 102 does not operate the electronic shutter of the pixel P0 during an exposure time t0, and operates the electronic shutter when the exposure time t0 has passed.

In image pickup after the time t0, when three fourths of the exposure time t0 has passed, the CCD 102 operates the electronic shutter of the pixel P1 to output a signal corresponding to exposure. When one fourth of the exposure time t0 has passed, the CCD 102 operates the electronic shutter of the pixel P1 to output a signal corresponding to exposure.

The CCD 102 alternately repeats the operation of the electronic shutter of the pixel P1 at the time of passage of three fourths of the exposure time to and the operation of the electronic shutter of the pixel P1 at the time of passage of one fourth of the exposure time t0.

In image pickup after the time t0, when one half of the exposure time t0 has passed, the CCD 102 operates the electronic shutter of the pixel P2 to output a signal corresponding to exposure.

The CCD 102 repeats the operation of the electronic shutter of the pixel P2 at the time of passage of one half of the exposure time to.

In image pickup after the time t0, when one fourth of the exposure time t0 has passed, the CCD 102 operates the electronic shutter of the pixel P3 to output a signal corresponding to exposure. When three fourths of the exposure time t0 has passed, the CCD 102 operates the electronic shutter of the pixel P3 to output a signal corresponding to exposure.

The CCD 102 alternately repeats the operation of the electronic shutter of the pixel P3 at the time of passage of one fourth of the exposure time t0 and the operation of the electronic shutter of the pixel P3 at the time of passage of three fourths of the exposure time t0.

Thus, the number of unknown variables becomes equal to the number of known signals, so that the unknown variables can be calculated on the basis of equations corresponding to the respective known signals.

Relations between the image components as illustrated in FIG. 32 and the signals as illustrated in FIG. 33 can be expressed by equations (10).

$$b0 = a0+a1+a2+a3$$
$$b1 = a1+a2+a3$$
$$b2 = a2+a3$$
$$b3 = a3$$
$$b4 = a4$$
$$b5 = a4+a5$$
$$b6 = a4+a5+a6$$
$$b7 = a4+a5+a6+a7$$
$$b8 = a5+a6+a7$$
$$b9 = a6+a7$$
$$b10 = a7$$
$$b11 = a8$$
$$b12 = a8+a9$$
$$b13 = a8+a9+a10$$
$$b14 = a8+a9+a10+a11$$
$$b15 = a9+a10+a11$$
$$b16 = a10+a11$$
$$b17 = a11$$
$$b18 = a12$$
$$b19 = a12+a13$$
$$b20 = a12+a13+a14$$
$$b21 = a12+a13+a14+a15$$
$$b22 = a13+a14+a15$$
$$b23 = a14+a15$$
$$b24 = a15$$
$$b25 = a16$$
$$b26 = a16+a17$$
$$b27 = a16+a17+a18 \quad (10)$$

Supposing that the equations corresponding to the signals b4 to b10 form one equation group, there are four unknown variables a4 to a7 and seven equations in the one equation group.

The equations corresponding to the signals b11 to b17 are set as an equation group, and the method of least squares is applied to the equation group to obtain values of unknown variables a8 to a11.

Thus, by applying the method of least squares to equations corresponding to a group of signals outputted before and after a time corresponding to an exposure time, it is possible to calculate image components with reduced errors.

In this case, since S/N of a signal resulting from a short exposure time and small accumulated charge is low, by reducing a weight of data corresponding to a signal resulting from a short exposure time and increasing a weight of data corresponding to a signal resulting from a long exposure time, image components can be calculated with higher accuracy.

The method of least squares will be described briefly in the following.

Supposing that an unknown quantity W acts on an input value X to thereby provide an observed value Y, an observation equation as represented by an equation (11) is obtained.

$$XW = Y \quad (11)$$

$$X = \begin{bmatrix} X_{11} & X_{12} & \ldots & X_{1m} \\ X_{21} & X_{22} & \ldots & X_{2m} \\ \ldots & \ldots & \ldots & \ldots \\ X_{n1} & X_{n2} & \ldots & X_{nm} \end{bmatrix}, \quad W = \begin{bmatrix} W_1 \\ W_2 \\ \ldots \\ W_m \end{bmatrix}, \quad Y = \begin{bmatrix} y_1 \\ y_2 \\ \ldots \\ y_n \end{bmatrix} \quad (12)$$

where m<n in the equation (12).

In consideration of an error included in the observed value Y, the equation (11) can be expressed by a residual equation (13).

$$XW = Y + E \quad (13)$$

$$E = \begin{bmatrix} e_1 \\ e_2 \\ \ldots \\ e_n \end{bmatrix} \quad (14)$$

In order to find the most probable value of the unknown quantity $W_j$ (j=1, 2 ..., m) from the equation (13), it suffices to find $W_1, W_2, \ldots, W_m$ that satisfy a condition for minimizing an equation (15), that is, an equation (16).

$$\sum_{i=1}^{n} e_i^2 \quad (15)$$

$$e_1 \frac{\partial e_1}{\partial w_j} + e_2 \frac{\partial e_2}{\partial w_j} + \ldots + e_n \frac{\partial e_n}{\partial w_j} = 0 (j = 1, 2, \ldots, m) \quad (16)$$

Equations (17) are derived from the equation (14).

$$\frac{\partial e_i}{\partial w_1} = X_{i1}, \frac{\partial e_2}{\partial w_2} = X_{i2}, \ldots, \frac{\partial e_i}{\partial w_m} = X_{im} (i = 1, 2, \ldots, n) \quad (17)$$

When equations are set up for j=1, 2, . . . , m from the condition of the equation (16), equations (18) are obtained.

$$\sum_{i=1}^{n} e_i X_{i1} = 0, \sum_{i=1}^{n} e_i X_{i2} = 0, \ldots, \sum_{i=1}^{n} e_i X_{im} = 0 \quad (18)$$

From the equation (14) and the equations (18), normal equations represented by equations (19) are obtained.

$$\begin{cases} \left(\sum_{i=1}^{n} X_{i1}X_{i1}\right)w_1 + \left(\sum_{i=1}^{n} X_{i1}X_{i2}\right)w_2 + \ldots + \left(\sum_{i=1}^{n} X_{i1}X_{im}\right)w_m = \left(\sum_{i=1}^{n} X_{i1}y_i\right) \\ \left(\sum_{i=1}^{n} X_{i2}X_{i1}\right)w_1 + \left(\sum_{i=1}^{n} X_{i2}X_{i2}\right)w_2 + \ldots + \left(\sum_{i=1}^{n} X_{i2}X_{im}\right)w_m = \left(\sum_{i=1}^{n} X_{i2}y_i\right) \\ \quad \ldots \\ \left(\sum_{i=1}^{n} X_{im}X_{i1}\right)w_1 + \left(\sum_{i=1}^{n} X_{im}X_{i2}\right)w_2 + \ldots + \left(\sum_{i=1}^{n} X_{im}X_{im}\right)w_m = \left(\sum_{i=1}^{n} X_{im}y_i\right) \end{cases} \quad (19)$$

The normal equations are simultaneous equations comprising the same number of equations as the number of unknowns. By solving the normal equations, each $w_j$ (j=1, 2, ..., m) as the most probable value can be determined.

To be more exact, when a matrix of $$\sum_{i=1}^{n} x_{ik} x_{il}$$

(where k=1, 2, ..., m, and l=1, 2, ..., m) acting on $w_j$ (j=1, 2, ..., m) in the equations (19) is regular, the equations (19) can be solved.

The least square calculating unit 304 determines the most probable value by applying a sweep-out method (Gauss-Jordan elimination) or the like to the equations (19).

For example, normal equations corresponding to the equations of the signals b4 to b10 in the equations (10) are represented as equations (20).

$1 \cdot a4 + 0 \cdot a5 + 0 \cdot a6 + 0 \cdot a7 = b4$ $1 \cdot a4 + 1 \cdot a5 + 0 \cdot a6 + 0 \cdot a7 = b5$ $1 \cdot a4 + 1 \cdot a5 + 1 \cdot a6 + 0 \cdot a7 = b6$ $1 \cdot a4 + 1 \cdot a5 + 1 \cdot a6 + 1 \cdot a7 = b7$ $0 \cdot a4 + 1 \cdot a5 + 1 \cdot a6 + 1 \cdot a7 = b8$ $0 \cdot a4 + 0 \cdot a5 + 1 \cdot a6 + 1 \cdot a7 = b9$ $0 \cdot a4 + 0 \cdot a5 + 0 \cdot a6 + 1 \cdot a7 = b10 \quad (20)$ The equations (20) can be represented as XW=Y.

X can be represented as an equation (21); W can be represented as an equation (22); and Y can be represented as an equation (23).

$$X = \begin{pmatrix} 1 & 0 & 0 & 0 \\ 1 & 1 & 0 & 0 \\ 1 & 1 & 1 & 0 \\ 1 & 1 & 1 & 1 \\ 0 & 1 & 1 & 1 \\ 0 & 0 & 1 & 1 \\ 0 & 0 & 0 & 1 \end{pmatrix} \quad (21)$$

$$W = \begin{pmatrix} a4 \\ a5 \\ a6 \\ a7 \end{pmatrix} \quad (22)$$

-continued $$Y = \begin{pmatrix} b4 \\ b5 \\ b6 \\ b7 \\ b8 \\ b9 \\ b10 \end{pmatrix} \quad (23)$$

X is known, W is unknown, and Y is known.

When the method of least squares is applied to this, an equation (24) is obtained.

$$\begin{pmatrix} 4 & 3 & 2 & 1 \\ 3 & 4 & 3 & 2 \\ 2 & 3 & 4 & 3 \\ 1 & 2 & 3 & 4 \end{pmatrix} \begin{pmatrix} a4 \\ a5 \\ a6 \\ a7 \end{pmatrix} = \begin{pmatrix} b4+b5+b6+b7 \\ b5+b6+b7+b8 \\ b6+b7+b8+b9 \\ b7+b8+b9+b10 \end{pmatrix} \quad (24)$$

An equation (25) represents an example of an observation equation XW=Y when weighting corresponding to exposure times is performed.

$$\begin{pmatrix} 1 & 0 & 0 & 0 \\ 1 & 1 & 0 & 0 \\ 1 & 1 & 0 & 0 \\ 1 & 1 & 1 & 0 \\ 1 & 1 & 1 & 0 \\ 1 & 1 & 1 & 0 \\ 1 & 1 & 1 & 1 \\ 1 & 1 & 1 & 1 \\ 1 & 1 & 1 & 1 \\ 1 & 1 & 1 & 1 \\ 0 & 1 & 1 & 1 \\ 0 & 1 & 1 & 1 \\ 0 & 1 & 1 & 1 \\ 0 & 0 & 1 & 1 \\ 0 & 0 & 1 & 1 \\ 0 & 0 & 0 & 1 \end{pmatrix} \begin{pmatrix} a4 \\ a5 \\ a6 \\ a7 \end{pmatrix} = \begin{pmatrix} b4 \\ b5 \\ b5 \\ b6 \\ b6 \\ b6 \\ b7 \\ b7 \\ b7 \\ b7 \\ b8 \\ b8 \\ b8 \\ b9 \\ b9 \\ b10 \end{pmatrix} \quad (25)$$

X can be represented as an equation (26); W can be represented as an equation (27); and Y can be represented as an equation (28).

$$X = \begin{pmatrix} 1 & 0 & 0 & 0 \\ 1 & 1 & 0 & 0 \\ 1 & 1 & 0 & 0 \\ 1 & 1 & 1 & 0 \\ 1 & 1 & 1 & 0 \\ 1 & 1 & 1 & 0 \\ 1 & 1 & 1 & 1 \\ 1 & 1 & 1 & 1 \\ 1 & 1 & 1 & 1 \\ 1 & 1 & 1 & 1 \\ 0 & 1 & 1 & 1 \\ 0 & 1 & 1 & 1 \\ 0 & 1 & 1 & 1 \\ 0 & 1 & 1 & 1 \\ 0 & 1 & 1 & 1 \\ 0 & 1 & 1 & 1 \end{pmatrix} \quad (26)$$

$$W = \begin{pmatrix} a4 \\ a5 \\ a6 \\ a7 \end{pmatrix} \quad (27)$$

$$Y = \begin{pmatrix} b4 \\ b5 \\ b5 \\ b6 \\ b6 \\ b6 \\ b7 \\ b7 \\ b7 \\ b7 \\ b8 \\ b8 \\ b8 \\ b9 \\ b9 \\ b10 \end{pmatrix} \quad (28)$$

When the method of least squares is applied to this, an equation (29) is obtained.

$$\begin{pmatrix} 10 & 9 & 7 & 4 \\ 9 & 12 & 10 & 7 \\ 7 & 10 & 12 & 9 \\ 4 & 7 & 9 & 10 \end{pmatrix} \begin{pmatrix} a4 \\ a5 \\ a6 \\ a7 \end{pmatrix} = \begin{pmatrix} b4 + 2b5 + 3b6 + 4n7 \\ 2b5 + 3b6 + 4b7 + 3b8 \\ 3b6 + 4b7 + 3b8 + 2b9 \\ 4b7 + 3b8 + 2b9 + b10 \end{pmatrix} \quad (29)$$

By performing weighting corresponding to lengths of the exposure times, it is possible to further reduce effect of noise included in the signals and thereby obtain image components with higher accuracy.

The timing of the electronic shutters described taking FIG. 32 as an example is a mere example. Basically, each image component can be calculated when the number of equations is larger than the number of unknown variables, and therefore various patterns are conceivable as the timing of the electronic shutters.

Figure 34:
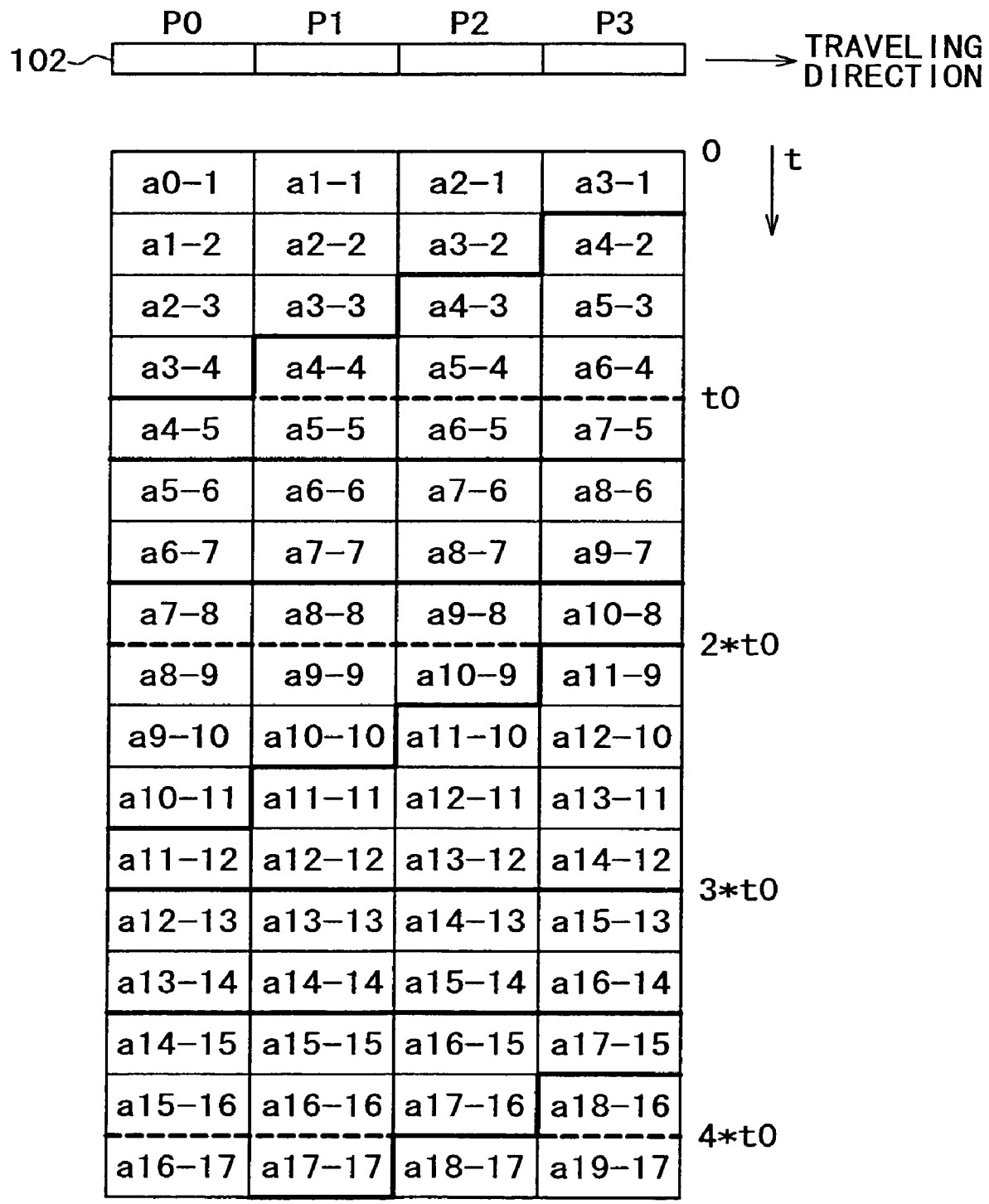
FIG. 34 is a diagram of assistance in explaining another concrete example of processing for controlling timing of the shutters of the CCD 102 for each detecting element and calculating image components.
Figure 35:
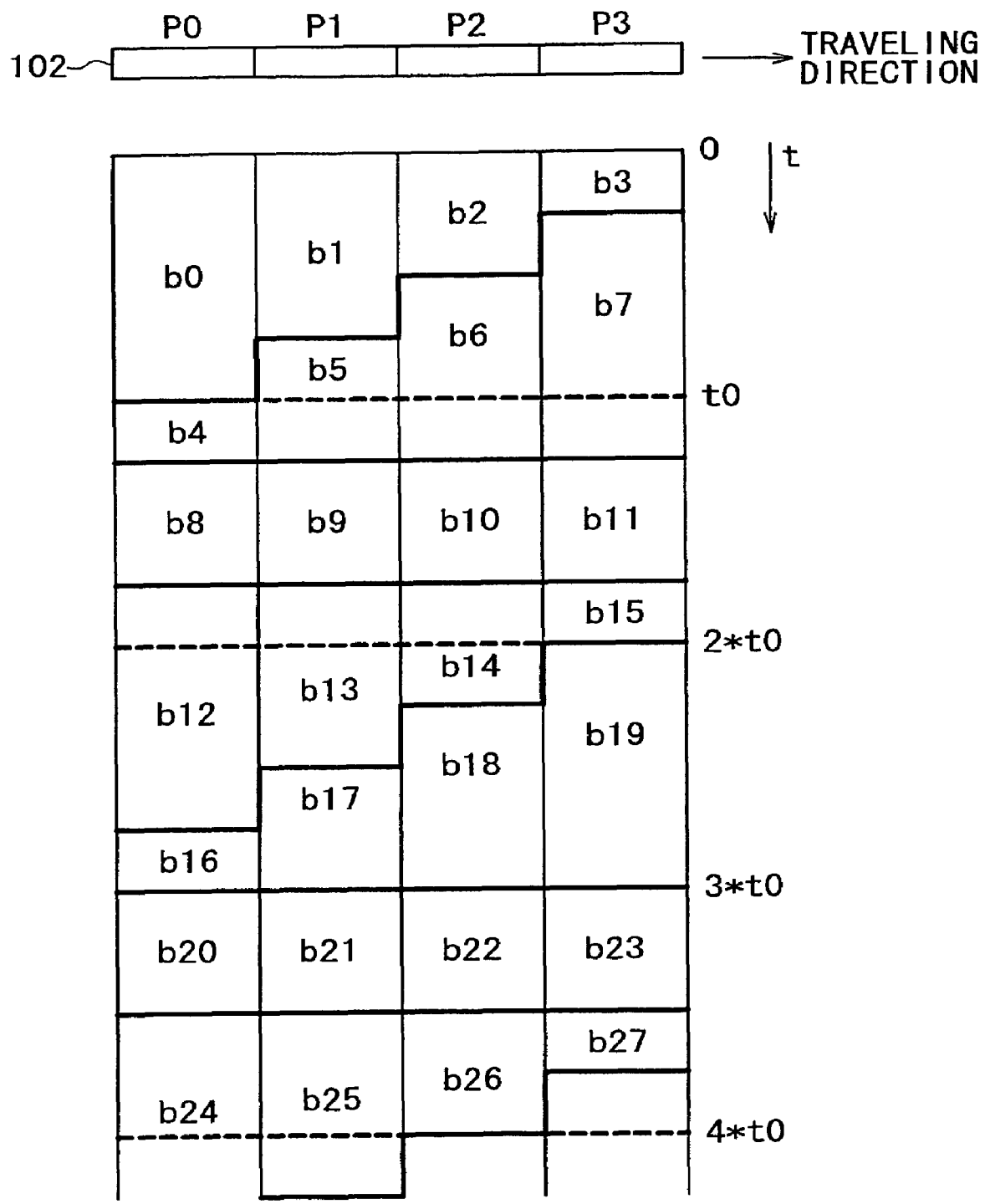
FIG. 35 is a diagram of assistance in explaining the other concrete example of processing for controlling the timing of the shutters of the CCD 102 for each detecting element and calculating the image components.

FIG. 34 and FIG. 35 are diagrams of assistance in explaining another concrete example of processing for controlling the timing of the shutters of the CCD 102 for each detecting element and calculating image components. Thick lines in FIG. 34 and FIG. 35 indicate the timing of operation of the electronic shutters by the CCD 102.

FIG. 34 is a diagram showing image components included in signals outputted by the CCD 102. FIG. 35 is a diagram showing the signals outputted by the CCD 102.

Specifically, the CCD 102 does not operate the electronic shutter of the pixel P0 during a first exposure time to, and operates the electronic shutter at a time t0. The CCD 102 makes the pixel P0 output a signal b0 including image components a0-1 to a3-4 at the time to.

When one fourth of an exposure time t0 has passed from the time t0, the CCD 102 operates the electronic shutter of the pixel P0 to output a signal b4 corresponding to exposure until the passage of one fourth of the exposure time t0 from the time t0. The signal b4 includes an image component a4-5.

When three fourths of the exposure time t0 has passed from the time 0, the CCD 102 operates the electronic shutter of the pixel P1 to output a signal b1 corresponding to exposure until the passage of three fourths of the exposure time t0 from the time 0. The signal b1 includes image components a1-1 to a3-3.

When one half of the exposure time t0 has further passed from the time of passage of three fourths of the exposure time t0, the CCD 102 operates the electronic shutter of the pixel P1 to output a signal b5. The signal b5 includes image components a4-4 and a5-5.

When one half of the exposure time t0 has passed from the time 0, the CCD 102 operates the electronic shutter of the pixel P2 to output a signal b2 corresponding to exposure until the passage of one half of the exposure time t0 from the time 0. The signal b2 includes image components a2-1 and a3-2.

When three fourths of the exposure time t0 has further passed from the time of passage of one half of the exposure time t0, the CCD 102 operates the electronic shutter of the pixel P2 to output a signal b6. The signal b6 includes image components a4-3 to a6-5.

When one fourth of the exposure time t0 from the time 0 to the time t0 has passed, the CCD 102 operates the electronic shutter of the pixel P3 to output a signal b3 corresponding to exposure until the passage of one fourth of the exposure time t0 from the time 0. The signal b3 includes an image component a3-1.

When the exposure time t0 has further passed from the time of passage of one fourth of the exposure time t0, the CCD 102 operates the electronic shutter of the pixel P3 to output a signal b7. The signal b7 includes image components a4-2 to a7-5.

When one half of the exposure time t0 has further passed, the CCD 102 operates the electronic shutters of the pixels P0 to P3 to output signals b8 to b11 corresponding to exposure until the passage of one half of the exposure time t0. The signal b8 includes image components a5-6 and a6-7. The signal b9 includes image components a6-6 and a7-7. The signal b10 includes image components a7-6 and a8-7. The signal b11 includes image components a8-6 and a9-7.

Similarly, when an exposure time t0 has passed subsequently, the CCD 102 operates the electronic shutter of the pixel P0. The CCD 102 makes the pixel P0 output a signal b12 including image components a7-8 to a10-11.

When one fourth of an exposure time t0 has further passed, the CCD 102 operates the electronic shutter of the pixel P0 to output a signal b16 corresponding to exposure until the passage of one fourth of the exposure time t0. The signal b16 includes an image component a11-12.

When three fourths of the exposure time t0 has passed from the time of the previous operation of the electronic shutter of the pixel P1, the CCD 102 operates the electronic shutter of the pixel P1 to output a signal b13 corresponding to exposure until the passage of three fourths of the exposure time t0. The signal b13 includes image components a8-8 to a10-10.

When one half of the exposure time t0 has further passed, the CCD 102 operates the electronic shutter of the pixel P1 to output a signal b17. The signal b17 includes image components a11-11 and a12-12.

When one half of the exposure time t0 has passed from the time of the previous operation of the electronic shutter of the pixel P2, the CCD 102 operates the electronic shutter of the pixel P2 to output a signal b14 corresponding to exposure until the passage of one half of the exposure time t0. The signal b14 includes image components a9-8 and a10-9.

When three fourths of the exposure time t0 has further passed, the CCD 102 operates the electronic shutter of the pixel P2 to output a signal b18. The signal b18 includes image components a11-10 to a13-12.

When one fourth of the exposure time t0 has passed from the time of the previous operation of the electronic shutter of the pixel P3, the CCD 102 operates the electronic shutter of the pixel P3 to output a signal b15 corresponding to exposure until the passage of one fourth of the exposure time t0. The signal b15 includes an image component a10-8.

When the exposure time t0 has further passed, the CCD 102 operates the electronic shutter of the pixel P3 to output a signal b19. The signal b19 includes image components a11-9 to a14-12.

When one half of the exposure time t0 has passed from a time 3*t0, the CCD 102 operates the electronic shutters of the pixels P0 to P3 to output signals b20 to b23 corresponding to exposure until the passage of one half of the exposure time t0. The signal b20 includes image components a12-13 and a13-14. The signal b21 includes image components a13-13 and a14-14. The signal b22 includes image components a14-13 and a15-14. The signal b23 includes image components a15-13 and a16-14.

The CCD 102 repeats the operation of the electronic shutters in the timing described above to output signals.

Thus, the number of unknown variables is seven for 12 known signals, hence the number of signals exceeding the number of unknown variables. The unknown variables can therefore be calculated on the basis of equations corresponding to the respective known signals.

Relations between the image components as illustrated in FIG. 34 and the signals as illustrated in FIG. 35 can be expressed by equations (30).

$$b4=a4$$

$$b5=a4+a5$$

$$b6=a4+a5+a6$$

$$b7=a4+a5+a6+a7$$

$$b8=a5+a6$$

$$b9=a6+a7$$

$$b10=a7+a8$$

$$b11=a8+a9$$

$$b12=a7+a8+a9+a10$$

$$b13=a8+a9+a10$$

$$b14=a9+a10$$

$$b15=a10 \quad (30)$$

The method of least squares can be applied to the equations (30) to determine values of the image components a4 to a10. Also in this case, weights to be assigned can be varied in correspondence with the exposure times of the signals.

More general description will be made of the above processing.

When the CCD 201 has elements such as photodiodes arranged in the line form of n columns in the direction of relative movement to the original 21, the number of equations is basically an integral multiple of n. Specifically, the number of equations becomes twice n by operating all the electronic shutters once between the stepwise timings of the electronic shutters as shown in FIG. 34 and FIG. 35. The number of equations becomes three times n by operating all the electronic shutters twice between the stepwise timings of the electronic shutters as shown in FIG. 34 and FIG. 35.

The number of unknown variables coincides with the number of image components sandwiched between the stepwise electronic shutters as shown in FIG. 34. Letting m be the number of image components, an equation (31) needs to hold to determine each image component.

$$k*n \geq m \quad (31)$$

where k is an integer of 1 or more.

Hence, in modeling image data corresponding to the signals outputted from the CCD 102 and the relative speed between the original 21 and the CCD 102, when the equation (31) is satisfied, image components of the image of the original 21 can be calculated. Thereby movement blur can be removed.

The movement blur removal processing corresponding to the step S34 will next be described with reference to a flowchart of FIG. 36.

At a step S101, the processing unit extracting unit 301 extracts a processing unit comprising a predetermined number of pixels from the image data. For example, the processing unit extracting unit 301 extracts b4 to b10 shown in FIG. 33 as a processing unit.

At a step S102, the modeling unit 302 generates a model for dividing a signal integrated in an exposure time in a time direction from the relative speed between the original 21 and the CCD 102 on the basis of the processing unit supplied from the processing unit extracting unit 301. For example, the modeling unit 302 generates a model that indicates a relation between the number of pixels of the image data generated as a result of removing movement blur and the number of pixels included in the processing unit.

At a step S103, the equation constructing unit 303 constructs equations as normal equations for calculating pixel values of the image data without movement blur on the basis of the generated model and the extracted processing unit.

At a step S104, the least square calculating unit 304 applies the sweep-out method, for example, to the normal equations supplied from the equation constructing unit 303, thereby solves the normal equations and calculates image components. The least square calculating unit 304 corrects gain of the calculated image components according to the number of divisions of the exposure time, and sets the gain-corrected image components as pixel values of the image data. Thus, the least square calculating unit 304 removes movement blur from the image data, and then outputs the image data without movement blur.

At a step S105, the movement blur removing unit 154 determines whether or not the processing for the entire image surface is completed on the basis of a position of the extracted processing unit with respect to the image surface, for example. When the movement blur removing unit 154 determines that the processing for the entire image surface is not completed, the processing returns to the step S101 to extract another processing unit and repeat the movement blur removing processing.

When the movement blur removing unit 154 determines at the step S105 that the processing for the entire image surface is completed, the processing is ended.

Thus, the scanner according to the present invention can calculate image components and remove movement blur from read images.

S/N of the calculated image components is a better value than S/N of an image picked up by the CCD 102 at each original area corresponding to an image component. This is because when an electronic shutter is operated at each original area corresponding to an image component for image pickup, the image pickup needs to be performed in a very short exposure time and consequently the picked-up image includes a large amount of noise.

When the scanner has a mechanical shutter and performs image pickup by the mechanical shutter, the number of shutter operations is reduced, thus decreasing load on the mechanism and hence decreasing failures.

Further, because it is not necessary to stop the CCD 102 at each original area, the time required to pick up an image of a desired area of a subject is shortened as compared with the conventional apparatus.

The present invention has the configuration that applies the method of least squares, thereby removes movement blur and does not propagate effects of noise to subsequent processing. It is thus possible to obtain images without movement blur stably at all times.

Figure 37:
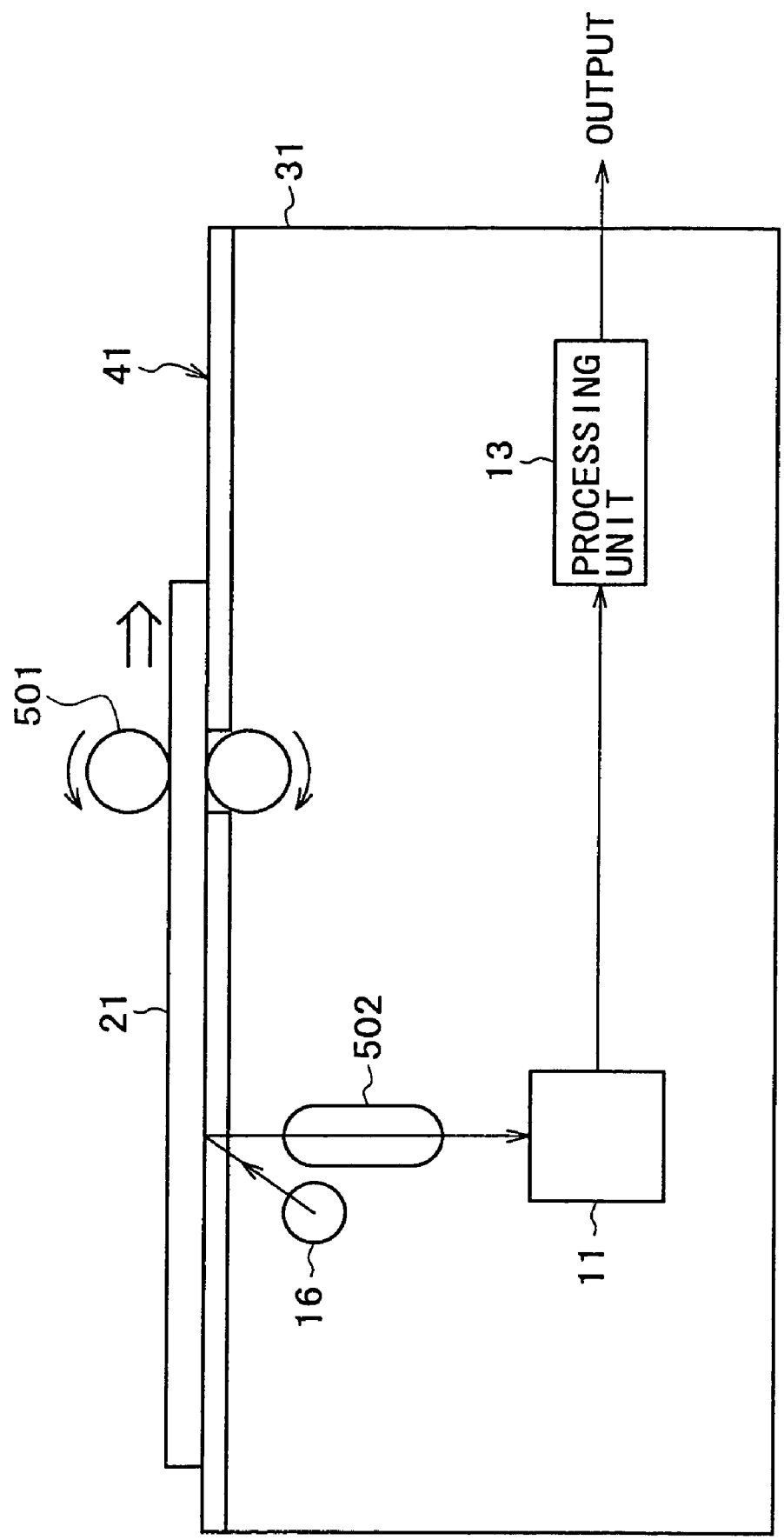
FIG. 37 is a diagram showing a configuration of another embodiment of a scanner according to the present invention.

FIG. 37 is a diagram showing a configuration of another embodiment of a scanner according to the present invention.

The scanner whose configuration is shown in FIG. 37 is a so-called sheet feed scanner having an unmagnification optical system.

A carrying unit 501 carries an original 21 disposed on an original platen 41 at a predetermined speed from the left to the right of FIG. 37 on the basis of driving force supplied from a driving unit not shown in the figure.

A rod lens 502 receives light incident thereon which light is applied from an illuminating light source 16 and reflected by a read area of the original 21. On the basis of the light incident on the rod lens 502, the rod lens 502 forms an image substantially equal in length to the read area of the original 21 on a linear image sensor 11.

Figure 38:
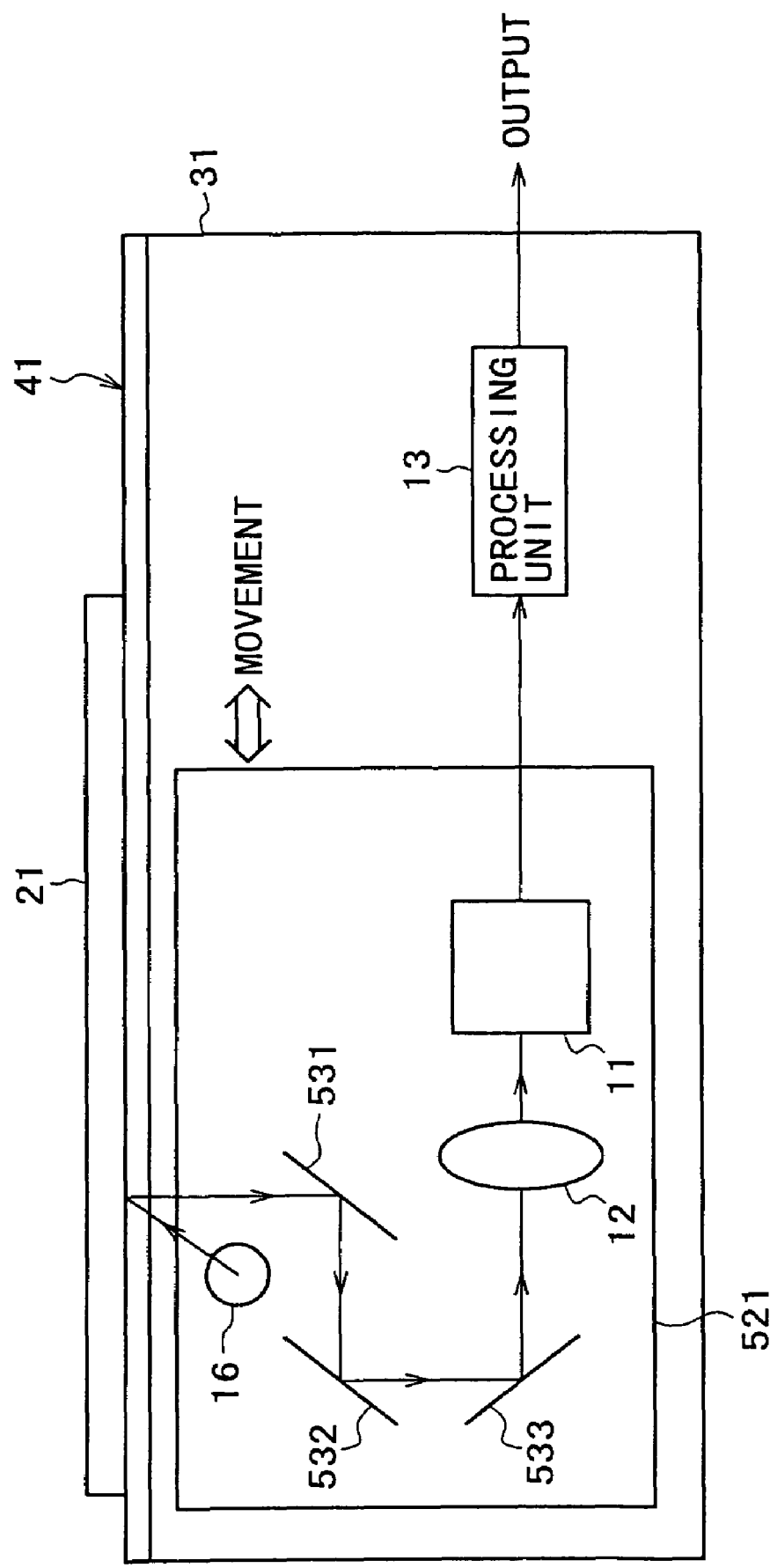
FIG. 38 is a diagram showing a configuration of a further embodiment of a scanner according to the present invention.

FIG. 38 is a diagram showing a configuration of a further embodiment of a scanner according to the present invention.

The scanner whose configuration is shown in FIG. 38 is a so-called flatbed scanner of an integrated carriage type.

A carriage unit 521 has an illuminating light source 16, a mirror 531, a mirror 532, a mirror 533, a lens 12, and a linear image sensor 11 incorporated and integrally formed therein. The whole of the carriage unit 521 moves when an original 21 is read.

The illuminating light source 16 irradiates a reading area of the original 21 with light of a predetermined intensity. The mirror 531, the mirror 532, and the mirror 533 reflect light applied from the illuminating light source 16 and reflected from the original 21 via an original platen 41, and thereby makes the light incident on the linear image sensor 11 via the lens 12.

The lens 12 refracts the light reflected by the mirror 531, the mirror 532, and the mirror 533, and thereby forms an image corresponding to the reading area of the original 21 on the linear image sensor 11.

The linear image sensor 11 reads the image of the reading area of the original 21 and supplies a signal corresponding to the read image to a processing unit 13.

The scanner of the integrated carriage type has characteristics in that it is difficult to reduce its size but it is easy to maintain precision of the optical system.

Figure 39:
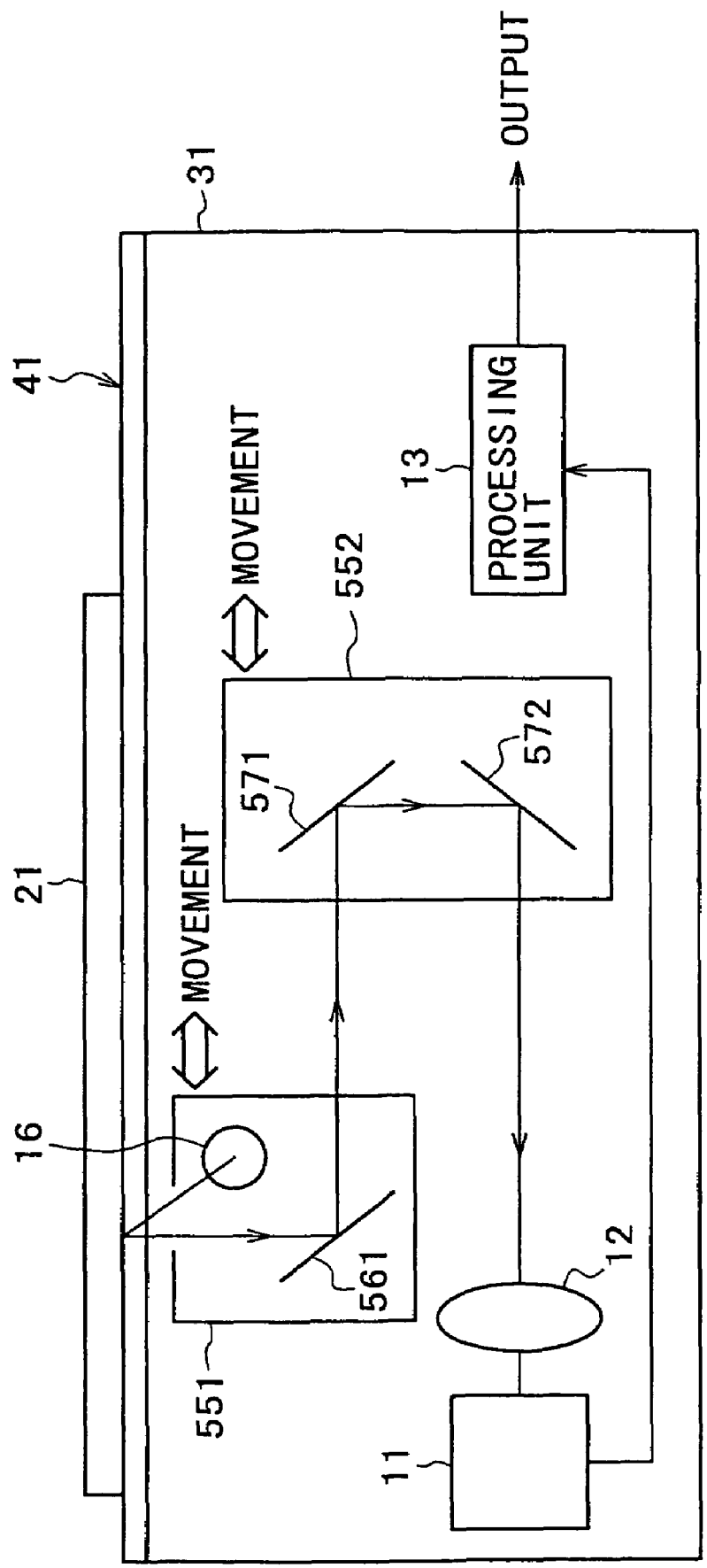
FIG. 39 is a diagram showing a configuration of a further embodiment of a scanner according to the present invention.

FIG. 39 is a diagram showing a configuration of a further embodiment of a scanner according to the present invention.

The scanner whose configuration is shown in FIG. 39 is a so-called flatbed scanner of a moving mirror type.

A carriage unit 551 includes an illuminating light source 16 and a mirror 561. A carriage unit 552 includes a mirror 571 and a mirror 572.

When an original 21 is read, the carriage unit 551 and the carriage unit 552 move separately from each other in such a manner as to maintain a constant optical distance between a linear image sensor 11 and a read area of the original 21.

The mirror 561, the mirror 571, and the mirror 572 reflect light applied from the illuminating light source 16 and reflected from the original 21 via an original platen 41, and thereby makes the light incident on the linear image sensor 11 via a lens 12.

The lens 12 refracts the light reflected by the mirror 561, the mirror 571, and the mirror 572, and thereby forms an image corresponding to the read area of the original 21 on the linear image sensor 11.

The linear image sensor 11 reads the image of the read area of the original 21 and supplies a signal corresponding to the read image to a processing unit 13.

The scanner of the moving mirror type has characteristics in that it is difficult to maintain precision of the optical system because of its complex mechanism and displacement, play, elasticity of a driving belt and the like but it is easy to reduce the size of the scanner.

Thus, the scanner or the image reading apparatus according to the present invention can remove movement blur included in a read image and therefore output image data with higher resolution or higher accuracy. The relative speed between an original as a subject and a line sensor as a reading sensor can be controlled easily and modeling of movement blur is relatively easy. It can therefore be said that the present invention has very high usefulness.

As described above, the present invention makes it possible to realize an image reading apparatus with far higher speed than that of a conventional scanner or other image reading apparatus without decreasing accuracy and S/N even when read data includes movement blur.

It is to be noted that the image reading apparatus according to the present invention is not limited to so-called sheet feed scanners, flatbed scanners, or hand-held scanners, and may be a drum scanner for plate making, a camera type scanner or the like. The drum scanner is characterized by using a single element as an image sensor for main scanning and sub-scanning and having a very high resolution without depending on resolution of the image sensor. The camera type scanner is characterized by using a two-dimensional sensor as in a digital camera and hence having limits in the number of pixels of the sensor and having low resolution. The present invention can be applied to both of the scanners to remove movement blur and obtain image data with higher resolution.

Also, the present invention is applicable to both apparatus having a single function as a scanner and apparatus having other functions, such as facsimile machines, digital copying apparatus or the like.

It is to be noted that the linear image sensor is not limited to CCD or CMOS sensors, and may be for example such a solid-state image pickup device as BBD (Bucket Brigade Device), CID (Charge Injection Device), or CPD (Charge Priming Device). The present invention is not limited by the type of the linear image sensor.

The series of processes described above can be carried out not only by hardware but also by software. When the series of processes is to be carried out by software, a program forming the software is installed from a recording medium (storage medium) onto a computer that is incorporated in dedicated hardware, or a general-purpose personal computer or the like that can perform various functions by installing various programs thereon, for example.

As shown in FIG. 3, the recording medium (storage medium) is not only formed by packaged media distributed to users to provide the program separately from the computer, the packaged media being formed by the magnetic disk 131 (including flexible disks), the optical disk 132 (including CD-ROM (Compact Disc-Read Only Memory) and DVD (Digital Versatile Disc)), the magneto-optical disk 133 (including MD (Mini-Disc) (trademark)), the semiconductor memory 134 or the like which has the program recorded (stored) thereon, but also formed by a ROM (for example a ROM formed integrally in the signal processing unit 107 formed by an embedded computer), a hard disk or the like which has the program recorded (stored) thereon and which is provided to the user in a state of being preincorporated in the computer.

Incidentally, the program for carrying out the series of processes described above may be installed onto a computer via a wired or wireless communication medium such as a local area network, the Internet, or digital satellite broadcasting via an interface such as a router or a modem as required.

Also, in the present specification, the steps describing the program stored on the recording medium (storage medium) include not only processing carried out in time series in the described order but also processing carried out in parallel or individually and not necessarily in time series.

It is to be noted that in the present specification, a system refers to an apparatus as a whole formed by a plurality of apparatus.

INDUSTRIAL APPLICABILITY

According to the present invention, image data with good S/N and higher resolution can be obtained reliably in a short reading time.

FIG. 1
11: OUTPUT
1-2: MOVEMENT
13: SUB-SCANNING DIRECTION
1-4: MAIN SCANNING DIRECTION
13: PROCESSING UNIT

FIG. 2
2-1: OUTPUT
2-2: MOVEMENT
13: PROCESSING UNIT

FIG. 3
3-1: DRIVING SIGNAL
3-2: EXPOSURE TIME
3-3: EXTERNAL CONTROL SIGNAL
16: ILLUMINATING LIGHT SOURCE
103: TIMING GENERATOR
104: GAIN ADJUSTMENT/NOISE SUPPRESSION UNIT
105: A/D CONVERSION UNIT
106: MEMORY
107: SIGNAL PROCESSING UNIT
108: MEMORY
109: DATA TRANSMISSION UNIT
110: MEMORY
111: MAIN CPU
112: CONTROLLER
113: MOTOR
114: POWER SUPPLY UNIT
115: INTERFACE
121: DRIVE

FIG. 4
4-1: INPUT
4-2: OUTPUT
151: DEFECT CORRECTION UNIT
152: CLAMP UNIT
153: WHITE BALANCE UNIT
154: MOVEMENT BLUR REMOVING UNIT
155: GAMMA CORRECTION UNIT
156: IMAGE QUALITY ADJUSTMENT UNIT
157: COLOR SPACE CONVERSION UNIT

FIG. 5
5-1: INPUT
5-2: OUTPUT
171: PROCESSING UNIT EXTRACTING UNIT
172: MODELING UNIT
173: EQUATION CONSTRUCTING UNIT
174: SIMULTANEOUS EQUATION CALCULATING UNIT

FIG. 6
6-1: TRAVELING DIRECTION

FIG. 7
7-1: LENGTH OF ONE CCD PIXEL
7-2: TRAVELING DIRECTION

FIG. 8
8-1: LENGTH OF ONE CCD PIXEL
8-2: EXPOSURE TIME
8-3: MOVEMENT TIME

FIG. 9
9-1: LENGTH OF ONE CCD PIXEL
9-2: SUBJECT
9-3: EXPOSURE TIME

FIG. 10
10-1: LENGTH OF ONE CCD PIXEL
10-2: EXPOSURE TIME

FIG. 11
11-1: LENGTH OF ONE CCD PIXEL
11-2: EXPOSURE TIME

FIG. 12
12-1: TRAVELING DIRECTION

FIG. 13
13-1: LENGTH OF ONE CCD PIXEL
13-2: TRAVELING DIRECTION
13-3: SPEED V0

FIG. 14
14-1: LENGTH OF ONE CCD PIXEL
14-2: EXPOSURE TIME

FIG. 15
15-1: TRAVELING DIRECTION

FIG. 16
16-1: TRAVELING DIRECTION

FIG. 17
17-1: TRAVELING DIRECTION

FIG. 18
18-1: TRAVELING DIRECTION

FIG. 19
19-1: TRAVELING DIRECTION

FIG. 20
20-1: AMOUNT OF MOVEMENT CORRESPONDING TO t0
20-2: TRAVELING DIRECTION
20-3: SPEED V0
20-4: AMOUNT OF MOVEMENT CORRESPONDING TO t1
20-5: SPEED V1

FIG. 21
21-1: TRAVELING DIRECTION

FIG. 22
22-1: TRAVELING DIRECTION

FIG. 23
23-1: TRAVELING DIRECTION

FIG. 24
24-1: TRAVELING DIRECTION

FIG. 25
25-1: TRAVELING DIRECTION

FIG. 26
26-1: TRAVELING DIRECTION

FIG. 27
27-1: TRAVELING DIRECTION

Figure 28:
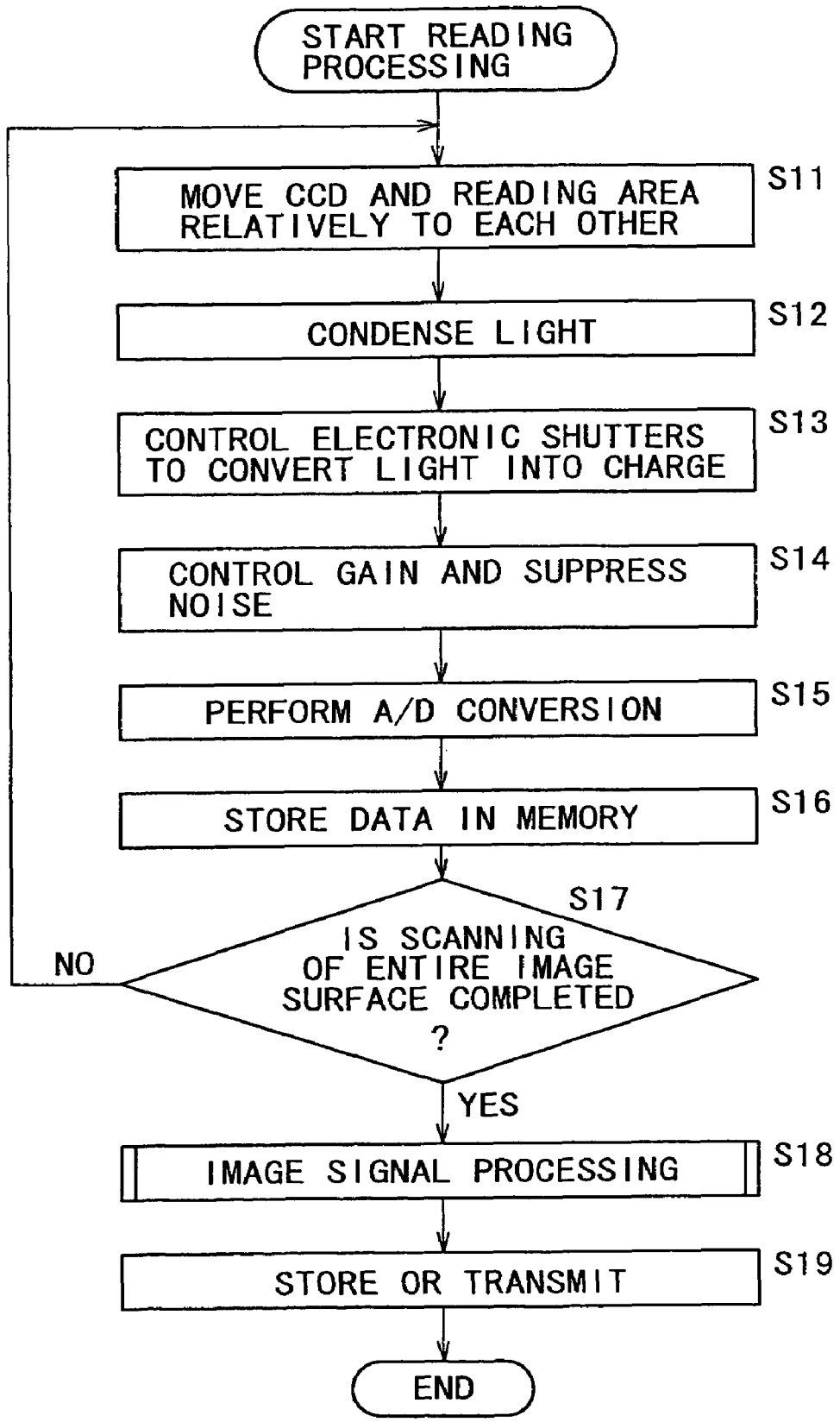
FIG. 28 is a flowchart of assistance in explaining reading processing.

FIG. 28
28-1: START READING PROCESSING
28-2: END
S11: MOVE CCD AND READING AREA RELATIVELY TO EACH OTHER
S12: CONDENSE LIGHT
S13: CONTROL ELECTRONIC SHUTTERS TO CONVERT LIGHT INTO CHARGE
S14: CONTROL GAIN AND SUPPRESS NOISE
S15: PERFORM A/D CONVERSION
S16: STORE DATA IN MEMORY
S17: IS SCANNING OF ENTIRE IMAGE SURFACE COMPLETED?
S18: IMAGE SIGNAL PROCESSING
S19: STORE OR TRANSMIT

FIG. 29
29-1: START IMAGE SIGNAL PROCESSING
29-2: RETURN
S31: DEFECT CORRECTION
S32: CLAMP
S33: WHITE BALANCE
S34: MOVEMENT BLUR REMOVAL
S35: GAMMA CORRECTION
S36: IMAGE QUALITY ADJUSTMENT
S37: COLOR SPACE CONVERSION

Figure 30:
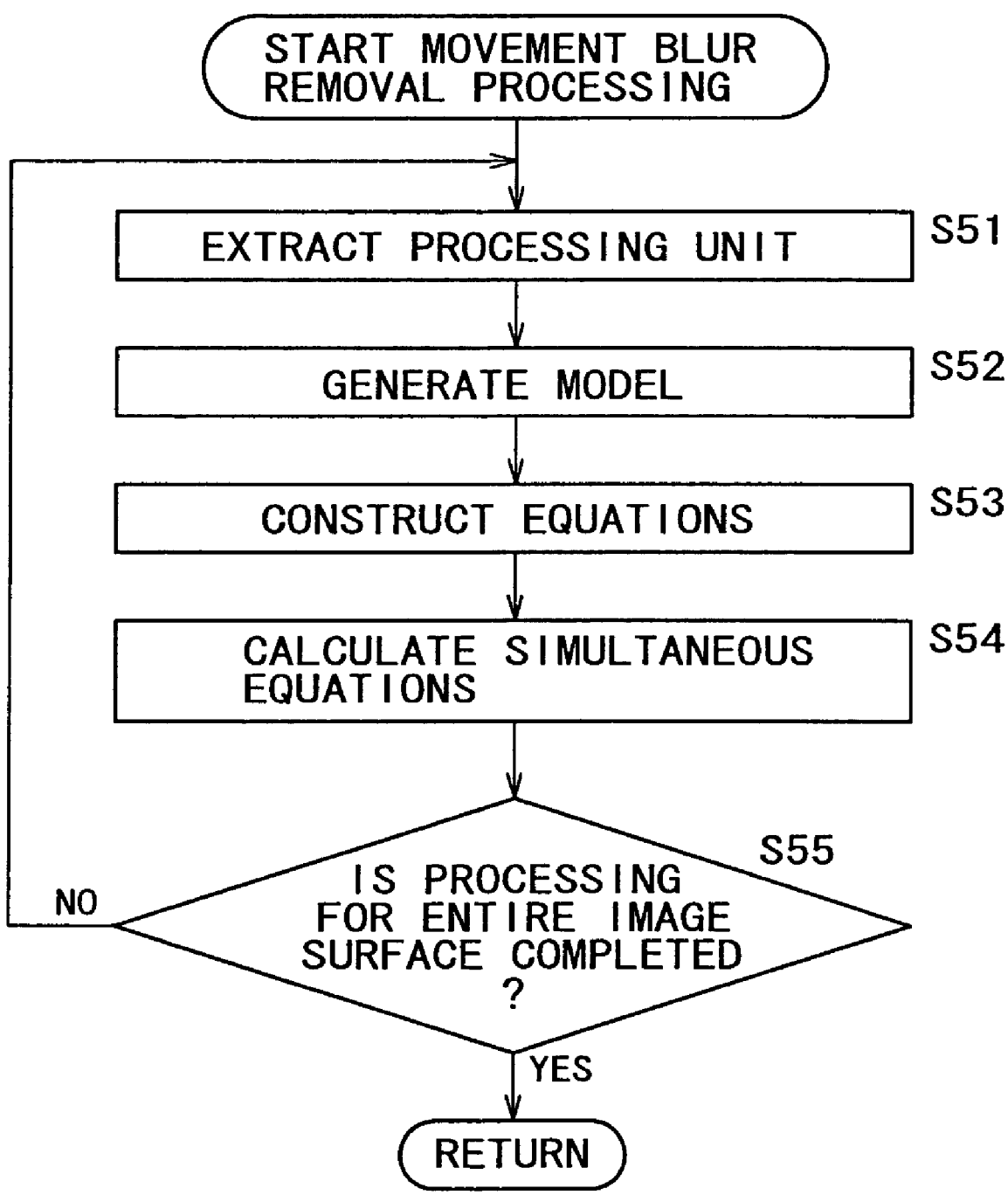
FIG. 30 is a flowchart of assistance in explaining movement blur removal processing.

FIG. 30
30-1: START MOVEMENT BLUR REMOVAL PROCESSING
30-2: RETURN
S51: EXTRACT PROCESSING UNIT
S52: GENERATE MODEL
S53: CONSTRUCT EQUATIONS
S54: CALCULATE SIMULTANEOUS EQUATIONS
S55: IS PROCESSING FOR ENTIRE IMAGE SURFACE COMPLETED?

FIG. 31
31-1: INPUT
31-2: OUTPUT
301: PROCESSING UNIT EXTRACTING UNIT
302: MODELING UNIT
303: EQUATION CONSTRUCTING UNIT
304: LEAST SQUARE CALCULATING UNIT

FIG. 32
32-1: TRAVELING DIRECTION

FIG. 33
33-1: TRAVELING DIRECTION

FIG. 34
34-1: TRAVELING DIRECTION

FIG. 35
35-1: TRAVELING DIRECTION

Figure 36:
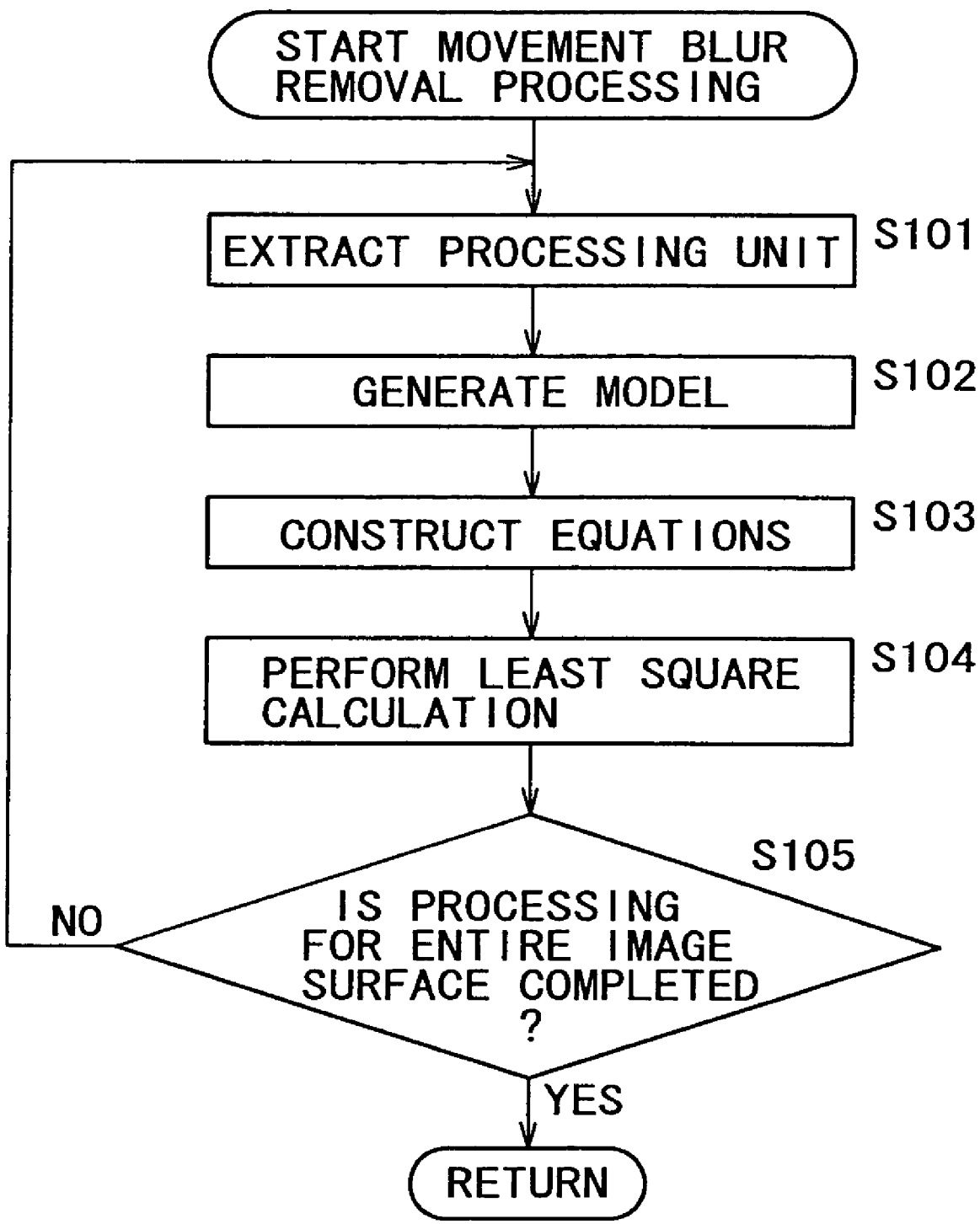
FIG. 36 is a flowchart of assistance in explaining movement blur removal processing.

FIG. 36
36-1: START MOVEMENT BLUR REMOVAL PROCESSING
36-2: RETURN
S101: EXTRACT PROCESSING UNIT
S102: GENERATE MODEL
S103: CONSTRUCT EQUATIONS
S104: PERFORM LEAST SQUARE CALCULATION
S105: IS PROCESSING FOR ENTIRE IMAGE SURFACE COMPLETED?

FIG. 37
37-1: OUTPUT
13: PROCESSING UNIT

FIG. 38
38-1:. MOVEMENT
38-2: OUTPUT
13: PROCESSING UNIT

FIG. 39
39-1: MOVEMENT
39-2: OUTPUT
13: PROCESSING UNIT

The invention claimed is:

1. An image reading apparatus comprising:
a reading device formed by arranging line sensors, in which detecting elements having a time integration effect are arranged in a direction orthogonal to a relative movement direction in which the reading means moves relative to an object being detected, in a plurality of columns in said relative movement direction;
a pixel component detecting device configured to detect pixel components on the basis of a model for separating first pixel values obtained in a processing unit time by said detecting elements into a plurality of said pixel components corresponding to detection positions of said object being detected; and
a pixel value generating device configured to generate second pixel values corresponding to said detection positions of said object being detected on the basis of said pixel components detected by said pixel component detecting means, wherein, said pixel component detecting device includes a model generating device for generating said model that represents a relation between said first pixel values and a plurality of said pixel components corresponding to said detection positions, said pixel components being accumulated in each divided unit time obtained by dividing said processing unit time by a number of columns of said line sensors; and wherein said pixel component detecting device is configured to detect said pixel components on the basis of said model generated by said model generating device.

2. An image reading apparatus as claimed in claim 1, further comprising a speed detecting device configured to detect relative speed between said detecting elements and said object being detected, wherein said model generating device is configured to generate said model that represents a relation between said first pixel values obtained from a part of said detecting elements of said line sensors arranged in said reading device and said pixel components in correspondence with said relative speed detected by said speed detecting device.

3. An image reading apparatus as claimed in claim 1, further comprising a speed detecting device configured to detect relative speed between said detecting elements and said object being detected, wherein said model generating device is configured to generate said model that represents a relation between third pixel values obtained by adding together said first pixel values obtained from adjacent said detecting elements of a plurality of said detecting elements arranged in columns in said relative movement direction of said reading device and said pixel components in correspondence with said relative speed detected by said speed detecting device.

4. An image reading apparatus as claimed in claim 1, further comprising a control device configured to control said reading means such that when said reading device is positioned at an initial position, said reading device configured to pick up an image of said object being detected and output said first pixel values corresponding to said detecting elements in a state of standing still with respect to said object being detected during said processing unit time, wherein said pixel component detecting device is configured to detect other said pixel components by substituting said pixel components generated on the basis of said first pixel values resulting from image pickup by said reading device in the state of standing still with respect to said object being detected under control of said control device into said model that represents a relation between said first pixel values and a plurality of said pixel components corresponding to said detection positions.

5. An image reading apparatus as claimed in claim 4, characterized in that:

said control device is configured to control said reading means such that said reading device is configured to pick up an image of said object being detected and outputs said first pixel values corresponding to said detecting elements in the state of standing still with respect to said object being detected during said processing unit time at predetermined time intervals.

6. An image reading apparatus as claimed in claim 1, further comprising a control device is configured to control exposure time for each of said detecting elements of said reading device such that each of said first pixel values includes said pixel component corresponding to a different position in the relative-movement direction of said object being detected, wherein said pixel component detecting device is configured to detect said pixel components on the basis of said model that represents a relation between said first pixel values each including said pixel component corresponding to a different position in the relative movement direction of said object being detected and a plurality of said pixel components corresponding to said detection positions.

7. An image reading apparatus as claimed in claim 6, characterized in that:

said control device is configured to control the exposure time for each of said detecting elements of said reading device such that each of said first pixel values includes said pixel component corresponding to a different position in the relative movement direction of said object being detected at predetermined time intervals.

8. An image reading apparatus as claimed in claim 1, further comprising a moving device configured to move one of said object being detected and said reading device to change a relative position between said object being detected and said reading device.

9. An image reading apparatus as claimed in claim 1, characterized in that:

said pixel component detecting device includes a normal equation generating device configured to generate a normal equation on the basis of a model for separating first pixel values obtained by said detecting elements into a plurality of pixel components corresponding to detection positions of said object being detected; and said pixel component detecting device is configured to detect said pixel components on the basis of said normal equation generated by said normal equation generating device.

10. An image reading apparatus as claimed in claim 9, further comprising:

a first control device configured to control image pickup of said reading device such that each of said detecting elements arranged in a plurality of columns in said relative movement direction begins exposure at an identical first position of said detection positions of said object being detected and ends exposure at an identical second position different from said first position; and a second control device configured to control the image pickup of said reading device such that said detecting elements begin exposure after ending exposure at a third time between a first time when all of said detecting elements arranged in the plurality of columns have reached said first position and have begun exposure and a second time when one of said detecting elements arranged in the plurality of columns has reached said second position and has ended exposure;

wherein said normal equation generating device is configured to generate said normal equation by setting said first pixel values obtained by said detecting elements in said normal equation representing a relation between a plurality of said pixel components including said pixel component corresponding to one of said first position, said second position, and a third position as said detection position at said third time and said first pixel values.

11. An image reading apparatus as claimed in claim 9, characterized in that:
said normal equation generating device is configured to generate said normal equation for calculating said pixel components by applying a method of least squares.

12. An image reading apparatus as claimed in claim 9, characterized in that:
said normal equation generating device is configured to generate said normal equation weighted in correspondence with lengths of exposure times for obtaining said first pixel values.

13. An image reading method of an image reading apparatus, said image reading apparatus including a reading device formed by arranging line sensors, in which detecting elements having a time integration effect are arranged in a direction orthogonal to a relative movement direction in which the reading apparatus moves relative to an object being detected, in a plurality of columns in said relative movement direction, said image reading method comprising the steps of:
detecting pixel components on the basis of a model for separating first pixel values obtained in a processing unit time by said detecting elements into a plurality of said pixel components corresponding to detection positions of said object being detected; and
generating second pixel values corresponding to said detection positions of said object being detected on the basis of said pixel components detected by processing of said pixel component detecting step.

14. A computer-readable medium encoded with a computer program, said program being for image reading processing of an image reading apparatus, said image reading apparatus including a reading apparatus formed by arranging line sensors, in which detecting elements having a time integration effect are arranged in a direction orthogonal to a relative movement direction in which the reading apparatus moves relative to an object being detected, in a plurality of columns in said relative movement direction, said program comprising the steps of:
detecting pixel components on the basis of a model for separating first pixel values obtained in a processing unit time by said detecting elements into a plurality of said pixel components corresponding to detection positions of said object being detected; and
generating second pixel values corresponding to said detection positions of said object being detected on the basis of said pixel components detected by processing of said pixel component detecting step.

15. A computer-readable medium encoded with a computer program executable by a computer, said computer controlling an image reading apparatus, said image reading apparatus including a reading apparatus formed by arranging line sensors, in which detecting elements having a time integration effect are arranged in a direction orthogonal to a relative movement direction in which the reading apparatus moves relative to an object being detected, in a plurality of columns in said relative movement direction, said program comprising the steps of:
detecting pixel components on the basis of a model for separating first pixel values obtained in a processing unit time by said detecting elements into a plurality of said pixel components corresponding to detection positions of said object being detected; and
generating second pixel values corresponding to said detection positions of said object being detected on the basis of said pixel components detected by processing of said pixel component detecting step.

* * * * *